United States Patent
Takata et al.

(10) Patent No.: US 8,702,263 B2
(45) Date of Patent: Apr. 22, 2014

(54) LIGHTING DEVICE, RELAY CONNECTOR, DISPLAY DEVICE AND TELEVISION RECEIVER

(75) Inventors: Yoshiki Takata, Osaka (JP); Takaaki Kudo, Shibuya-ku (JP); Naofumi Ikenaga, Shibuya-ku (JP)

(73) Assignees: Sharp Kabushiki Kaisha, Osaka (JP); Japan Aviation Electronics Industry, Limited, Tokyo (JP)

( * ) Notice: Subject to any disclaimer, the term of this patent is extended or adjusted under 35 U.S.C. 154(b) by 549 days.

(21) Appl. No.: 13/062,980

(22) PCT Filed: Sep. 9, 2009

(86) PCT No.: PCT/JP2009/065720
§ 371 (c)(1),
(2), (4) Date: Mar. 9, 2011

(87) PCT Pub. No.: WO2010/032664
PCT Pub. Date: Mar. 25, 2010

(65) Prior Publication Data
US 2011/0187941 A1     Aug. 4, 2011

(30) Foreign Application Priority Data

Sep. 17, 2008  (JP) ................... 2008-238548
Dec. 12, 2008  (JP) ................... 2008-316951
Aug. 4, 2009   (WO) ............ PCT/JP2009/063770

(51) Int. Cl.
*G02F 1/13357* (2006.01)
*F21V 23/00* (2006.01)

(52) U.S. Cl.
USPC .......... 362/97.2; 362/97.1; 362/217.14; 362/378; 362/382; 349/58

(58) Field of Classification Search
USPC ............. 362/183, 97.1, 97.4, 217.14
See application file for complete search history.

(56) References Cited

U.S. PATENT DOCUMENTS 7,325,941 B2 *   2/2008   Kim et al. ................ 362/225
2007/0046171 A1  3/2007   Miyazono
(Continued)

FOREIGN PATENT DOCUMENTS

| CN | 101098058 A | 1/2008 |
| JP | 2004-335227 A | 11/2004 |
| JP | 2007-095672 A | 4/2007 |
| JP | 2007-257877 A | 10/2007 |
| RU | 2224946 C1 | 2/2004 |

OTHER PUBLICATIONS

Official Communication issued in International Patent Application No. PCT/JP2009/065720, mailed on Dec. 28, 2009.
Official Communication issued in International Patent Application No. PCT/JP2009/063770, mailed on Nov. 17, 2009.

*Primary Examiner* — Sikha Roy
(74) *Attorney, Agent, or Firm* — Keating & Bennett, LLP

(57) ABSTRACT

A display device 10 of the present invention includes a relay connector 14 configured to relay power supply from the power board 16 mounted to a chassis 13 to a discharge tube 15. The relay connector 14 includes a holder 20 and a relay terminal 30. The holder has insulation properties and is mounted to the chassis 13. The relay terminal 30 is electrically connected to the power board 16 and the discharge tube 15, and attached to the holder 20. The relay terminal includes a pair of flexible portions 34 that hold the power board therebetween and are electrically connected to the power board 16. The flexible portions 34 are formed such that the longitudinal directions thereof cross the longitudinal direction of the discharge tube 15.

36 Claims, 82 Drawing Sheets

(56) References Cited

U.S. PATENT DOCUMENTS

| | | |
|---|---|---|
| 2007/0216017 A1 | 9/2007 | Miyazono et al. |
| 2007/0230169 A1* | 10/2007 | Kwon et al. ................ 362/217 |
| 2007/0286629 A1 | 12/2007 | Kwon et al. |
| 2008/0207063 A1 | 8/2008 | Handa et al. |
| 2008/0259135 A1* | 10/2008 | Asauchi et al. ................ 347/84 |

* cited by examiner

FIG.1
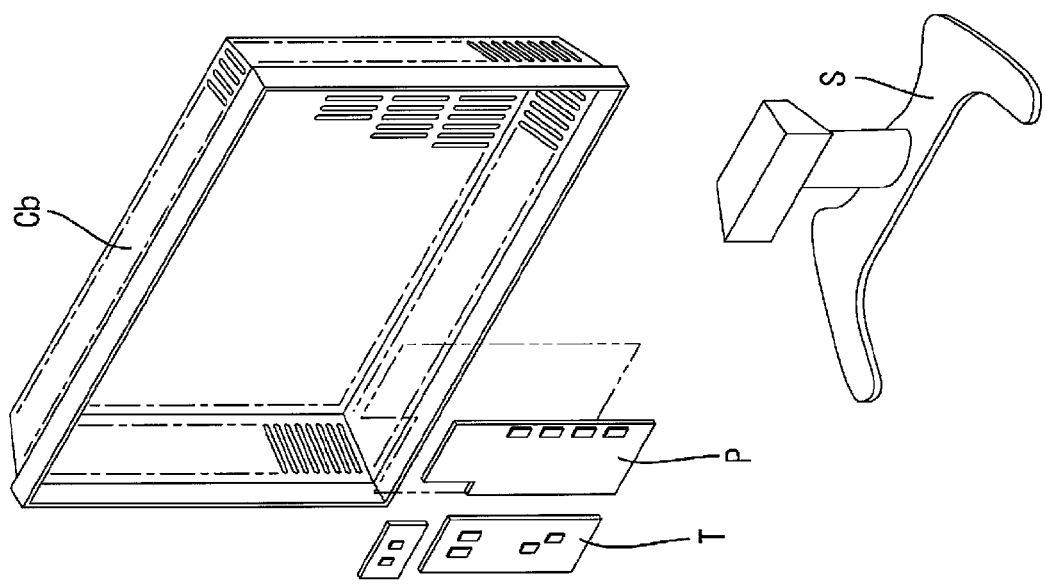
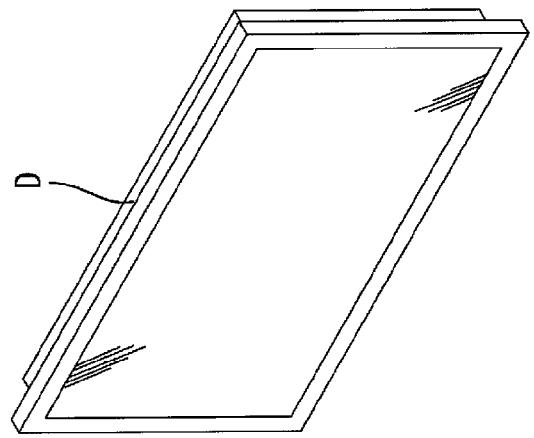
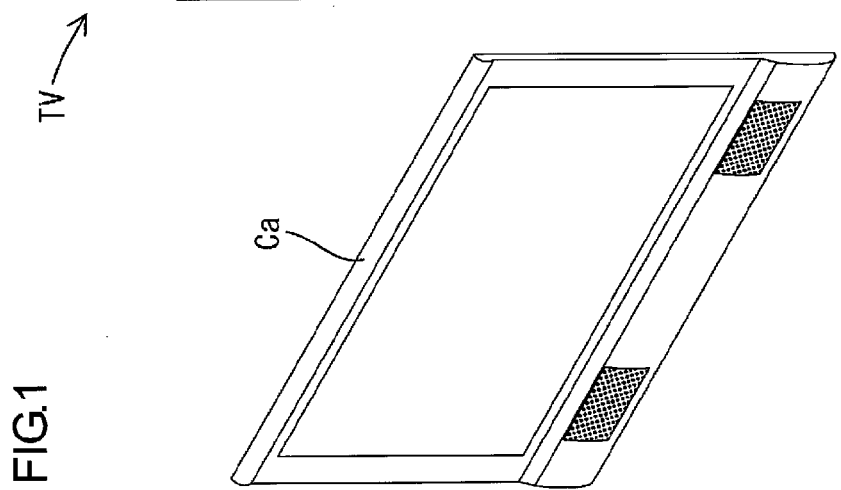

LIGHTING DEVICE, RELAY CONNECTOR, DISPLAY DEVICE AND TELEVISION RECEIVER

TECHNICAL FIELD

The present invention relates to a lighting device, a relay connector, a display device and a television receiver.

BACKGROUND ART

A liquid crystal display device includes a liquid crystal panel and a light source that illuminates the liquid crystal panel. Patent Document 1 discloses a liquid crystal display device including a composite contact for electrical connection between a light source and an inverter circuit.
Patent Document 1: Japanese Unexamined Patent Publication No. 2007-257877

Problem to be Solved by the Invention

The composite contact (16) in Patent Document 1 is formed as a single plate member constructed of a single metal part having conductivity. It includes a main body part (31), a pair of first elastic pieces (32, 33) extended from the main body part (31), and a pair of second elastic pieces (34, 35) extended from the main body part (31).
The first elastic pieces (32, 33) have elongated shapes perpendicular to the longitudinal direction of a cold cathode tube. They can be elastically in contact with an outer lead of the cold cathode tube (the light source) to make electrical connection with the cold cathode tube (the light source). The second elastic pieces (34, 35) have elongated shapes perpendicular to the longitudinal direction of a cold cathode tube. They can be elastically in contact with conductive patterns on front and rear surfaces of a circuit board to make electrical connection with the circuit board.
The composite contact (16) is held with a resin housing and form a connector together with the housing. A plurality of such connectors is arranged on edge areas (non-display areas) of the liquid crystal display device for holding ends of cold cathode tubes. The housing of each connector may be large in size corresponding to a long dimension of the cold cathode tube due to at least the second elastic pieces (34, 35) having the elongated shape. Therefore, the non-display areas (i.e., the frame areas) are also large in size. This is against the current needs for increasing the display areas.

Disclosure of the Present Invention

The present invention was made in view of the foregoing circumstances. An object of the present invention is to provide a lighting device in which a discharge tube and a power board can be easily and properly connected to each other, and a high voltage area is reduced, especially in the longitudinal direction of the discharge tube, so that frame-size reduction is possible. Other objects of the present invention are to provide a display device and a television receiver including such a lighting device with a large display area.

Means for Solving the Problem

To solve the above problem, a lighting device of the present invention includes a chassis, a discharge tube, a power board and a relay connector. The discharge tube is arranged on a first surface of the chassis. The power board is arranged on an opposite surface of the chassis from the first surface on which the discharge tube is arranged and configured to supply power to the discharge tube. The relay connector is mounted to the chassis to relay the power supply from the power board to the discharge tube. The relay connector includes a holder and a relay terminal. The holder has insulation properties and is mounted to the chassis. The relay terminal is attached to the holder and electrically connected to the power board and the discharge tube. The relay terminal includes flexible portions that hold the power board therebetween with elastic forces so as to make electrical connection with the power board. The flexible portions are formed such that longitudinal directions thereof cross a longitudinal direction of the discharge tube.

In this lighting device, the flexible portions of the relay terminal are electrically connected to the power board. The flexible portions are formed such that longitudinal directions thereof cross a longitudinal direction of the discharge tube. Therefore, the high voltage area provided along the longitudinal direction of the flexible portions is set along the direction that crosses the longitudinal direction of the discharge tube. Namely, the high voltage area can be reduced in dimension thereof along the longitudinal direction of the discharge tube. In a lighting device in which the discharge tubes are arranged parallel to each other, the relay terminals are arranged parallel to each other in the direction that crosses the longitudinal direction of the discharge tubes. The high voltage areas are provided consecutively along the parallel arrangement direction of the relay terminals. Even when the longitudinal direction of the flexible portions is set along a direction that across the longitudinal direction of the discharge tube, the high voltage areas do not increase. If the lighting device including such relay connectors is used in a display device such as a liquid crystal display device, the high voltage areas are not large. Therefore, the non-display areas (i.e., the frame areas) around the edges are not large and thus a large display area can be provided.

An alternative configuration includes only one of the flexible portions, and the power board is held between the flexible portion and another member (e.g., a resin member or a non-flexible member). The power board may be held between the flexible portions provided in a pair.

BRIEF DESCRIPTION OF THE DRAWINGS

FIG. 1 is an exploded perspective view of a television receiver according to the first embodiment.

BEST MODE FOR CARRYING OUT THE INVENTION

First Embodiment

The first embodiment of the present invention will be explained with reference to FIGS. 1 to 31.

Display Device D

Figure 2:
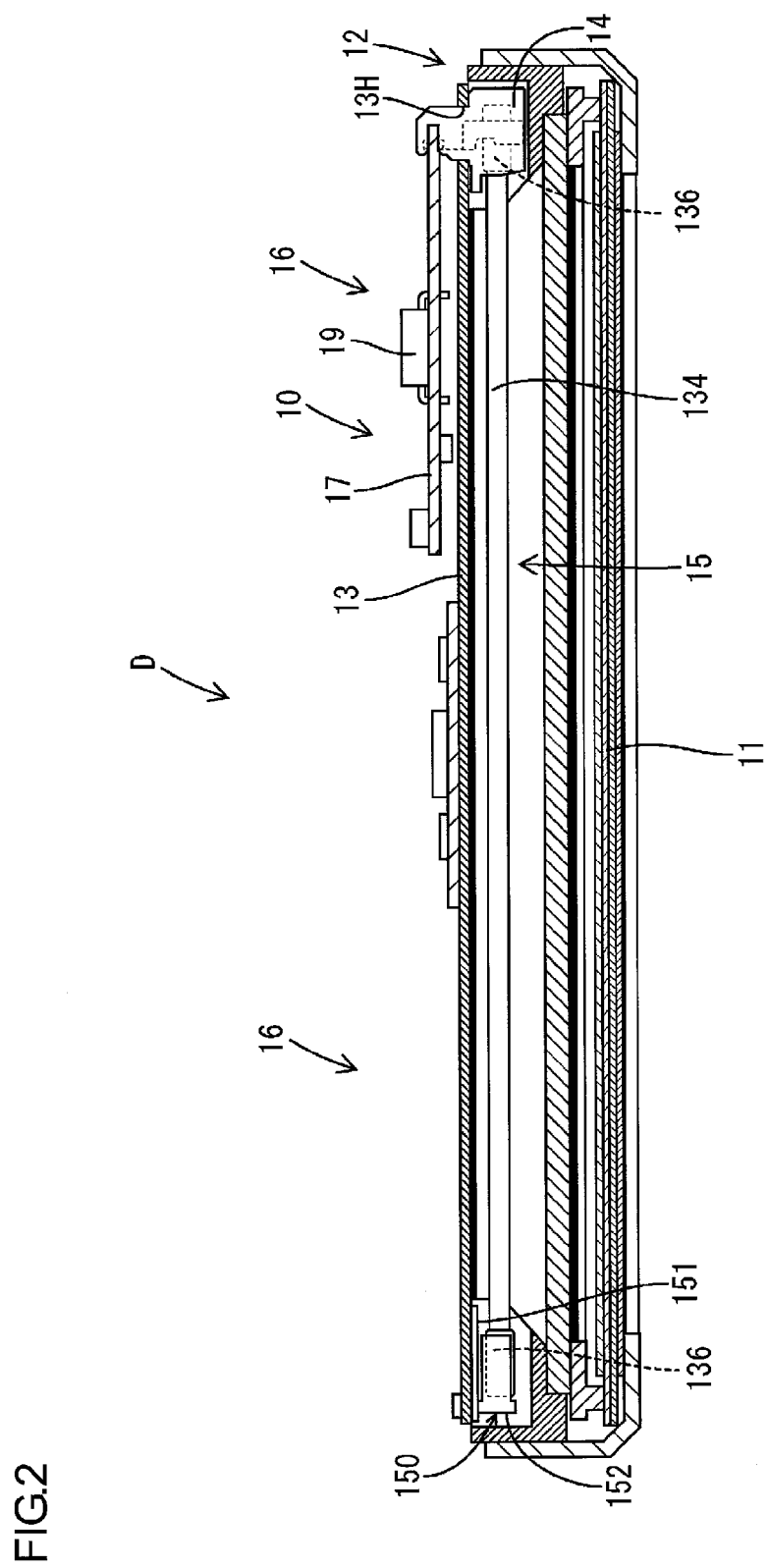
FIG. 2 is a horizontal sectional view of a display device.

FIG. 1 is an exploded perspective view of a television receiver TV. The television receiver TV includes the display device D, front and rear cabinets Ca, Cb that house the display device D therebetween, a main power source P, a tuner T and a stand S. The display device D has a landscape rectangular overall shape, and includes a display panel 11 and a lighting device 10 illustrated in FIG. 2. It is so-called a liquid crystal display device. The display panel 11 is arranged in front of the lighting device 10. The lighting device 10 functions as a backlight and illuminates the display panel 11 from the rear. FIG. 2 is a schematic illustration of the display unit 10. Shapes of the relay connectors 14, the grounding members 150, the power board 16 and the other parts will be explained in detail with reference to other drawings.

Display Panel 11

The display panel 11 has a known configuration in which liquid crystals are sealed in a gap between a transparent TFT substrate and a transparent CF substrate. On the TFT substrate, Thin Film Transistors (TFTs) and pixel electrodes are provided. TFTs are switching components connected to source lines and gate lines that are perpendicular to each other. The pixel electrodes are connected to the TFTs. On the CF substrate, color filter having color sections of three primary colors of red (R), green (G) and blue (B) arranged in a matrix and counter electrodes are provided.

Lighting Device 10

Figure 3:
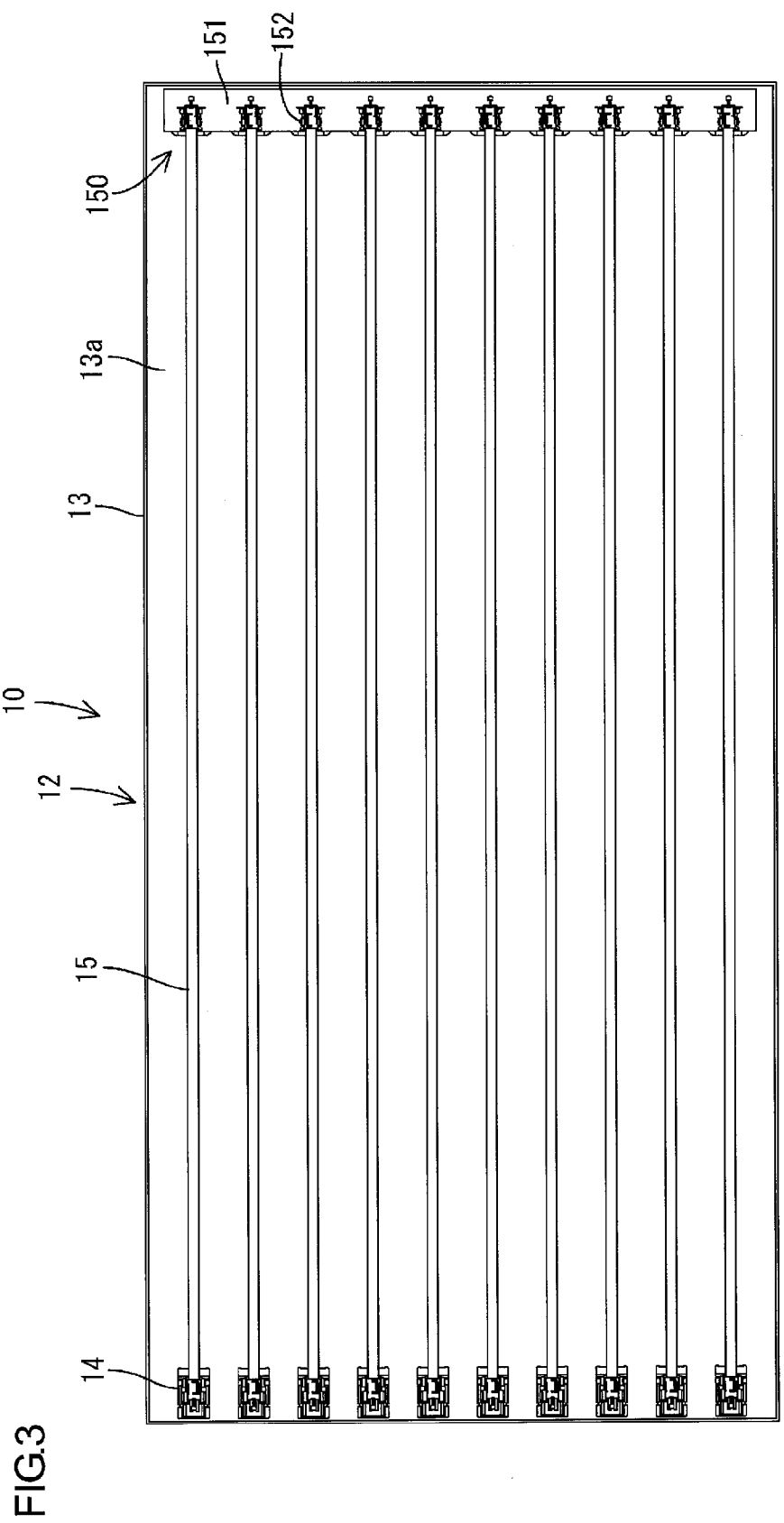
FIG. 3 is a front view of a lighting device.
Figure 4:
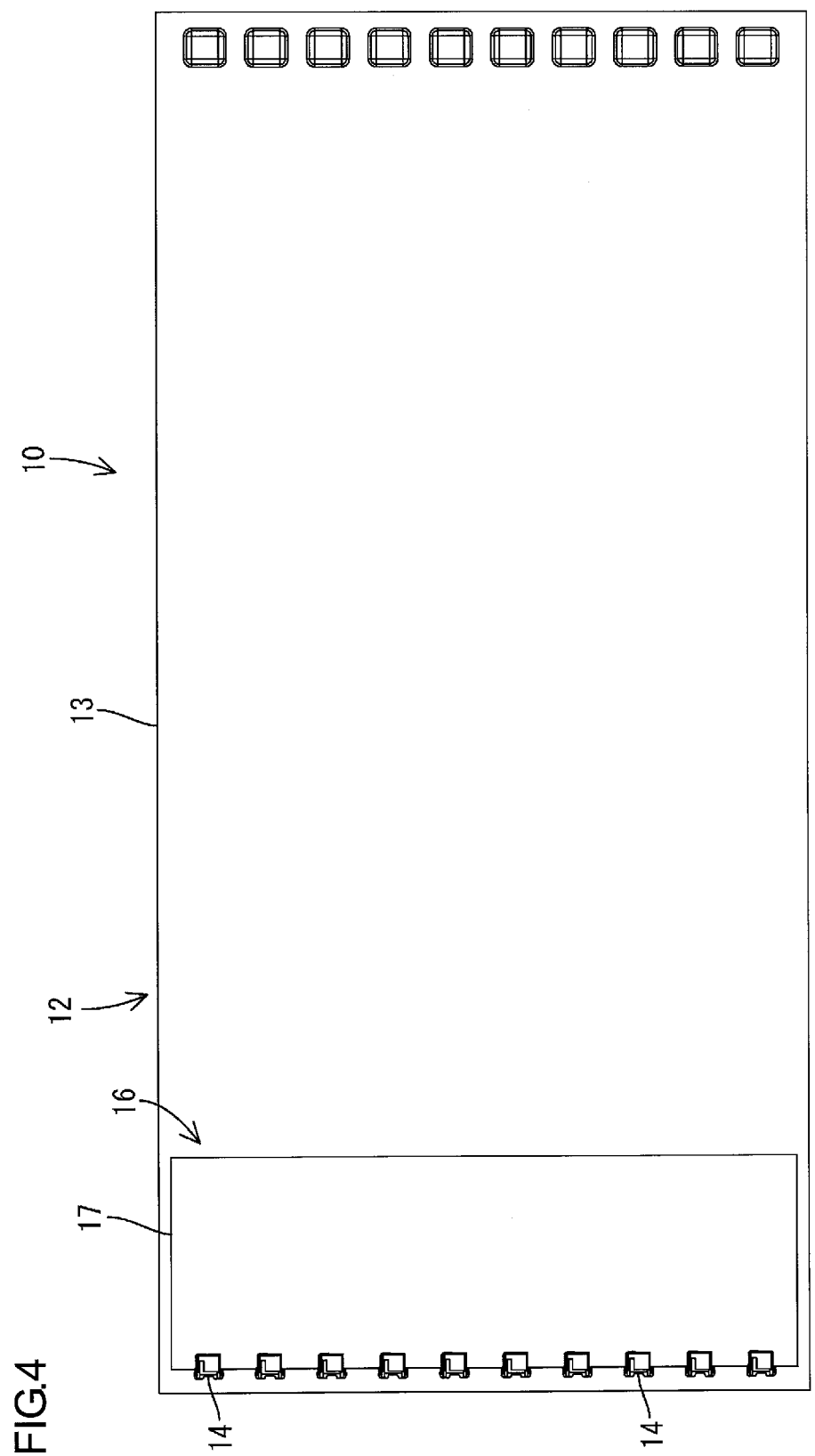
FIG. 4 is a rear view of the lighting device.
Figure 5:
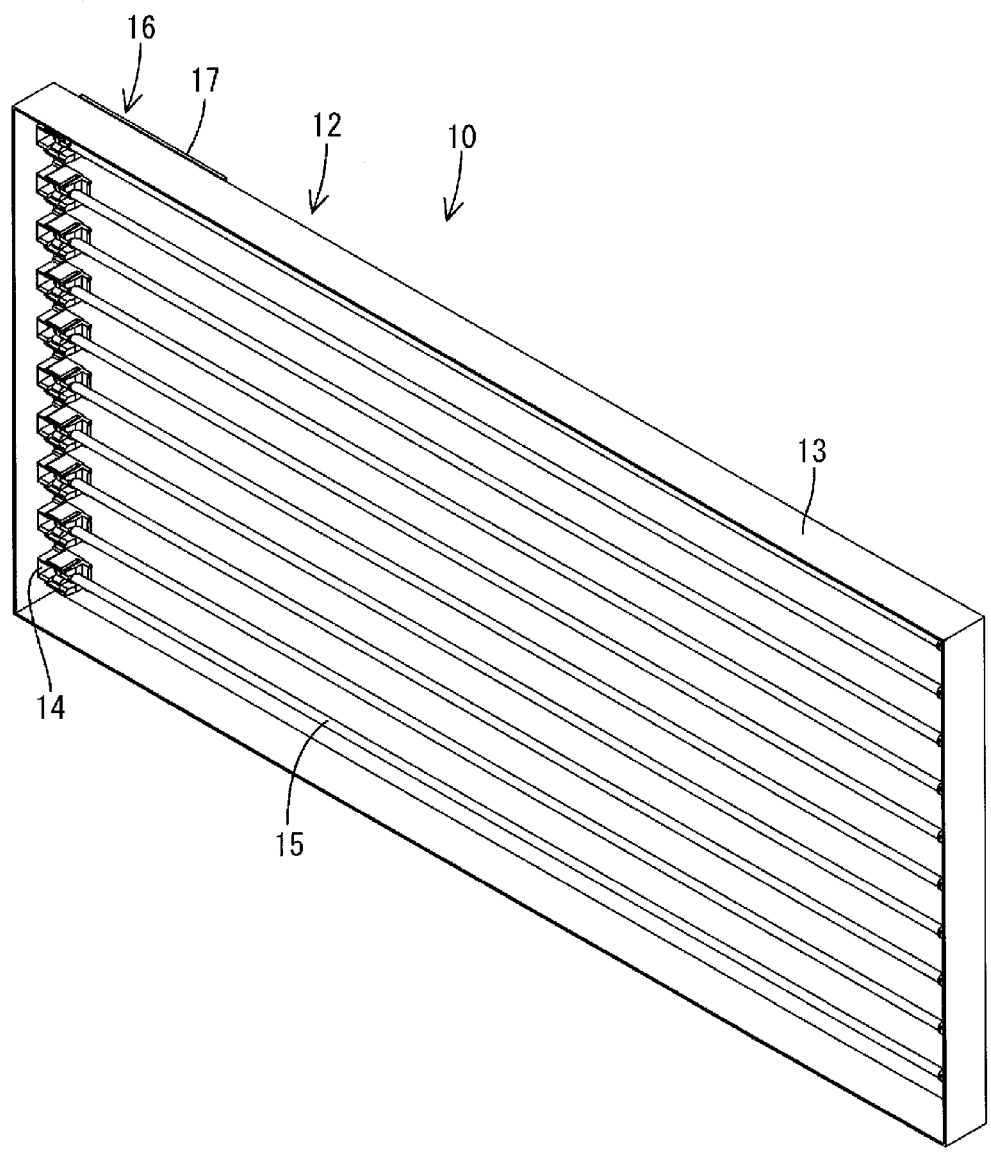
FIG. 5 is a front perspective view of the lighting device.
Figure 6:
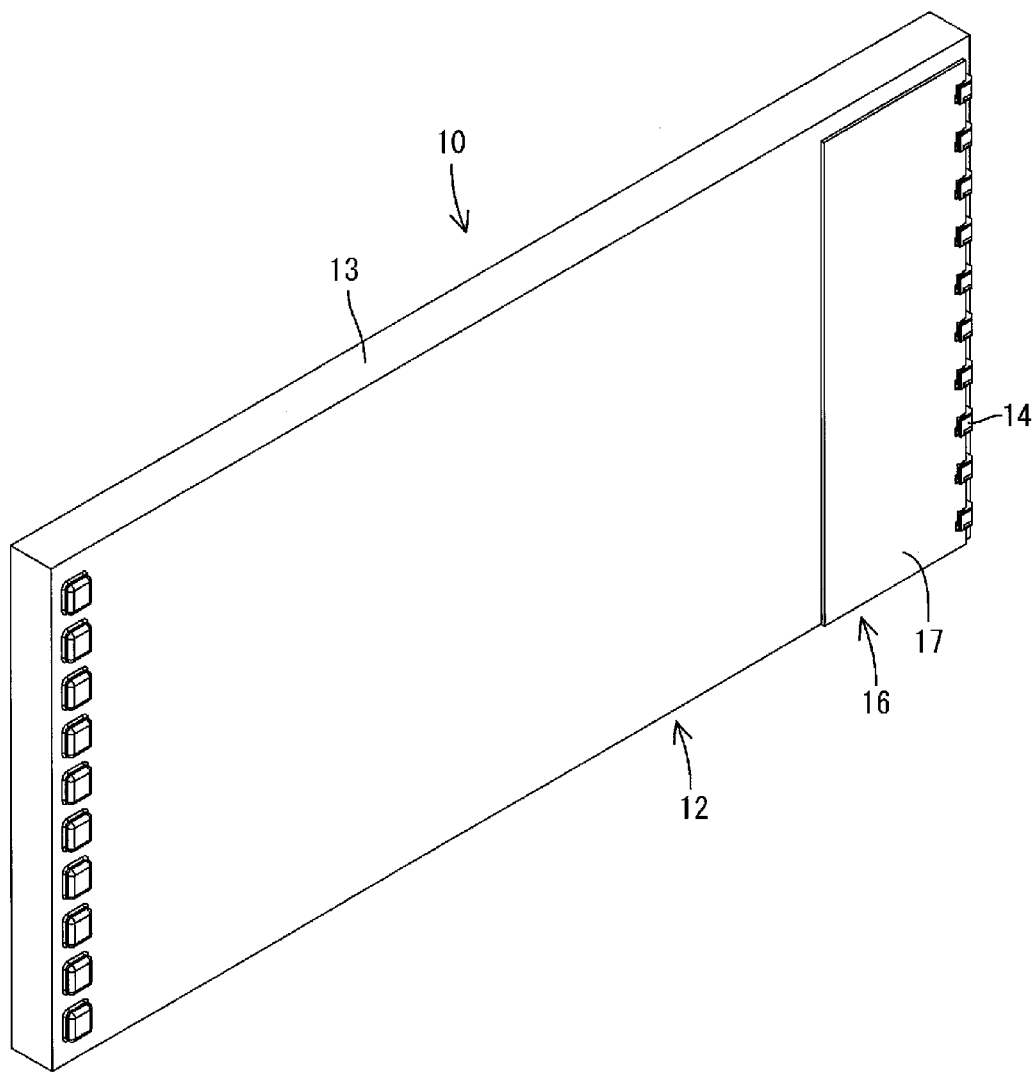
FIG. 6 is a rear perspective view of the lighting device.

The lighting device 10 has configurations illustrated in FIGS. 3 to 6. FIG. 3 is a front view of the lighting device 10. FIG. 4 is a rear view of the lighting device 10. FIG. 5 is a front perspective view of the lighting device 10. FIG. 6 is a rear perspective view of the lighting device 10.

The lighting device 10 includes a lamp unit 12 and a power supply board 16. As illustrated in FIG. 3, the lamp unit 12 includes a metal chassis 13, a plurality of discharge tubes (cold cathode tubes) 15, a plurality of relay connectors 14 and a plurality of grounding terminals 152. The chassis 13 has a landscape rectangular plate-like overall shape and functions as a lamp housing. The discharge tubes 15 are arranged one above the other (in the short-side direction of the chassis 13) and parallel to each other in the chassis 13 on the front side. The relay connectors 14 are arranged one above the other and along one of the side edges of the chassis 13 so as to correspond to the discharge tubes 15. The grounding terminals 152 are arranged one above the other and along the other side edge of the chassis 13 so as to correspond to the discharge tubes 15.

The power board 16 is arranged on the rear surface of the chassis 13. It supplies power to the discharge tubes 15 via the relay connectors 14. A reflector sheet 13a is provided on the inner surface (on the front) of the chassis 13. The chassis 13 has a plurality of mounting holes 13H. The mounting holes are through holes that run from the front to the rear of the chassis 13 and each has a substantially square shape (see FIG. 2). The mounting holes 13H are formed in locations that overlap the ends of the discharge tubes 15. The relay connectors 14 are mounted to the chassis 13 with parts thereof passed through the respective mounting holes 13H provided on the side on which one of the ends of the discharge tubes 15 are located. Mounting members for mounting the grounding members 150 to the chassis 13 are inserted in the mounting holes 13H provided in areas of the chassis 13 corresponding to the other ends of the discharge tubes 15. The grounding members 150 including the grounding terminals 152 are mounted to the chassis 13 via the mounting members.

Relay Connector 14

Figure 8:
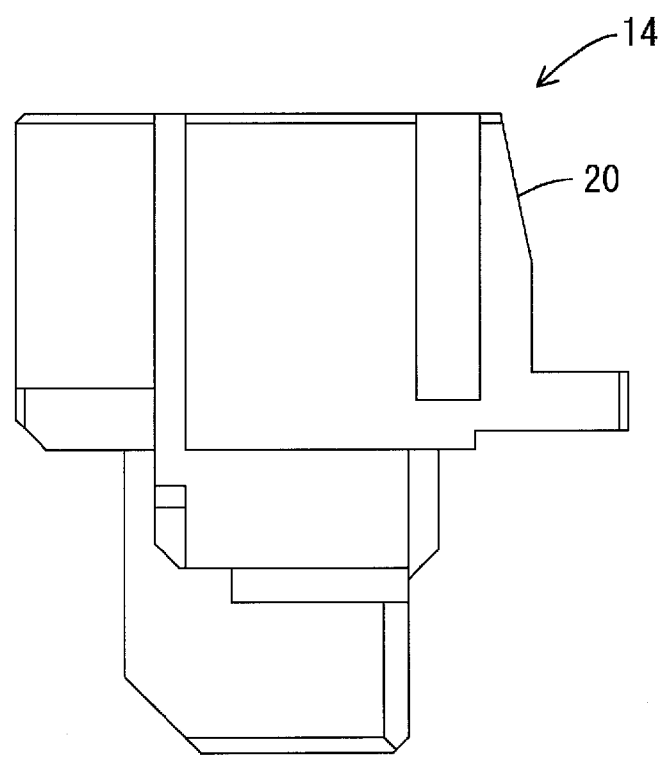
FIG. 8 is a front view of a relay connector.
Figure 9:
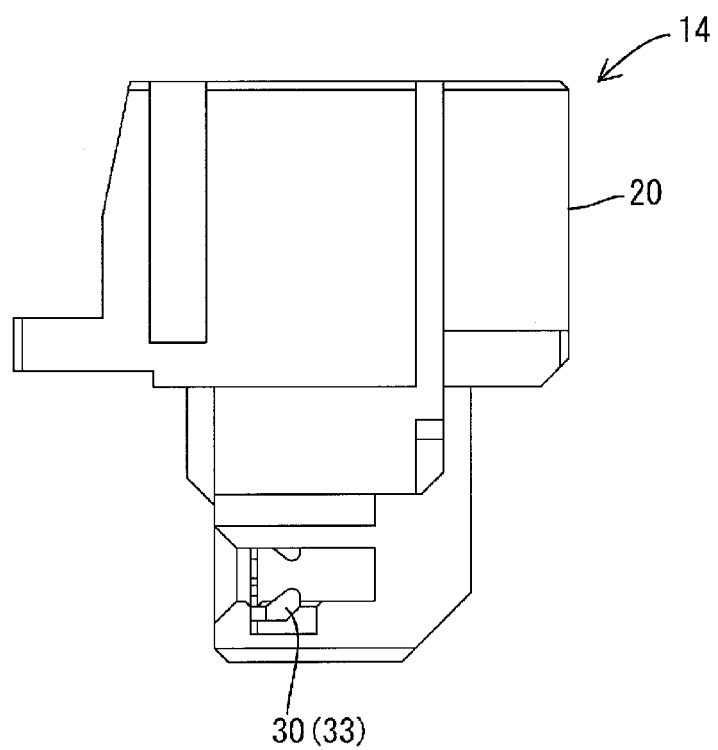
FIG. 9 is a rear view of the relay connector.
Figure 10:
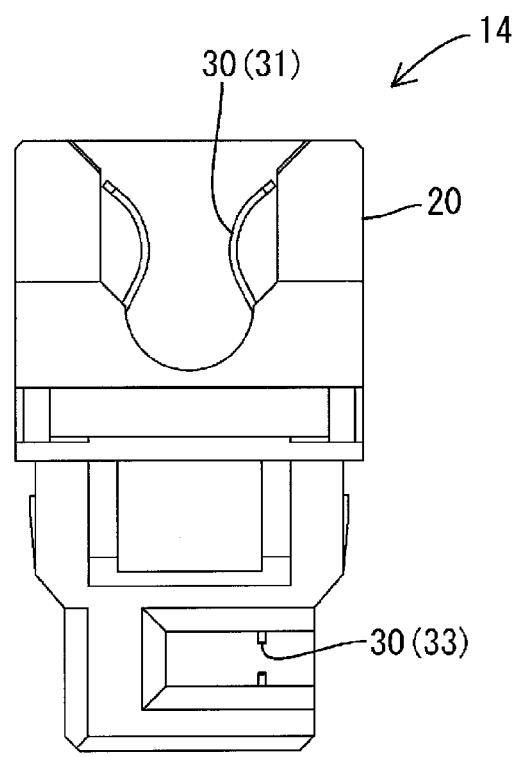
FIG. 10 is a right side view of the relay connector.
Figure 11:
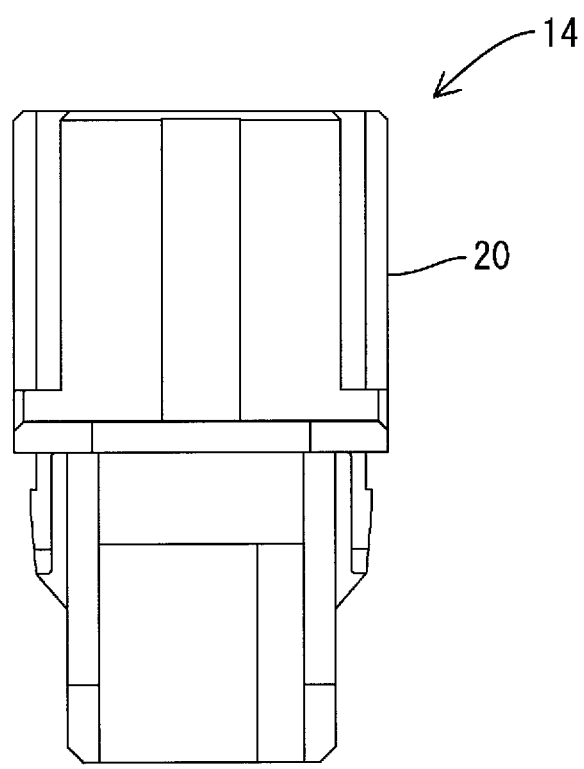
FIG. 11 is a left side view of the relay connector.
Figure 12:
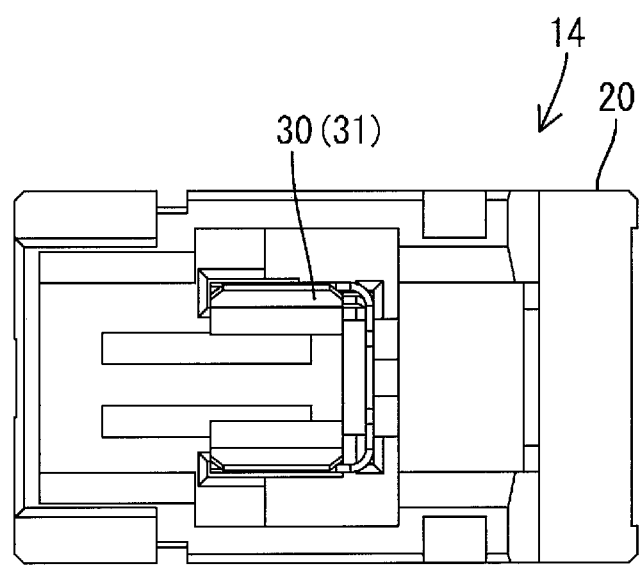
FIG. 12 is a plan view of the relay connector.
Figure 13:
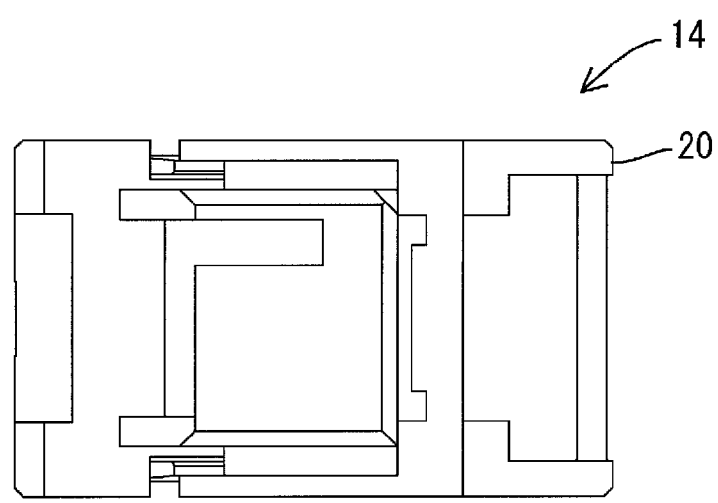
FIG. 13 is a bottom view of the relay connector.
Figure 14:
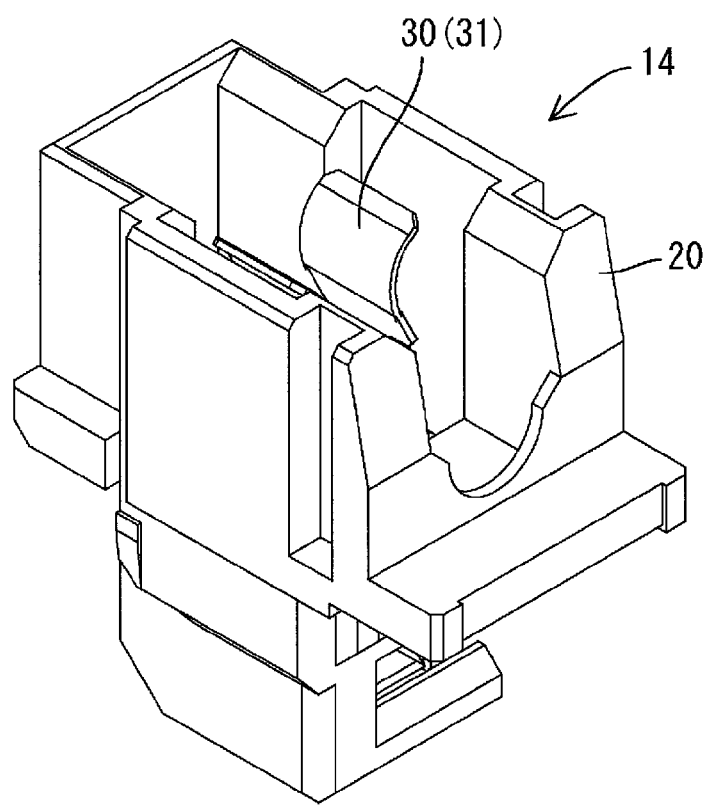
FIG. 14 is a first perspective view of the relay connector.
Figure 15:
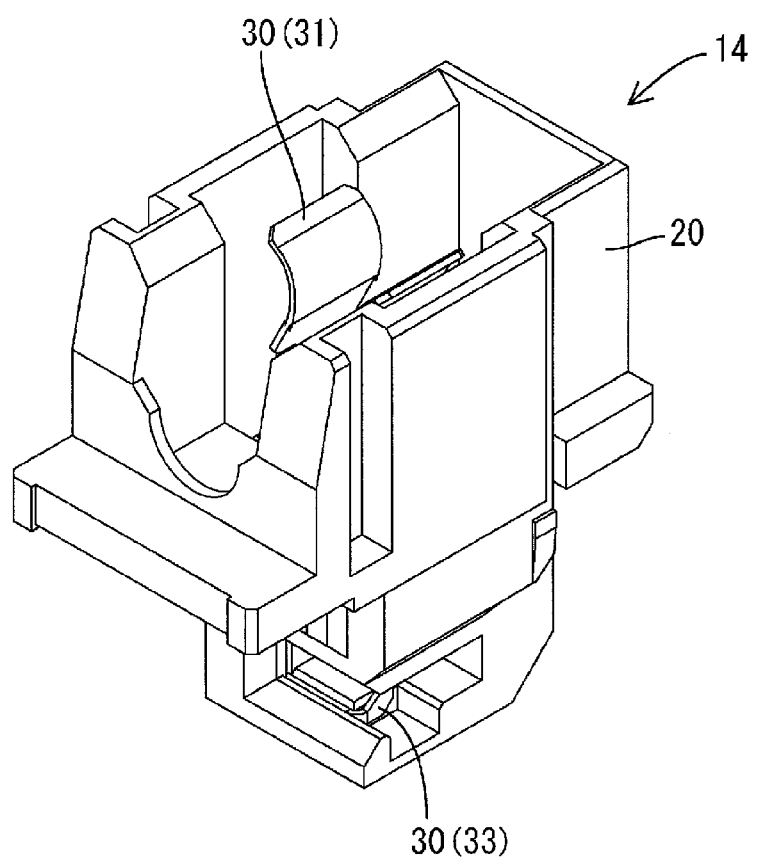
FIG. 15 is a second perspective view of the relay connector.

Each relay connector 14 has configurations illustrated in FIGS. 8 to 15. FIG. 8 is a front view of the relay connector 14. FIG. 9 is a rear view of the relay connector 14. FIG. 10 is a right side view of the relay connector. FIG. 11 is a left side view of the relay connector 14. FIG. 12 is a plan view of the relay connector 14. FIG. 13 is a bottom view of the relay connector 14. FIG. 14 is a first perspective view of the relay connector 14. FIG. 15 is a second perspective view of the relay connector 14.

Each relay connector 14 is inserted in the mounting hole of the chassis 13 and fixed to the chassis 13. Specifically, it includes a synthetic resin holder 20 and a metal relay connector 30 housed in the holder 20. The holder 20 isolates the relay terminal 30 from the chassis 13 and has a structure that enables mounting of the relay connector 14 to the chassis 13. The relay terminal 30 is attached to the holder 20 and electrically connects the discharge tube 15 to the power board 16. It includes a discharge tube connecting portion 31 that is electrically connected to the discharge tube 15 and a power board connecting portion 33 that is electrically connected to the power board 16.

Figure 16:
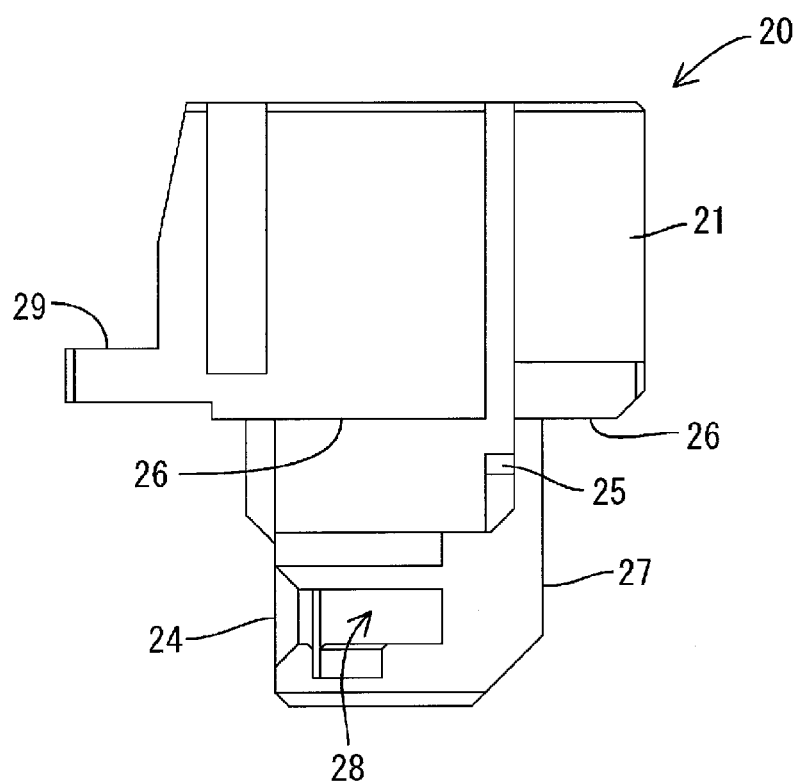
FIG. 16 is a rear view of a holder.
Figure 17:
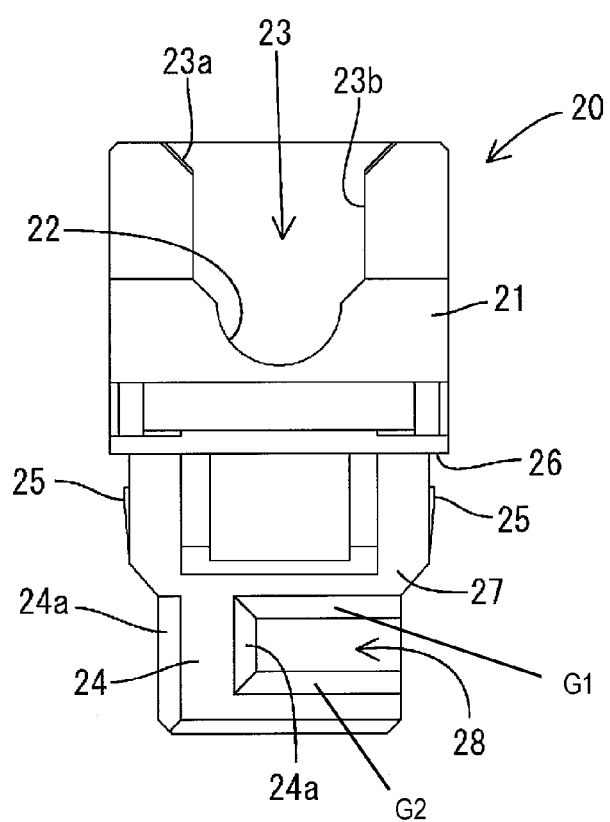
FIG. 17 is a side view of the holder.
Figure 18:
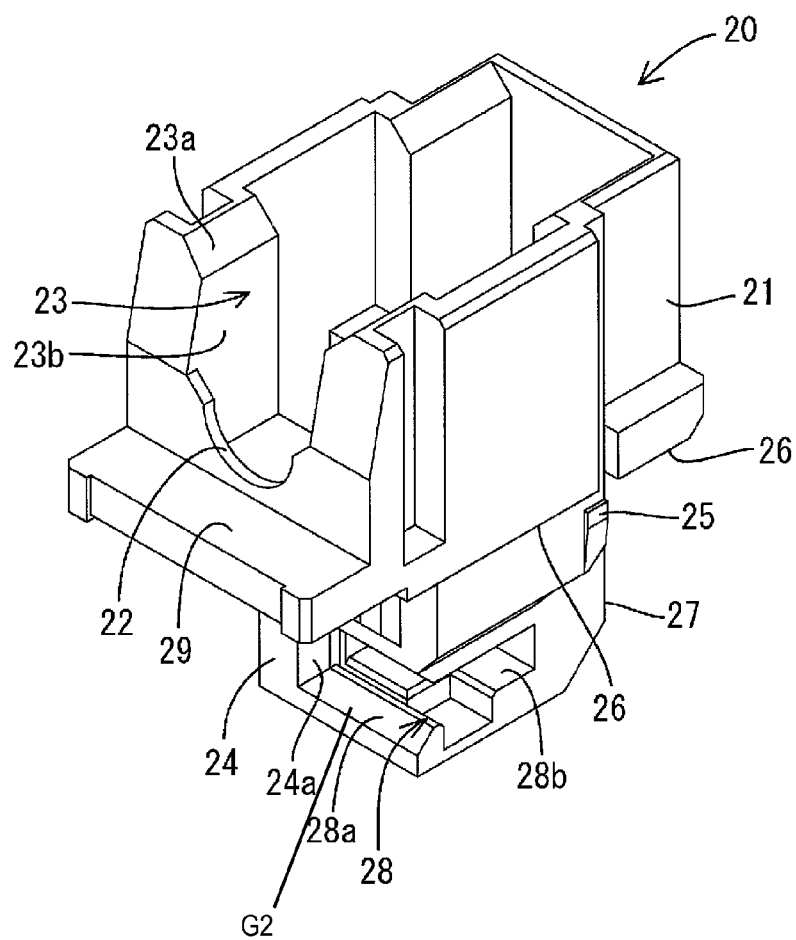
FIG. 18 is a perspective view of the holder.

A configuration of the holder 20 of each relay connector 14 will be explained. FIG. 16 is a rear view of the holder 20. FIG. 17 is a side view of the holder 20. FIG. 18 is a perspective view of the holder 20. The other views of the holder 20 will be explained with reference to FIGS. 8 to 15.

The holder 20 is arranged on the front surface of the chassis 13 (on a side on which the discharge tube 15 is arranged). The holder 20 includes a box portion (a ferrule holding area) 21 and a projecting portion (a power board holding area) 27. The box portion 21 has a block-like overall shape. The projecting portion 27 projects from the back of the box portion 21 so as to be inserted in the mounting hole 13H of the chassis 13. Elastic stoppers 25 provided in a pair in a cantilever structure extend along outer surfaces of the box portion 21 of the holder 20 in the same direction as a mounting direction of the relay connector 14 into the chassis 13. A surface of the box portion 21 facing the chassis 13 includes a pair of stop surfaces 26, a part of which is located on side edge areas of the projecting portion 27. This pair of the stop surfaces 26 is provided parallel to the front surface of the chassis 13. The chassis 13 is sandwiched between the stop surfaces 26 and the elastic stoppers 25. The relay connector 14 (the holder 20) is mounted to the chassis 13 by inserting the projecting portion 27 in the mounting hole 13H. By sandwiching the chassis 13 between the stop surfaces 26 and the elastic stoppers 25, the relay connector 14 (the holder 20) is fixed to the chassis 13.

The box portion 21 includes a holding area 23 that opens in two directions so as to hold the end of the discharge tube 15 (the ferrule 136). An opening on the front side (a side opposite from the display surface when the relay connector 14 is mounted to the chassis 13) is a receiving opening 23a. The receiving opening 23a is provided for fitting the end of the discharge tube 15 (the ferrule 136) into the holding area 23 from the front. An opening on the side is an escape opening 23b configured to avoid interference to the glass tube 134 that could occur when the end of the discharge tube 15 is inserted in the holding area 23. A displacement restricting portion 22 projects inward from the opening edge of the escape opening 23b. A width of gap in the displacement restricting portion 22 is smaller than an inner diameter of a body 137 of the ferrule 136. The box portion 21 further includes a projection 29 that projects from a side surface having the escape opening 23b in a direction parallel to the chassis 13. The projection 29 is formed so as to separate between the escape opening 23b side and the front side of the chassis 13.

The projecting portion 27 has an insertion hole 28 in which a part of the power board 16 (a tab 172) is inserted. Openings 28a and 28b of the insertion hole 28 are formed in surfaces perpendicular to each other. Specifically, a first opening 28a is formed in the surface facing the power board 16, and a second opening 28b is formed in the surface between the adjacent relay connectors 14. The projecting portion 27 includes a holder wall 24 so as to bridge the insertion hole 28. The holder wall 24 has a structure that enables engagement of the holder wall 24 with a part of the power board 16 (a cutout 171). Namely, the holder wall 24 can be inserted in the part of the power board 16. With the engagement, the power board 16 and the holder 20 are positioned and assembled. The tapered portions 24a are provided on the sides of the holder 24. They are tapered so as to guide the power board 16 when it is inserted in the insertion hole 28. At least one of the tapered portions 24a preferably includes a first guide section G1 and a second guide section G2.

Figure 19:
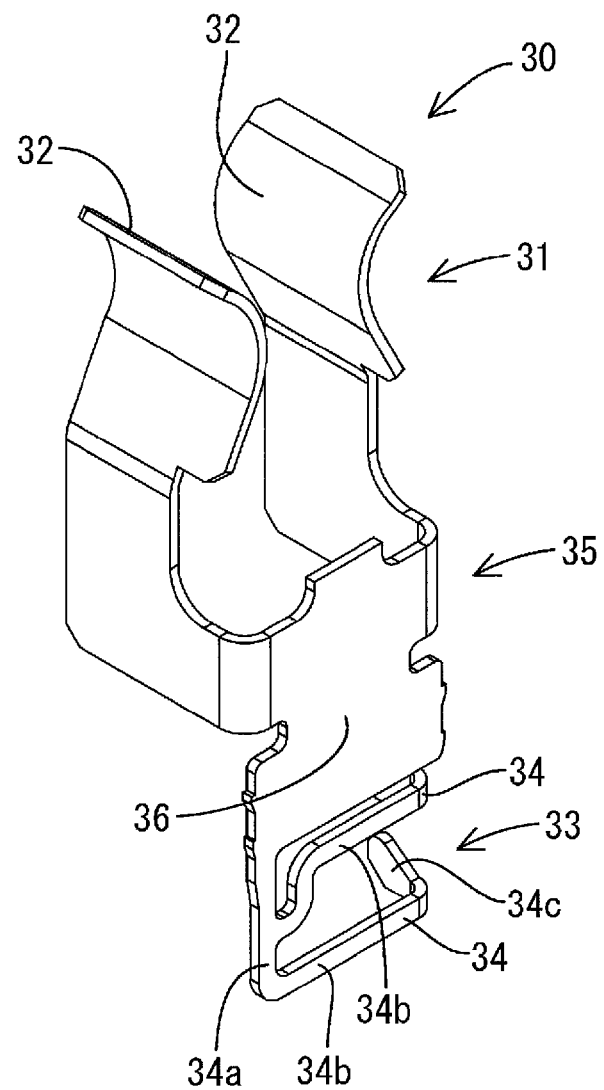
FIG. 19 is a first perspective view of a relay terminal.
Figure 20:
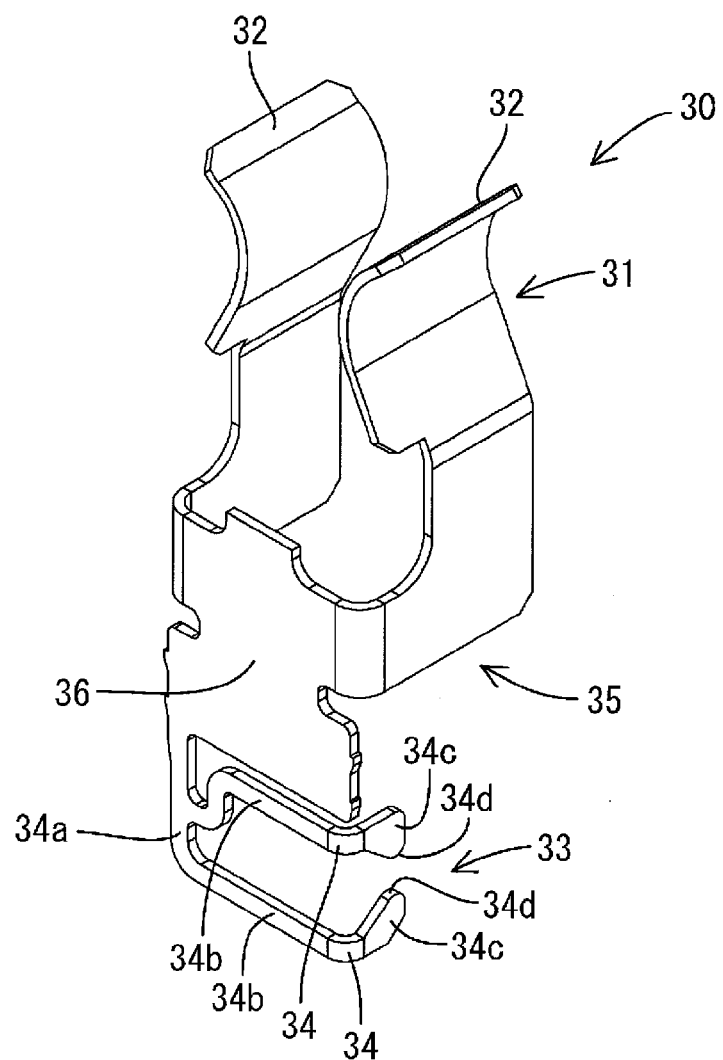
FIG. 20 is a second perspective view of the relay terminal.

Next, the relay terminal 30 of each connector 14 will be explained. FIG. 19 is a first perspective view of the relay terminal 30. FIG. 20 is a second perspective view of the relay terminal 30. Other views of the relay terminal 30 will be explained with reference to FIGS. 8 to 15.

The relay terminal 30 is attached to the holder 20. The relay terminal 30 is prepared by bending a metal plate punched in a predetermined shape. It includes a discharge tube connecting portion 31, a power board connecting portion 33 and an intermediate portion 35. The discharge tube connecting portion 31 includes upper and lower elastic holding pieces 32 that are pieces of plates formed into a substantially arch shape and provided in a pair. The power board connecting portion 33 has a plate-like shape and projects toward the rear of the chassis 13. The intermediate portion 35 is provided between the discharge tube connecting portion 31 and the power board connecting portion 33.

The discharge tube connecting portion 31 holds the end of the discharge tube (the ferrule 136) with the elastic holding pieces 32 by elastic forces. It relays the power supply from the power board 16 to the discharge tube 15. Each elastic holding piece 32 has a cantilever structure extending from an end of the intermediate portion 35 and a plate surface perpendicular to the plate surface of the intermediate portion 35. The elastic holding pieces 32 form a plate-type clip.

The power board connecting portion 33 includes a pair of flexible portions 34 that hold the power board 16 with elastic forces. The flexible portions 34 are formed such that the longitudinal directions thereof cross the longitudinal direction of the discharge tube 15 (at a defined angle, specifically, perpendicular to each other). Specifically, the power board connecting portion 33 includes a base portion 34a, longitudinal portions 34b, 34b and connecting portions 34c. The base portion 34a extends parallel to the plate surface of the intermediate portion 35 toward the power board 16. The longitudinal portions 34b, 34b extend parallel to the plate surfaces of the intermediate portion 35 and the base portion 34a in a direction that crosses the longitudinal direction of the discharge tube 15. The connecting portions 34c, 34 project in the longitudinal direction of the discharge tube 15. The power board 16 is fitted between the flexible portions 34, that is, the circuit board 17 of the power board 16 is fitted between the flexible portions 34. When the conductive portion 173 of the circuit board 17 (see FIG. 7) is in contact with the connecting portions 34c, the relay terminal 30 is electrically connected to the power board 16. The connecting portions 34c have projecting sections 34d, respectively. The projecting sections 34d projects so as to sandwich the power board 16. The ends of the projecting sections 34d come in contact with the conductive section 143 of the power board 16 (see FIG. 7).

The intermediate portion 35 includes a plate member 36 that is placed in the holder 20. The plate member 36 has a plate surface on the same plane as a plane on which long parts of the flexible portions 34 are formed. Namely, the plate member 36 of the intermediate portion 35 has the plate surface on the same plane as the longitudinal portions 34b, 34b of the flexible portions 34.

Figure 21:
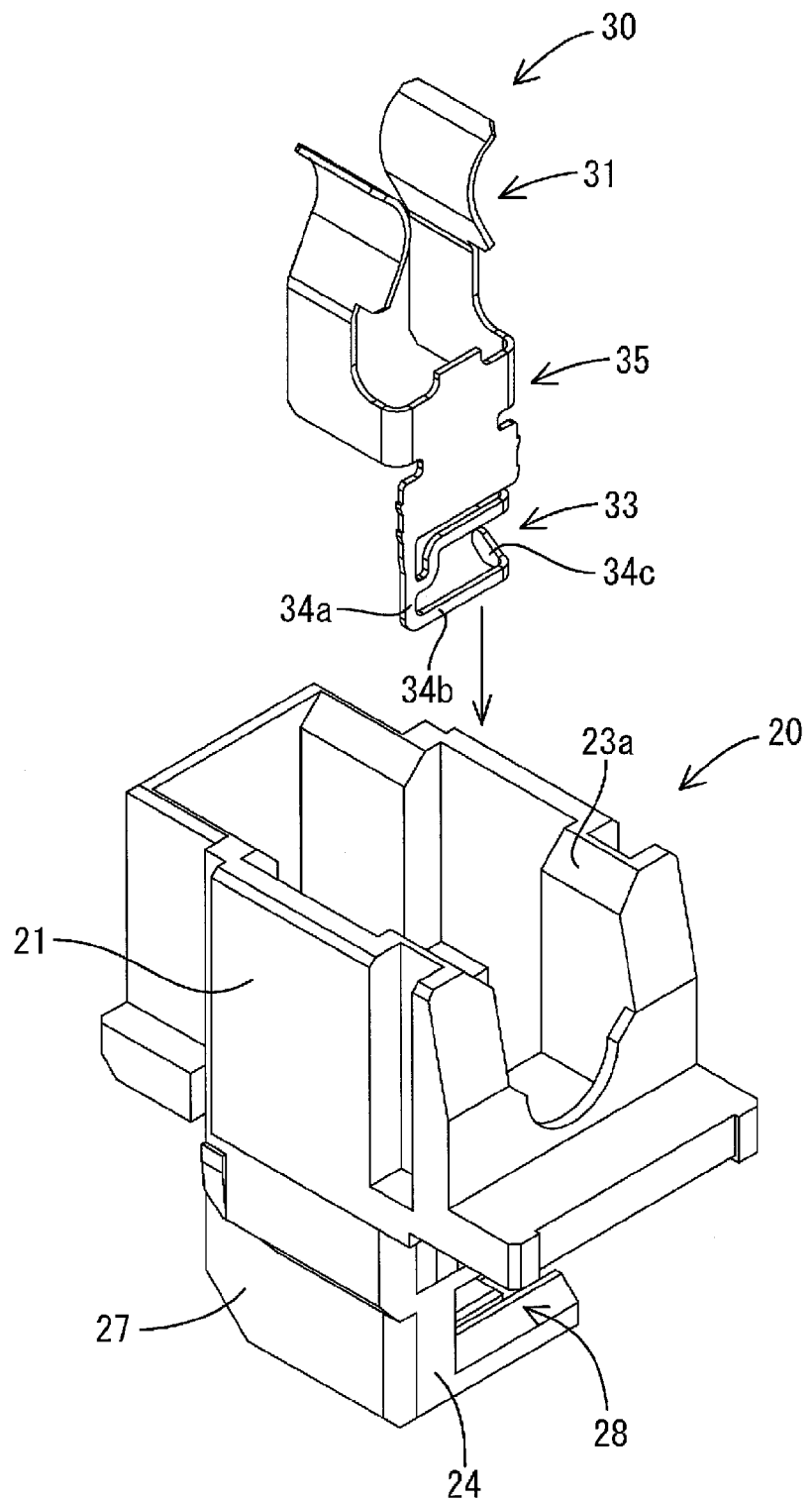
FIG. 21 is a first perspective view illustrating mounting of the relay connector to the holder.
Figure 22:
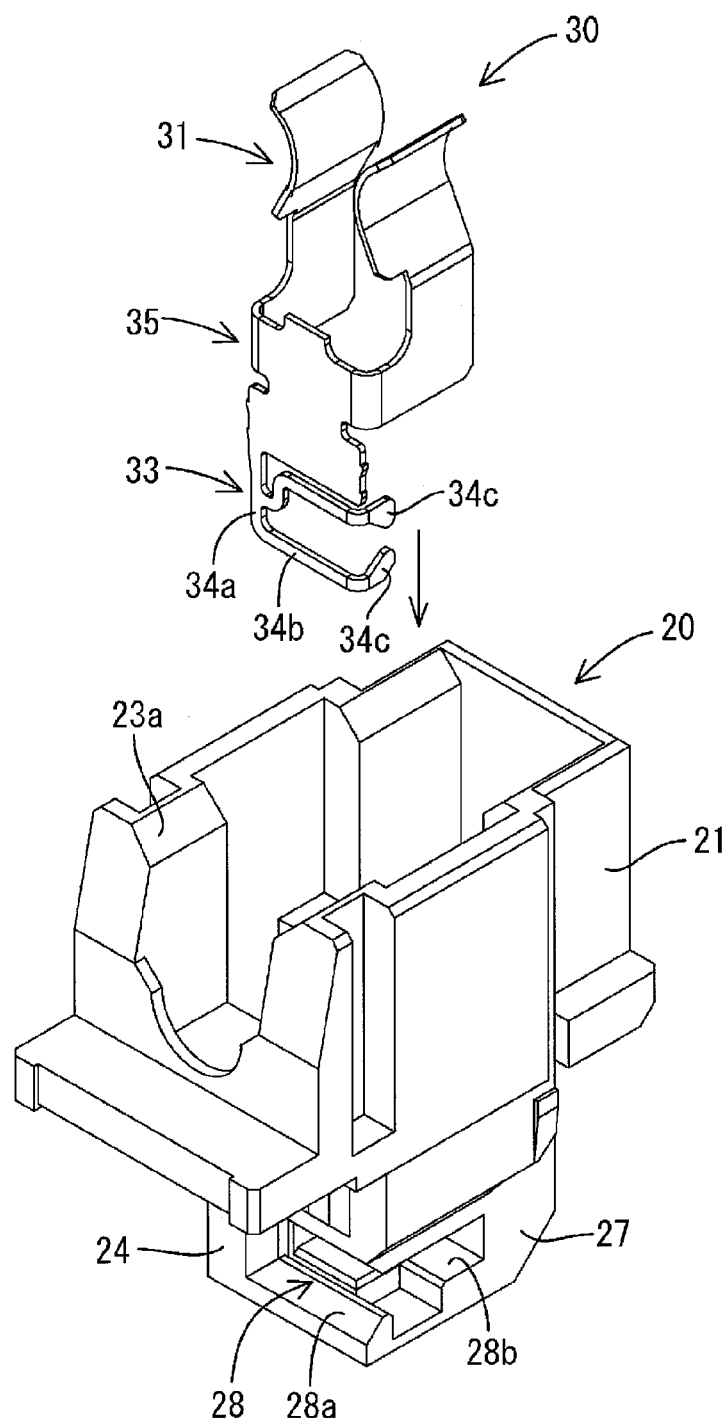
FIG. 22 is a second perspective view illustrating mounting of the relay connector to the holder.

The relay terminal 30 is attached to the holder 20 as illustrated in FIGS. 21 and 22. FIG. 21 is a first perspective view illustrating the attachment of the relay terminal 30 to the holder 20. FIG. 22 is a second perspective view illustrating the attachment of the relay terminal 30 to the holder 20. As illustrated in the figures, the relay terminal 30 is inserted in the holder 20 from the receiving opening 23a for receiving the discharge tube 15 in the direction indicated with an arrow. The relay terminal 30 is oriented in the holder 20 such that the base portion 34a of the power board connecting portion 22 is located on the holder wall 24 side of the holder 20 and the connecting sections 34c, 34 of the flexible portions 34 are located on the second opening 28b side of the insertion hole 28. The relay connector 14 having the flexible portions 34 bared in the insertion hole 28 as illustrated in FIGS. 8 o 15 is prepared.

To mount the relay connector 14 to the chassis 13, the projecting portion 27 of the holder 20 is inserted into the mounting hole 13H from the front side of the chassis 13 until the stop surface 26 comes into contact with an edge of the mounting hole 13H in the chassis 13 on the front side. During the insertion, the elastic stoppers 25 elastically contract and come in contact with the edge of the mounting hole 13H. When the stop surfaces 26 come in contact with the front surface of the chassis 13, the elastic stoppers 25 are passed through the mounting hole 13H and return to original shapes due to the elastic restoring forces. As a result, the stoppers are placed against the edge of the mounting hole 13H on the rear surface of the chassis 13. Parts of the chassis 13 are sandwiched between the stop surfaces 26 and the elastic stoppers 25, and the holder 20 is fixed to the chassis 13 such that the movement thereof in the attachment direction of the holder 20 to the chassis 13 (in a direction in which the mounting hole 13H runs) is restricted. The relay connector 14 is mounted to the chassis 13 in the above condition. When the relay connector 14 is mounted to the chassis 13, the box portion 21 of the holder 20 projects (or is exposed) on the front side of the chassis 13 (it is exposed on that side). The projecting portion 27 of the holder 20 projects (or is exposed) on the rear side of the chassis 13. Moreover, the flexible portions 34 of the relay terminal 30 are formed in directions that cross the longitudinal direction of the discharge tube 15. Especially in this embodiment, the flexible portions 34 extend such that the longitudinal directions thereof are along the rear surface of the chassis 13 and cross the longitudinal direction of the discharge tube 15.

Power Board 16

Figure 7:
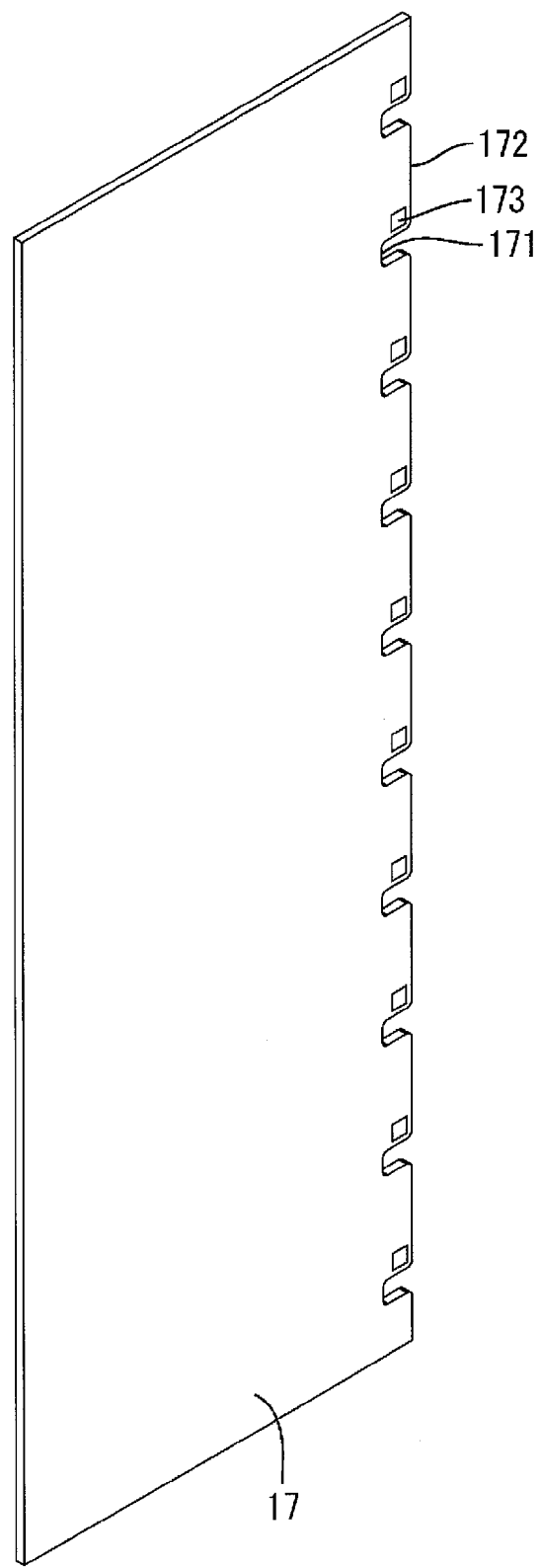
FIG. 7 is a perspective view of a circuit board of a power board.

The power board 16 includes the circuit board 17 as illustrated in FIG. 7. As illustrated in FIG. 2, the power board 16 includes the circuit board 17 and the electronic components 19. On the surface of the circuit board 17 away from the chassis 13, an electronic circuit is formed. The electronic components 19 are mounted on the rear surface of the circuit board 17. The circuit board 17 has a portrait rectangular overall shape. A paper phenolic copper clad laminated board (referred to as a paper phenol) is used for the circuit board 17. The circuit board 17 has the cutouts 171, the tabs 172 and the conductive portions (terminals) 173. The holder walls 24 of the relay connectors 14 (the holders 20) are engaged in the cutouts 171. The tabs 172 are inserted in the insertion holes 28 of the relay connectors 14 (the holder 20) and sandwiched between the flexible portions 34. The conductive portions 173 are provided for transmitting power to the relay terminals 30 of the relay connector 14.

Figure 23:
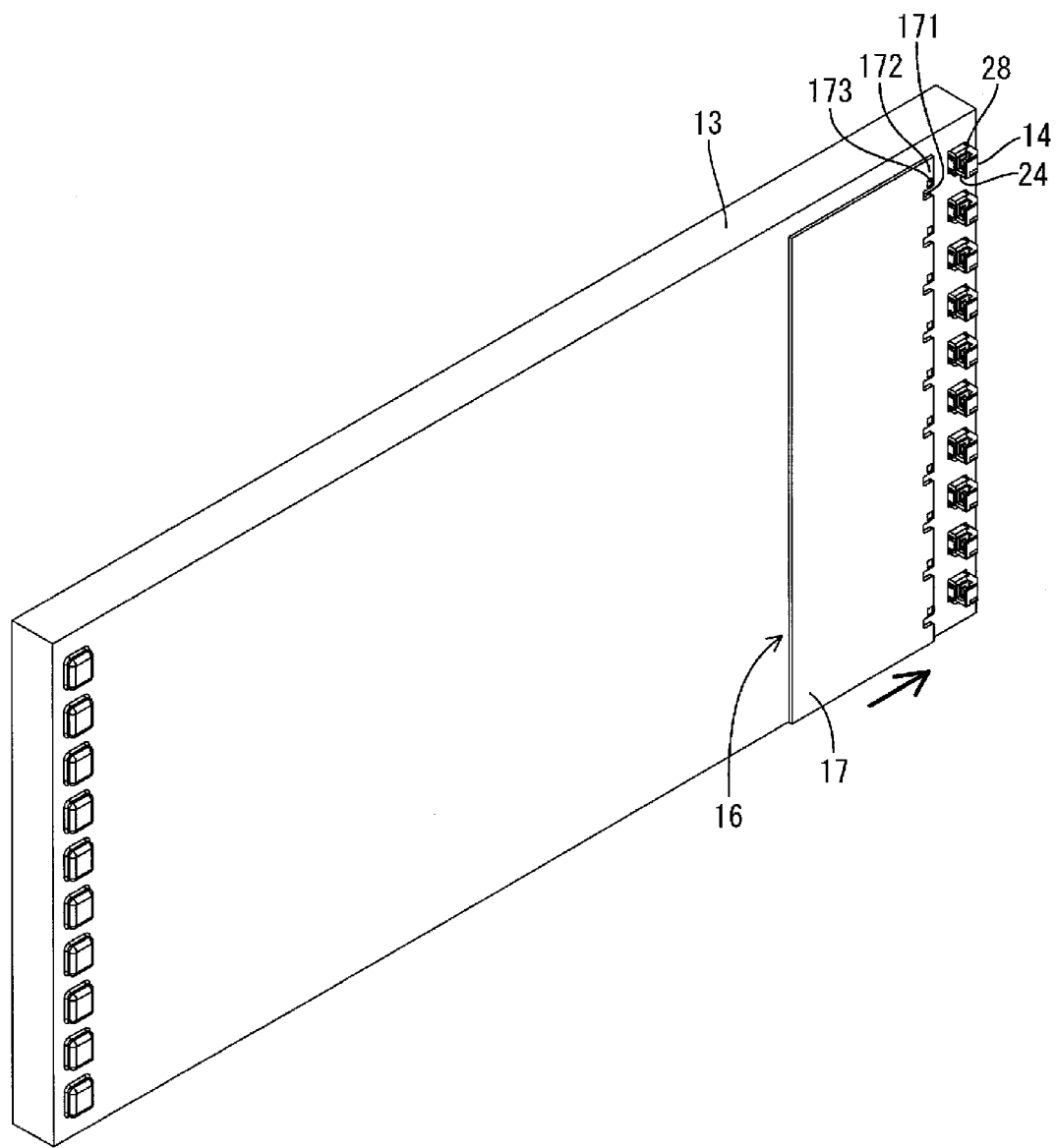
FIG. 23 is an explanatory view illustrating connecting of the circuit board to the relay connector.
Figure 24:
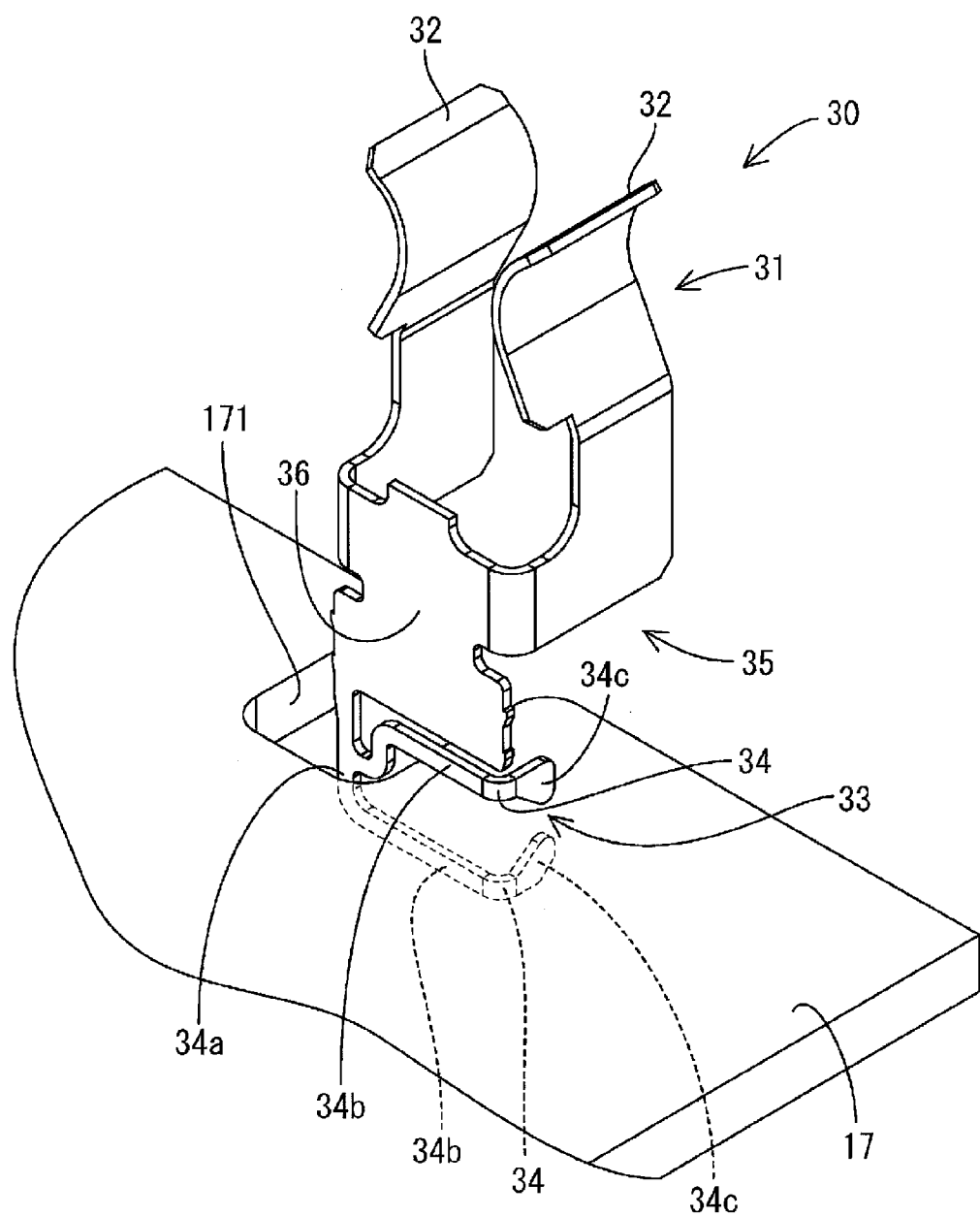
FIG. 24 is an explanatory view explanatory view illustrating a connection between the circuit board and the relay terminal.

The mounting of the power board 16 to the chassis 13, that is, the attachment of the circuit board 17 to the relay connectors 14 will be explained with reference to FIGS. 23 and 24. FIG. 23 is an explanatory view illustrating the attachment of the circuit board 17 to the relay connector 14. FIG. 24 is an explanatory view illustrating a connecting structure between the circuit board 17 and one of the relay terminal 30.

First, the circuit board 17 is positioned with respect to the relay connector 14 such that the holder wall 24 of each holder 20 of the relay connector 14 can be fitted in the corresponding cutout 171 of the circuit board 17. Namely, it is positioned such that the holder wall 24 can be inserted in the cutout 171, and then each tab 172 of the circuit board 17 is inserted in the insertion hole 28 of the holder 20 of the relay connector 14. When each holder wall 24 is fitted in the corresponding cutout 171, the circuit board 17 is sandwiched between the flexible portions 34 of the relay connectors 14. Moreover, the conductive portions 173 of the circuit board 17 face the connecting portions 34c of the flexible portions 34, and come in contact with each other. As illustrated in FIG. 24, the edge of the circuit board 17 extends from the flexible portions 34. Namely, the flexible portions 34 that are high voltage portions are located inside the circuit board 17. The conductive portions 173 are located on the circuit board 17 outside areas that are sandwiched between the flexible portions 34. Namely, they are located off the centers of the respective tap portions 172 in the longitudinal directions of the flexible portions 34.

Discharge Tube 15

Figure 25:
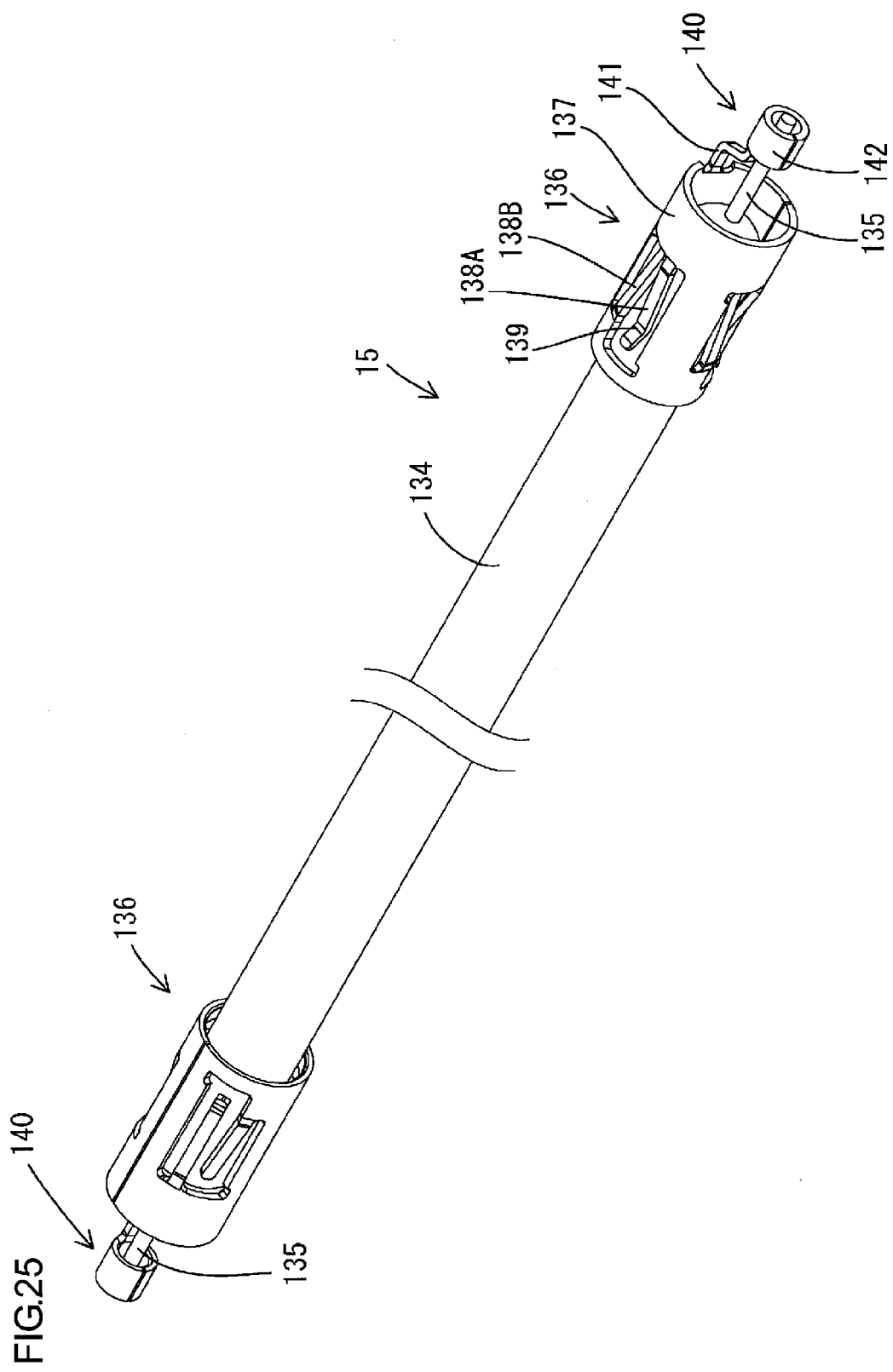
FIG. 25 is a perspective view illustrating an overall structure of a discharge tube.
Figure 26:
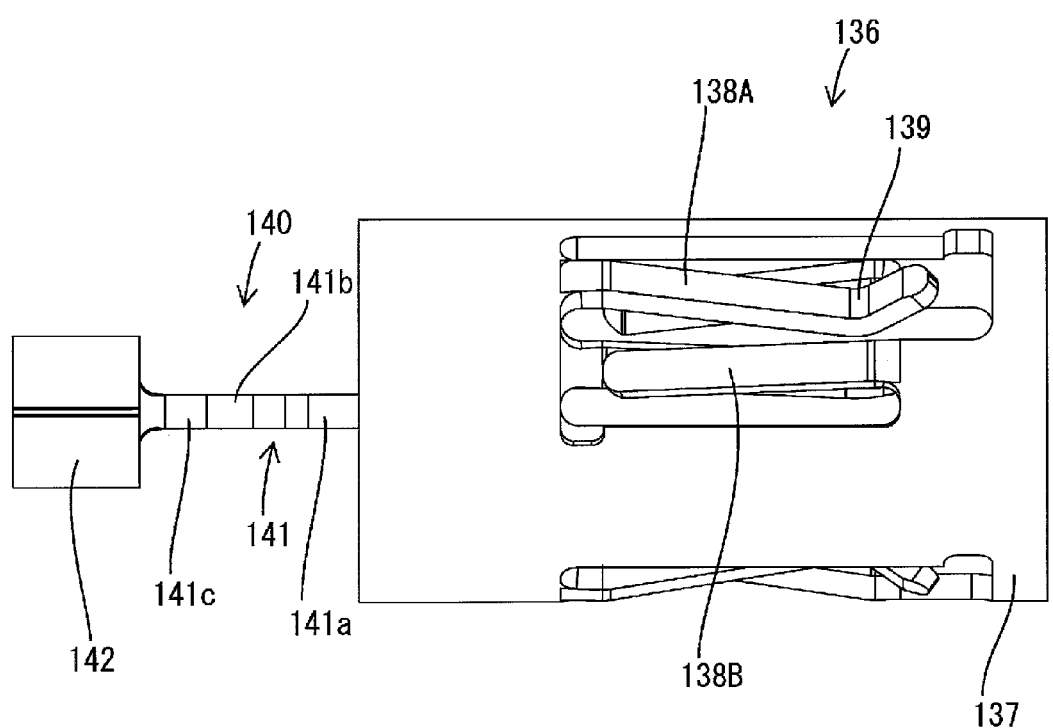
FIG. 26 is a rear view of a ferrule included in the discharge tube.
Figure 27:
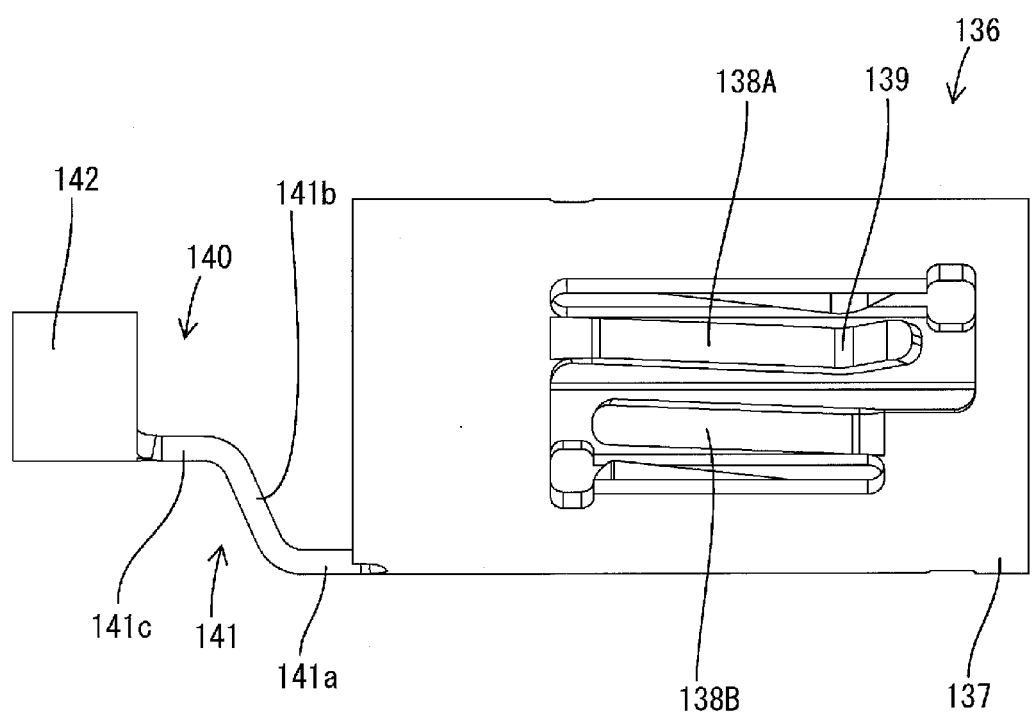
FIG. 27 is a plan view of the ferrule.
Figure 28:
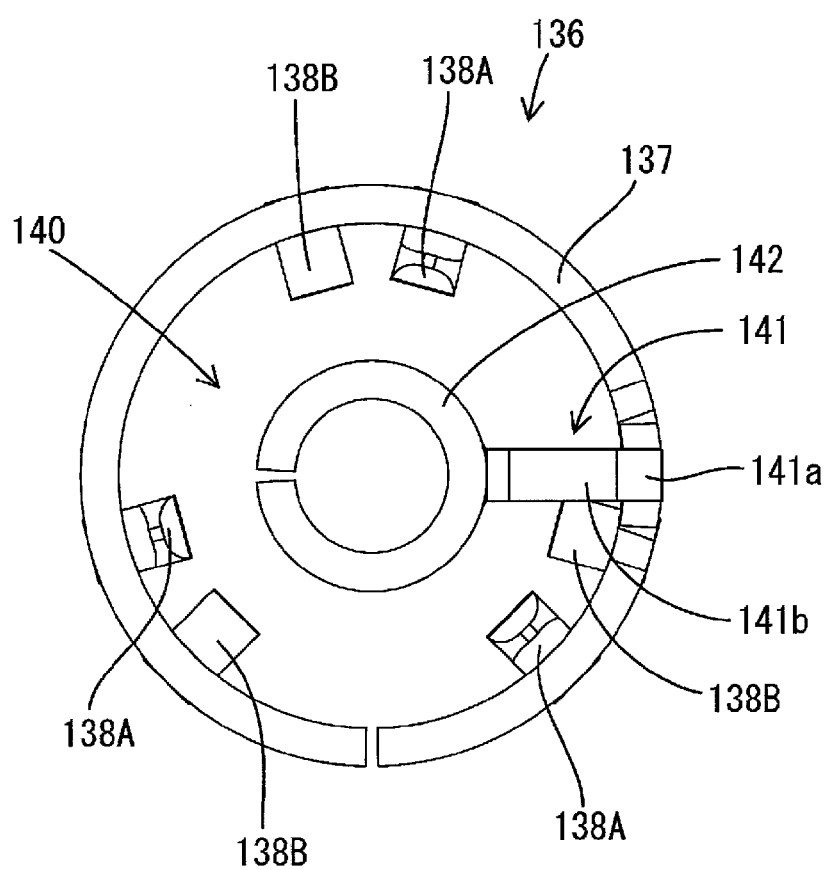
FIG. 28 is a side view of the ferrule.

Each discharge tube 15 is a cold cathode tube and has configurations illustrated in FIGS. 25 to 28. FIG. 25 is a perspective view illustrating an overall structure of the discharge tube 15. FIG. 26 is a rearview of the ferrule included in the discharge tube 15. FIG. 27 is a plan view of the ferrule. FIG. 28 is a side view of the ferrule. The discharge tube 15 in this embodiment includes a glass tube 134, outer leads 135 and the ferrules 136. The glass tube 134 has an elongated overall shape with a round cross section. The outer leads 135 project from respective ends of the glass tube 134 concentrically with the glass tube 134 and linearly. They are made of metal (e.g., nickel-contained or cobalt-contained metal) and have an elongated shape with a round cross section. The ferrules 136 are attached to the respective ends of the glass tube 134. The glass tube 134 encloses mercury therein and ends of the glass tube 134 are formed in dome-like shapes by thermal melting. The outer leads 153 penetrate through the dome-like shape portions.

As illustrated in FIGS. 26 to 28, each ferrule 136 is provided as a single part prepared by bending or hammering a metal plate (e.g., a stainless-steel plate) punched into a predetermined shape. It includes the body 137 and a conductive part 140. The body 137 has a substantially cylindrical overall shape concentric with the glass tube 134. The inner diameter of the body 137 is slightly larger than the outer diameter of the glass tube 134.

The body 137 includes three pairs of flexible holding parts 138A and 138B that are formed by cutting out parts of the body 137 so as to form slits around the flexible holding parts 138A, 138B at an equal angular interval.

The first elastic holding parts 138A of the pair of elastic holding parts 138A and 138B are cantilever parts that extend generally to the rear (specifically, slightly bent inward in the radial direction). They are elastically flexible in the radial direction with base ends (front ends) thereof as supporting points. A tip of each first flexible holding part 138A (rear end) includes a bent portion 139 that is bent outward in the radial direction. A surface of the bent portion 139 located on the outer curved side (i.e., a surface that faces inward) is a contact point that comes into contact with the periphery of the glass tube 134. An imaginary circle that connects contact points of three first elastic holding parts 138A is a circle concentric with the body 137. A diameter of the imaginary circle is smaller than the outer diameter of the glass tube 134 when the first elastic holding parts 138A are in the free state when the first elastic holding parts 138A are not elastically bent.

The second elastic holding part 138B of the pair of elastic holding parts 138A and 138B is provided adjacent to the first holding part 138A in the circumferential direction. An overall structure thereof is a cantilever piece that extends forward, that is, in an opposite direction to the first elastic part 138A (specifically, slightly bent inward in the radial direction). It is elastically flexible in the radial direction with base end (rear end) thereof as a supporting point. A tip of the second elastic holding part 138B is a contact point that comes into contact with the periphery of the glass tube 134. An imaginary circle that connects contact points of three second elastic holding parts 138B is a circle concentric with the body 137. A diameter of the imaginary circle is smaller than the outer diameter of the glass tube 134 when the second elastic holding parts 138B are in the free state when the second elastic holding parts 138B are not elastically bent.

The conductive part 140 extends from a rim of the body 137 in a cantilever manner. The conductive part 140 includes an elongated portion 141 that continues from the font rim of the body 137 and a drum-like portion 142 that projects from a front end (a tip) of the elongated portion 141 further to the front.

The elongated portion 141 includes a base end portion 141a, a middle section 141b and a tip section 141c. The base end portion 141a extends from the body 137 on the same plane with respect to the body 137 and parallel to the axis of the body 137. The meddle section 141b extends from a distal end of the base end portion 141a inward in the radial direction toward the axis of the body 137. The tip section 141c extends from a distal end of the middle section 141b parallel to the axis of the body 137. The drum-like portion 142 continues from a distal end of the tip section 141c. A width of the elongated portion 141 is sufficiently smaller than a length thereof. Therefore, the elongated portion 141 is elastically flexible in the radial direction of the body 137 or in a direction that crosses the radial direction (a direction that crosses a length direction of the elongated portion 141), or elastically twisted around itself as a torsion axis.

The drum-like portion 142 is provided by forming a piece extends from the distal end of the elongated portion 141 and jetties in a horizontal direction into a drum-like shape. It is positioned such that an axis thereof substantially matches the axis of the body 137. The drum-like portion 142 can change a position thereof around the axis or in the radial direction of the ferrule 136 according to the elastic deflection of the elongated portion 141.

Attachment of the Ferrule 136 to the Glass Tube 134

Next, a process of attaching the ferrules 136 to the glass tubes 134 will be explained.

In the process, the glass tube 134 and the ferrules 136 are held by respective holding devices (not shown) and they are brought closely to each other with the axes thereof aligned. Then, the body 137 is fitted onto the glass tube 134. As the glass tube 134 goes into the body 137, the contact points at the distal ends of three pairs of the elastic holding parts 138A, 138B are elastically brought into contact with the periphery of the glass tube 134. As the glass tube 134 goes further into the body 137, the elastic holding ports 138A, 138B rub against the peripheral surface of the glass tube 134 at the contact points. Tips of the outer leads 135 start entering inner spaces of the drum-like portions 142 after passing through the bodies 137. When the holding devices reach predetermined positions, the ferrules 135 and the glass tube 134 are positioned at proper axial locations and the entire peripheries of the tips of the outer leads 135 are surrounded by the drum-like portions 142. The tips of the outer leads 135 do not project from the front edges of the drum-like portions 142 significantly. Namely, they project slightly from the drum-like portions 142, or stay at about the same positions as the front edges of the drum-like portions 142 or within the drum-like portions 142.

Then, the drum-like portions 142 are swaged such that they are deformed to shrink in the radial direction. The swaged drum-like portions 142 and the respective outer leads 135 are fixed together by welding so as to be electrically conductive, and the ferrules 136 and the glass tube 134 are integrated. Then, the assembly is completed and the discharge tube 115 is prepared.

When the ferrules 136 are mounted to the glass tube 134, the body 137 is held concentrically with the glass tube 134 by the elastic holding force provided by three pairs of the elastic holding parts 138A, 138B. As a result, gaps (air layers) are provided between the outer surfaces of the glass tube 134 and the inner surfaces of the bodies 137 in substantially entire peripheral areas of the bodies 137.

Attachment of the Discharge Tube 15 to the Relay Connectors 14

The discharge tubes 15 manufactured in the above process will be attached to the relay connectors 14. For the attachment, each discharge tube 15 is held in a horizontal position and brought close to the front of the chassis 13. Then, the end of the glass tube 134 and the ferrule 136 are fitted into the holding areas 23 of the relay connectors 14 from the front. The elastic pressing pieces 32 are elastically deflected by the bodies 137 of the ferrules 136 so as to open in the vertical direction. After the bodies 137 have passed through the smallest gaps between the elastic pressing pieces 132, the elastic pressing pieces 132 draw the bodies 137 into the back areas of the holding areas 23 with elastic restoring forces thereof and the bodies 137 are brought into contact with the bottoms of the holding areas 23. Then, the attachment of the discharge tube 15 is completed. The other end of the discharge tube 15 is connected to the grounding terminal 152.

Each mounted discharge tube 15 is held by a pair of elastic pressing pieces 132 at the end thereof. The discharge tubes 15 are mounted to the chassis 13 via the relay terminals 30 and the holders 20 that are the mounting bodies of the relay terminals 30. With this configuration, weight of the discharge tubes 15 is only applied to the chassis 13 via the relay connectors 14. The weight of the discharge tubes 15 is not applied to the outer leads 135 as a load. The elastic pressing pieces 32 are in elastic contact with the periphery of the corresponding body 137 and thus each outer lead 135 is electrically connected to the corresponding relay terminal 30 via the ferrule 136.

Grounding Members 150

Figure 29:
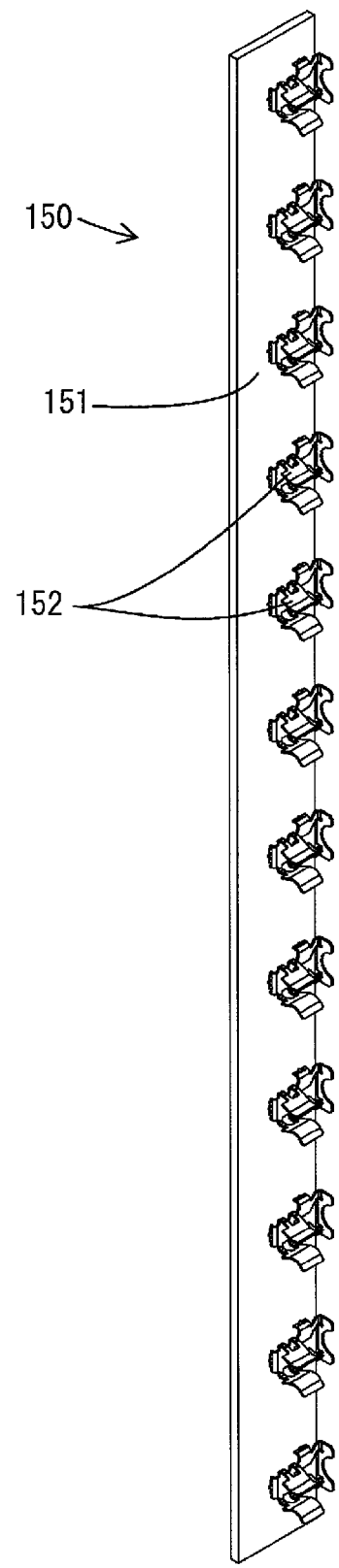
FIG. 29 is a perspective view of a grounding member.
Figure 30:
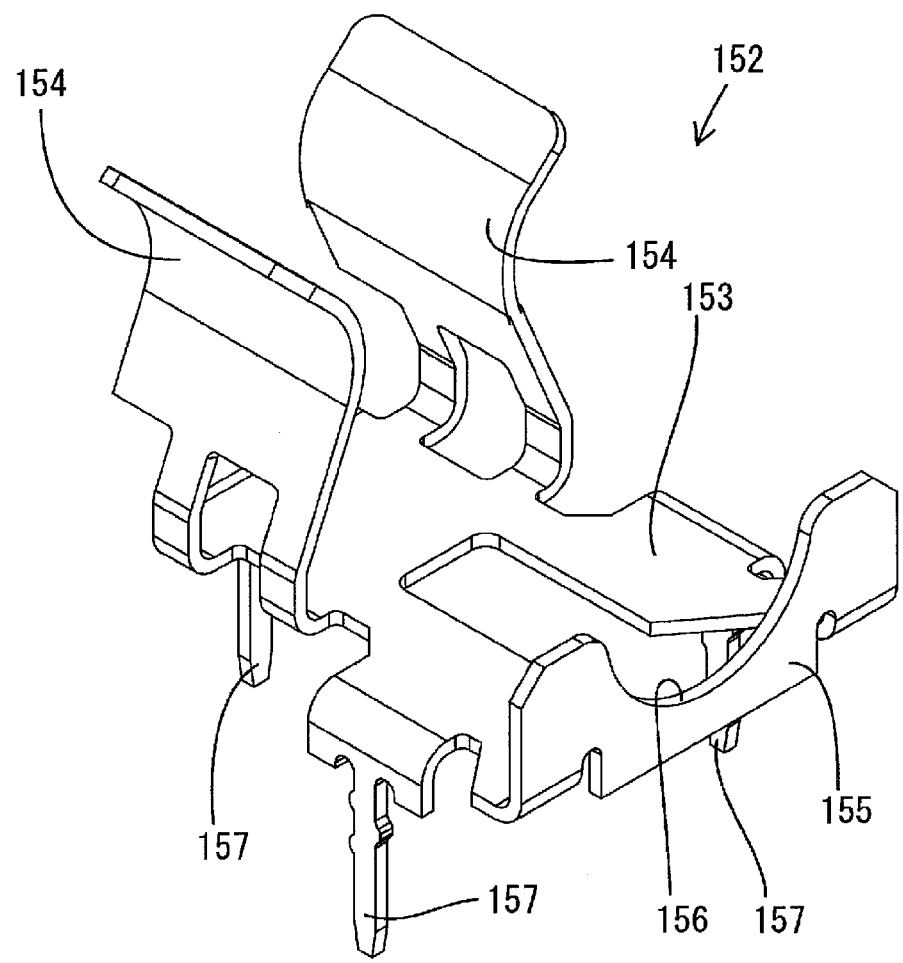
FIG. 30 is a perspective view of a grounding terminal included in the grounding member.
Figure 31:
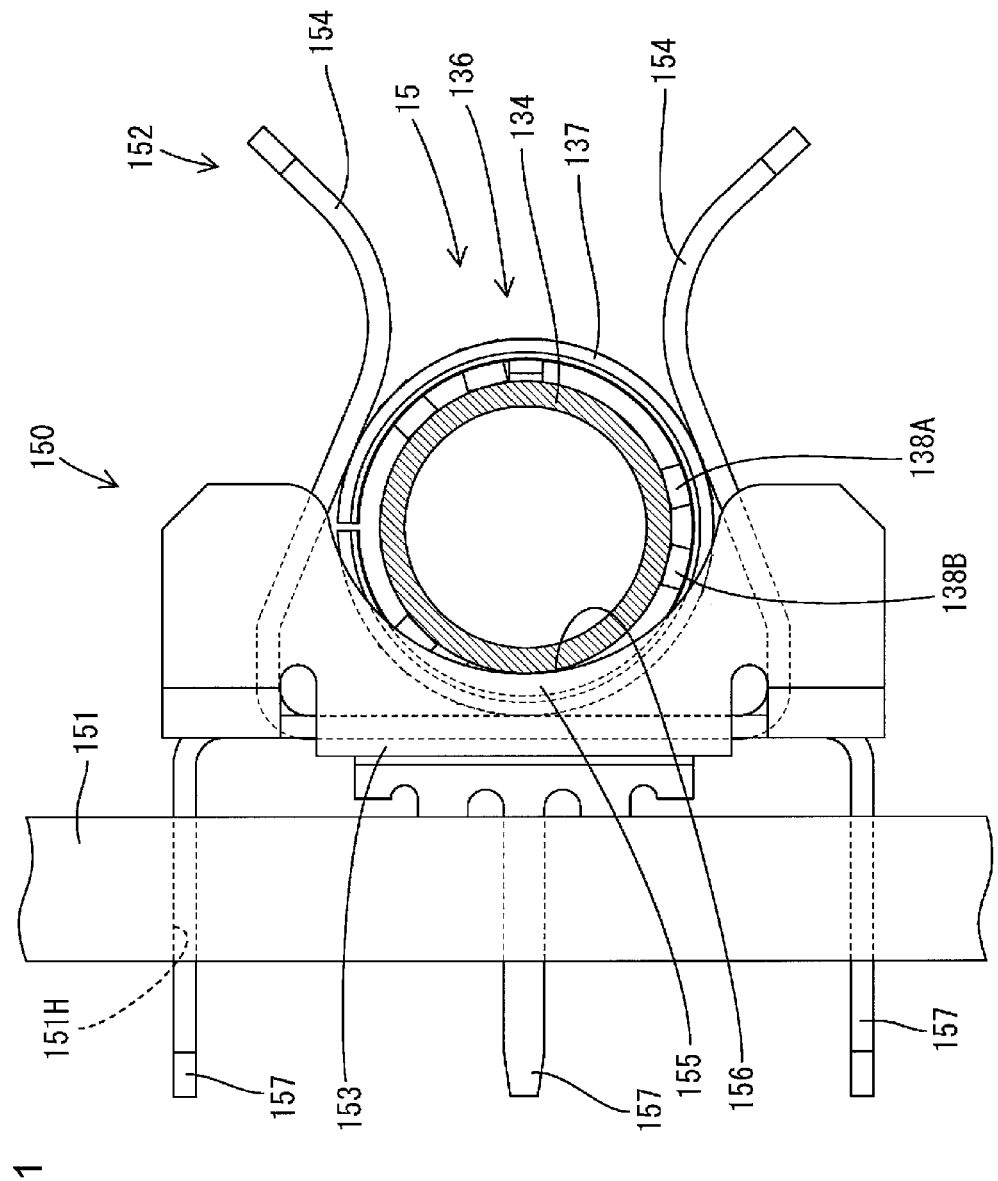
FIG. 31 is a cross-sectional view illustrating the ferrule of the discharge tube held with a stopper.

Each grounding member 150 has a structure illustrated in FIGS. 29 to 31. FIG. 29 is a perspective view of the grounding member. FIG. 30 is a perspective view of the grounding terminal of the grounding member. FIG. 31 is a cross-sectional view illustrating that the ferrule 136 of the discharge tube 15 is placed against the stopper. The grounding member 150 includes an elongated supporting plate 151 and a plurality of the grounding terminals 152. The supporting plate 151 is attached to the chassis 13 along one of the side edges of the chassis 13. The grounding terminals 152 are mounted to the front surface of the supporting plate 151 so as to be electrically conductive. The supporting plate 151 has mounting holes 151H, which are through holes and provided three for each grounding terminal 152 as illustrated in FIG. 31. The supporting plate 151 is a substrate or a metal plate.

As illustrated in FIGS. 30 and 31, each grounding terminal 152 is prepared by bending a metal plate punched in a specified shape. The grounding terminal 152 includes a base portion 153, elastic pressing pieces 154 and a stopper 155. The elastic pressing pieces 154 extend from an upper edge and a lower edge of the base portion 153 to the front, respectively, and are vertically symmetric. The stopper 155 extends from one of side edges of the base portion 153 to the front. The elastic pressing pieces 154 are provided in an area close to a side edge opposite to the edge from which the stopper 155 extends. They are curved so as to bulge toward each other. The elastic pressing pieces 154 are elastically flexible so as to widen a gap between them. The smallest gap between the elastic pressing portions 154 in the free state when the elastic pressing pieces 154 are not elastically bent is smaller than the outer diameter of the glass tube 134 of the discharge tube 15.

The stopper 155 stands from the base portion 153 in a direction perpendicular to the axis of the discharge tube 15, and includes a concave portion 156 that is formed by cutting into a substantially arch shape. In this embodiment, the lengths of the stopper 155 from the base portion 153 at top and bottom ends next to the concave portion 156 are reduced. Therefore, the amount of metal used for the grounding terminals 152 are reduced. The base portion 153 has integrated three legs 157. Two of the three legs 157 are located between the elastic pressing portions 154 and the stopper 155 and project from the upper and the lower edges of the base portion 153, respectively, toward an opposite side (a rear surface side) from the side where the elastic pressing portions 154 and the stopper 155 are provided. The last one of the legs 157 projects from the side edge of the base portion 153 on the opposite side from the side where the stopper is provided and at a middle point between the elastic pressing portions 154 toward the opposite side (the rear surface side) from the side where the elastic pressing portions 154 and the stopper 155 are provided.

Each grounding terminal 152 is not housed in a member such as a synthetic resin housing. The bare grounding terminal 152 is fixed to the supporting plate 151 by passing the legs 157 through the mounting holes 151H and soldering them to the supporting plate 151 so as to be electrically connected (see FIG. 39). With this configuration, a plurality of the grounding terminals 152 mounted to a single supporting plate 151 are electrically connected to each other via the holding plate 151. The grounding member 150 is not connected to the power supply board and the supporting plate 151 is connected to the chassis so as to be electrically connected.

Attachment of Discharge Tube 15 to Grounding Terminal 152

To attach each discharge tube 15 to the grounding terminal 152, the discharge tube 15 is held in the horizontal position and brought closer to the front of the chassis 13. Then, the end of the glass tube 134 and the ferrule 136 are fitted between the upper and the lower elastic pressing pieces 154 from the front. The elastic pressing pieces 154 are elastically deflected by the body 137 of the ferrule 136 so as to further open in the vertical direction. After the body 137 has passed through the area in which the gap between the elastic pressing portions 154 is the smallest, the elastic pressing pieces 154 draw the body 137 into the back area of the base portion 153 side with elastic restoring forces thereof and the body 137 is brought into contact with the bottom of the base portion 153. Then, the mounting of the discharge tube 15 is completed. The other end of the discharge tube 15 is mounted to the relay connector 14 as described above.

The mounted discharge tube 15 is held by the relay connector 14 and the grounding member 150 at the ends thereof. Because the elastic pressing pieces 32, 154 are elastically in contact with the peripheries of the bodies 137 of the respective ferrules 136, the outer leads 135 are electrically connected to the relay terminal 30 and the grounding terminal 152, respectively, via the ferrules 136.

Functions and Effects of First Embodiment (1) In this embodiment, each relay connector 14 includes the holder 20 and the relay terminal 30. The holder 20 has insulation properties and mounted to the chassis 13. The relay terminal is attached to the holder 20 and electrically connected to the discharge tube 15 and the power board 16. Namely, the relay terminal 30 is not in direct contact with the chassis 13. Therefore, the chassis 13 can be made of metal to prevent or reduce electrical leaks or electrical shock hazards.

(2) A part of each holder 20 is passed through the mounting hole 13H of the chassis 13. The outer surfaces of the holder 20 have the elastic stoppers 25 and the stop surfaces 26. The elastic stoppers 25 are formed substantially parallel to the direction in which the mounting hole 13H runs so as to be elastically deformable. The stop surfaces 26 are substantially perpendicular to the direction in which the mounting hole 13H runs. Parts of the chassis 13 are sandwiched between the elastic stoppers 25 and the stop surfaces 26. As a result, the holder 20 is fixed to the chassis 13. Each relay connector 14 is mounted to the chassis 13 only by inserting the part of the holder 20 in the mounting hole 13H.

(3) Each discharge tube 15 and the corresponding discharge tube connecting portion 31 of the relay terminal 30 are connected with each other in the holding area 23 and electrically connected to each other. Therefore, the connection between the discharge tube 15 and the relay terminal 30 are less likely to receive interference from foreign substances.

(4) Each relay terminal 30 includes a pair of the flexible portions 34 that makes electrical connection to the power board 16. The flexible portions 34 are formed such that the longitudinal direction thereof crosses the longitudinal direction of the discharge tube 15, specifically, so as to be perpendicularly to each other. Namely, the flexible portions 34 are not parallel to the longitudinal direction of the discharge tube 15. With this configuration, the size of the holder 20 measures along the longitudinal direction of the discharge tube 15 can be reduced in comparison to a case that the elastic portions are formed along the longitudinal direction of the discharge tube. Furthermore, the high voltage portion along the longitudinal direction of the elastic portions 34 is formed along the longitudinal direction of the discharge tube 15. Therefore, the area of the high voltage portion of the discharge tube 15 can be reduced in the longitudinal direction. The direction that crosses (or perpendicular to) the longitudinal direction of the discharge tube 15 corresponds to the parallel arrangement direction of the discharge tube 15. Namely, the relay connectors 14 (the relay terminals 30) are arranged parallel to each other. The high voltage portions are continuously formed along the parallel arrangement direction. Even when the longitudinal direction of the flexible portions 34 is set in the direction that crosses (or perpendicular to) the longitudinal direction of the discharge tube 15, the high voltage areas do not increase. Because the sizes of the holders 20 measure along the longitudinal direction of the discharge tubes 15 and the high voltage areas decrease, the outer areas (i.e., the frame areas) of the lighting device 10 do not increase. The high voltage areas in the outer areas of the display device D do not increase and thus those of the television receiver TV do not increase. Therefore, the non-display areas (i.e., the frame areas) do not increase and thus the display area can be increased.

(5) The intermediate portion 35 of each relay terminal 30 includes the plate member 36 on the same plane as a plane on which the long parts of the flexible portions 34 are formed. Namely, the intermediate portion 35 is formed in a plate shape. The plate surface thereof is set along the longitudinal direction of the flexible portions 34 and on the same plane as the plate surface of the flexible portions 34. With this configuration, the size of the intermediate portion 35 and the flexible portions 34 can be minimized. By providing such an intermediate portion 35 having a plate shape in the holder 20, the simple configuration can be achieved in comparison to a case that the intermediate portion has a bend. Furthermore, a gap between the intermediate portion and the holder 20 can be minimized. Therefore, problems related to particles that enter the holder 20 from the power board 16 side to the discharge tube 15 side via the relay connector 14 are less likely to occur.

(6) The flexible portions 34 of each relay terminal 30 sandwich apart of the power board 16 therebetween and electrically connected to the power board 16. The edge portions of the power board 16 are located outer side than the flexible portions 34. In comparison to a case that the flexible portions sandwich the edge portion of the power board, the power board 16 is more reliably held with the flexible portions 34. This provides more reliable electrical connections between the power board 16 and the relay terminals 30. The high voltage portions are located within the power board 16. Namely, the high voltage portions are not located at edges of the lighting device 10 (or the power board 16). Therefore, the electrical leaks or the electrical shock hazards are less likely to occur.

(7) Each holder includes the holder wall 24 that engages with the power board 16. The power board 16 has the cutouts 171 in which the holder walls 24 are engaged. When the holder walls 24 and the cutouts 171 engage, parts of the power board 16 are sandwiched between the flexible portions 34. With this configuration, the power board 16 is easily positioned and direct positioning of the power board 16 with respect to the flexible portions 34 is not required. Therefore, problems related to the flexible portions 34 that are thinner than the holders 20 (or the holder walls 24) being bent are less likely to occur.

(8) Each holder 20 has the insertion hole 28 for receiving a part of the power board 16. The insertion hole 28 has the openings 28a and 28b on the planes perpendicular to each other. The holder wall 24 bridges the insertion hole 28. With this configuration, the holder walls 24 and the cutouts 171 of the power board 16 are easily engaged because the insertion of the parts (or the tabs 172) of the power board 16 into the insertion holes 28 acts as a guide.

(9) Each holder wall 24 has the tapered portion 24a that is tapered so as to guide the insertion of the part of the power board 16 into the insertion hole 28. Therefore, the parts (or the tabs 172) of the power board 16 are easily inserted into the insertion holes 28 and thus the holder walls 24 are further easily engaged in the cutouts 171 of the power board 16.

Second Embodiment

Next, the second embodiment of the present invention will be explained with reference to FIGS. 32 to 35. In this embodiment, different discharge tubes and configuration for supporting the discharge tubes from the first embodiment are used. Other configurations are the same as the first embodiment. The same parts as those in the first embodiment are indicated by the same symbols. The same structures, functions and effects will not be explained.

Figure 32:
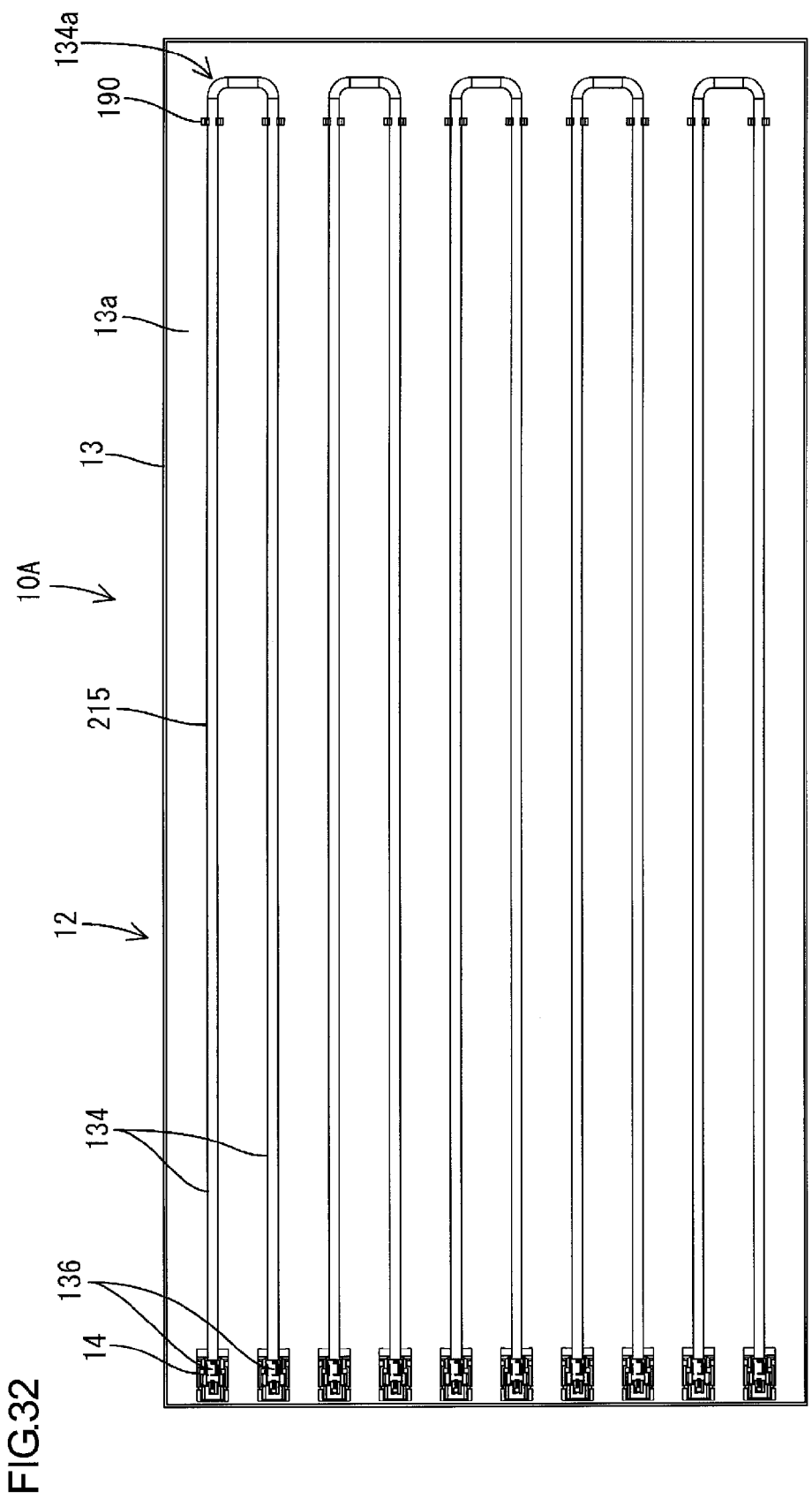
FIG. 32 is a front view of a lighting device according to the second embodiment.
Figure 33:
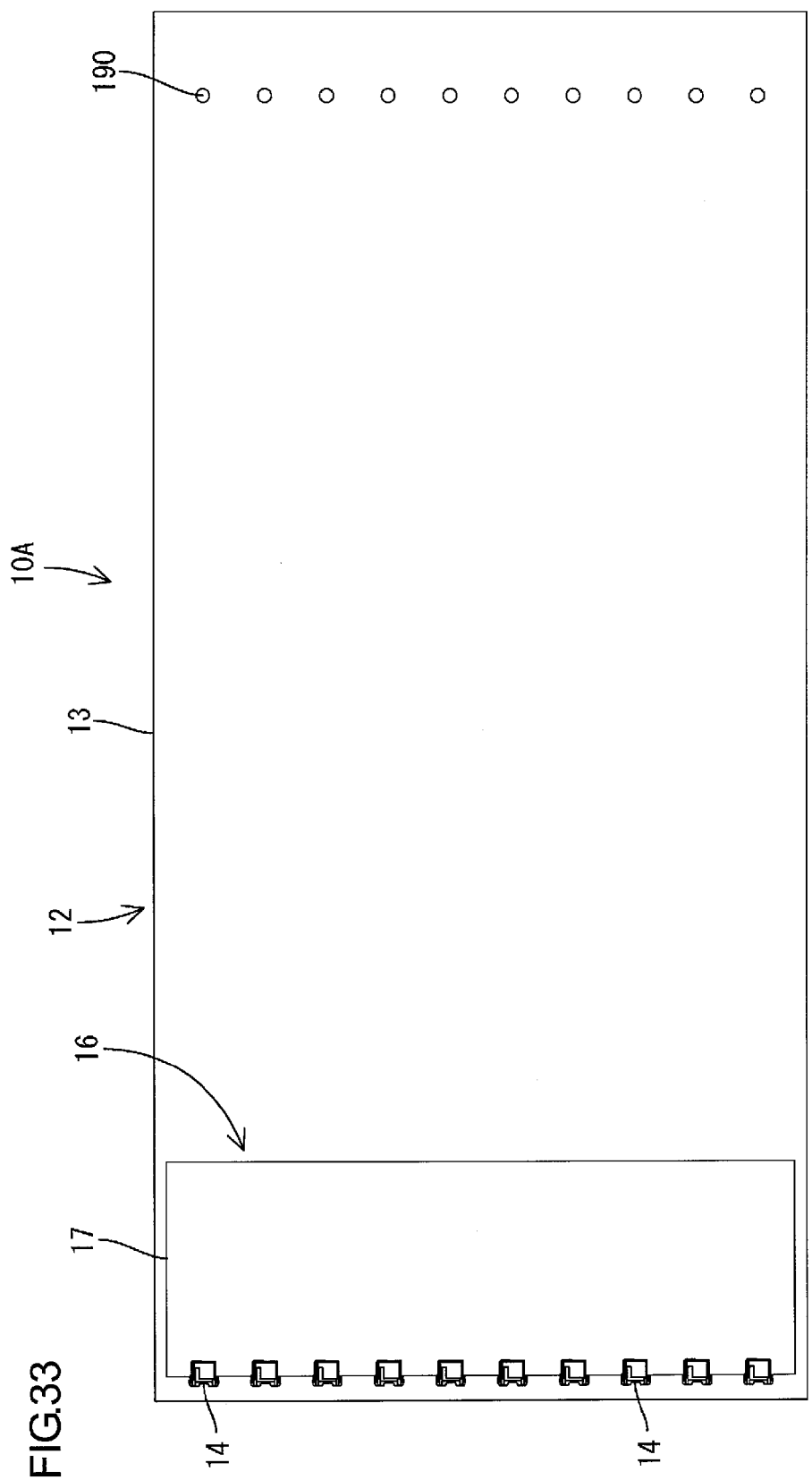
FIG. 33 is a rear view of the lighting device according to the second embodiment.
Figure 34:
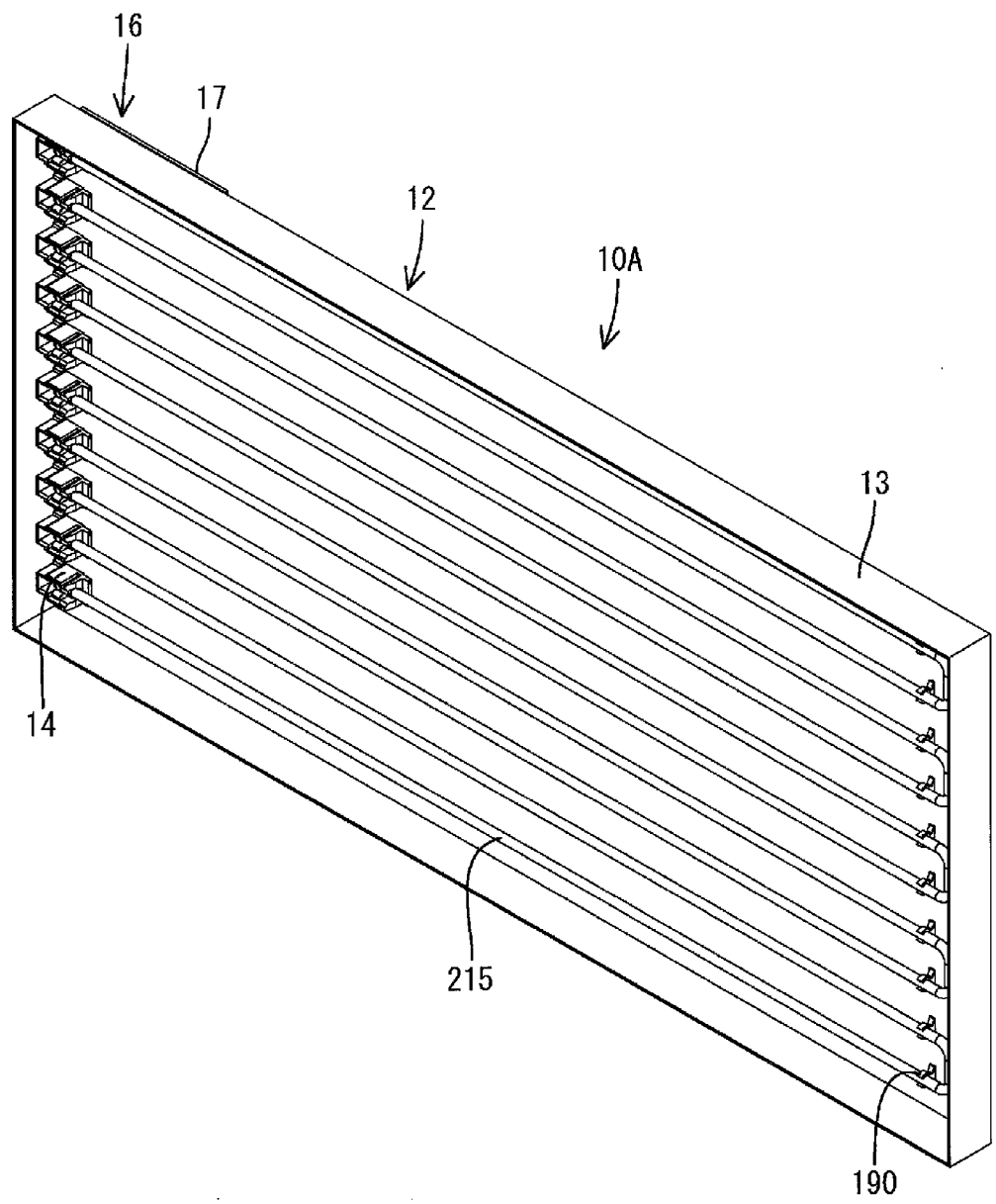
FIG. 34 is a front perspective view of the lighting device according to the second embodiment.
Figure 35:
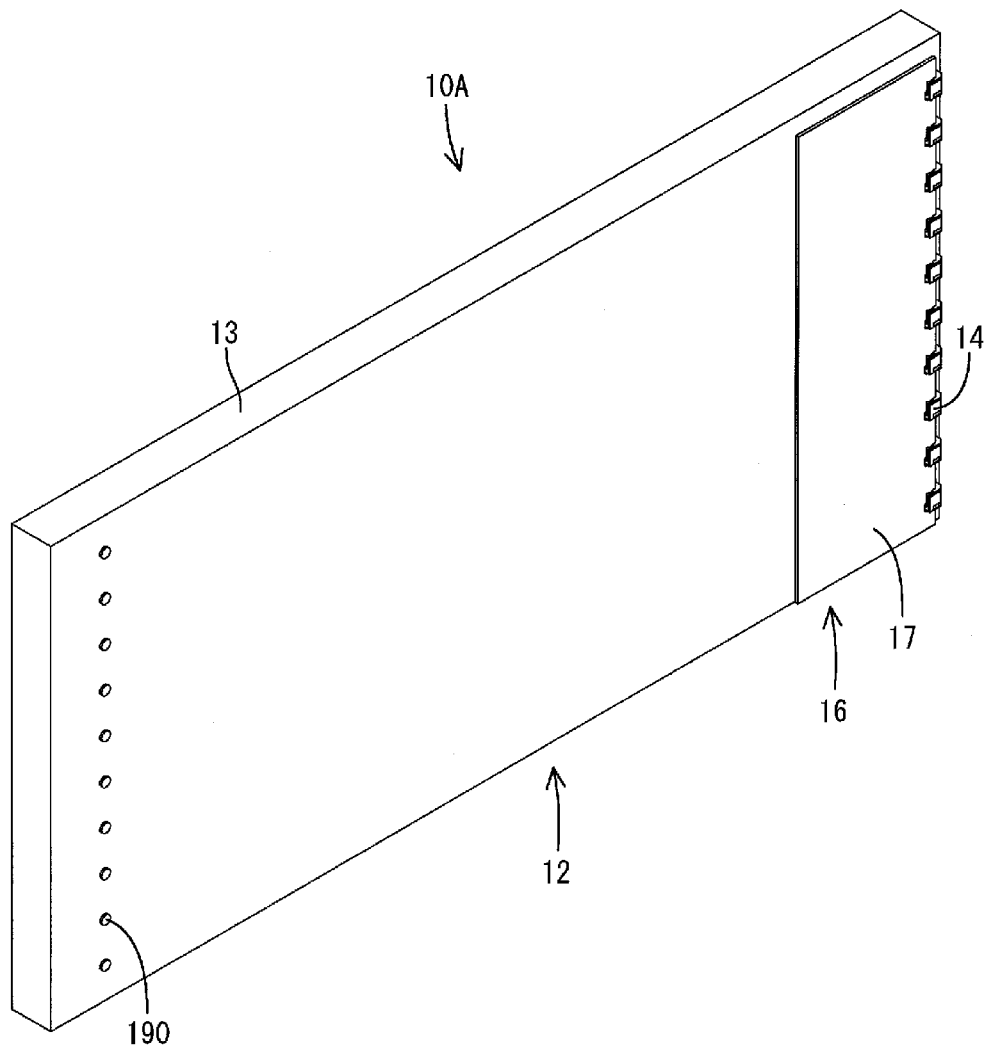
FIG. 35 is a rear perspective view of the lighting device according to the second embodiment.

A television receiver TV of this embodiment (see FIG. 1) includes a lighting device 10A illustrated in FIGS. 32 to 35. FIG. 32 is a front view of the lighting device 10A. FIG. 33 is a rear view of the lighting device 10A. FIG. 34 is a front perspective view of the lighting device 10A. FIG. 35 is a rear perspective view of the lighting device 10A.

The lighting device 10A includes the lamp unit 12 and the power board 16 as in the first embodiment. The lamp unit 12 includes the metal chassis 13, a plurality of U-shaped discharge tubes (cold cathode tubes) 215, a plurality of relay connectors 14 and a plurality of lamp clips 190. The chassis 13 has a landscape rectangular plate-like overall shape and functions as a lamp housing. The discharge tubes 215 are arranged one above the other (in the short-side direction of the chassis 13) and parallel to each other in the chassis 13 on the front side. The relay connectors 14 are arranged one above the other and along one of the side edges of the chassis 13 so as to correspond to the discharge tubes 215. The lamp clips 190 are arranged one above the other along the other side edge of the chassis 13 on which the ferrules 136 of the U-shaped discharge tubes 215 are not arranged (i.e., on a side of on which curved portions of the discharge tubes 215 are arranged) so as to correspond the discharge tubes 215. A grounding member 150 provided in the first embodiment is not used in this embodiment.

Each discharge tube 215 is a cold cathode tube including a U-shaped glass tube 134 and the ferrules attached to the ends of the glass tube 134. The ends of the glass tubes 134, or the ferrules 136, are configured such that they are located in line when a plurality of the discharge tubes 215 are arranged parallel to each other. Namely, glass tubes in the same length extend parallel to each other from respective ends of a U-shaped curved portion 134a of each U-shaped glass tube 134.

The lamp clips 190 are mounted to the chassis 13 with parts thereof are passed through clip insertion holes (not shown) from front to rear. The lamp clips 190 are mounted on an inner side than the U-shaped portions 134a of the discharge tubes 215, that is, the clip insertion holes are provided on the inner side than the U-shaped portions 134a of the discharge tubes 215. With this configuration, both long portions of each discharge tube 215 are held with the lamp clips 190. Each lamp clip 190 includes a pair of flexible portions for holding the discharge tube 215 having a round cross section.

The discharge tubes 215 of this embodiment are electrically connected to the power board when the ferrules 136 attached to the ends of the discharge tubes 215 are attached to the relay connectors 14.

Third Embodiment

Next, the third embodiment of the present invention will be explained with reference to FIGS. 46 to 52. Different holders from the first embodiment are used for the relay connectors in this embodiment. Other configurations are the same as the first embodiment. The same parts as those in the first embodiment are indicated by the same symbols. The same structures, functions and effects will not be explained.

Figure 46:
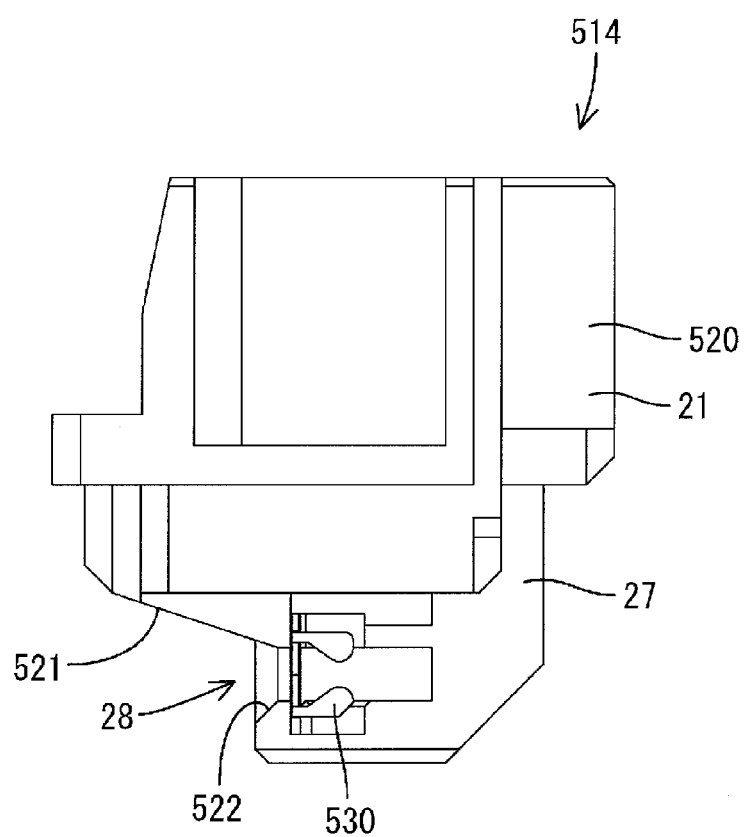
FIG. 46 is a rear view of a relay connector according to the third embodiment.
Figure 47:
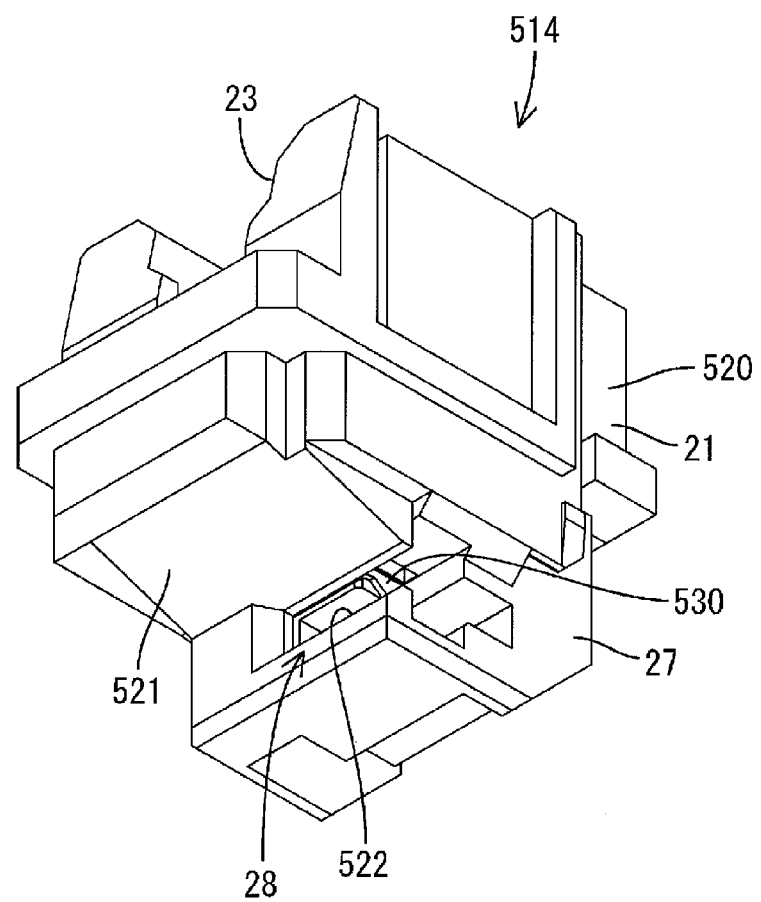
FIG. 47 is a first perspective view of a relay connector according to the third embodiment.
Figure 48:
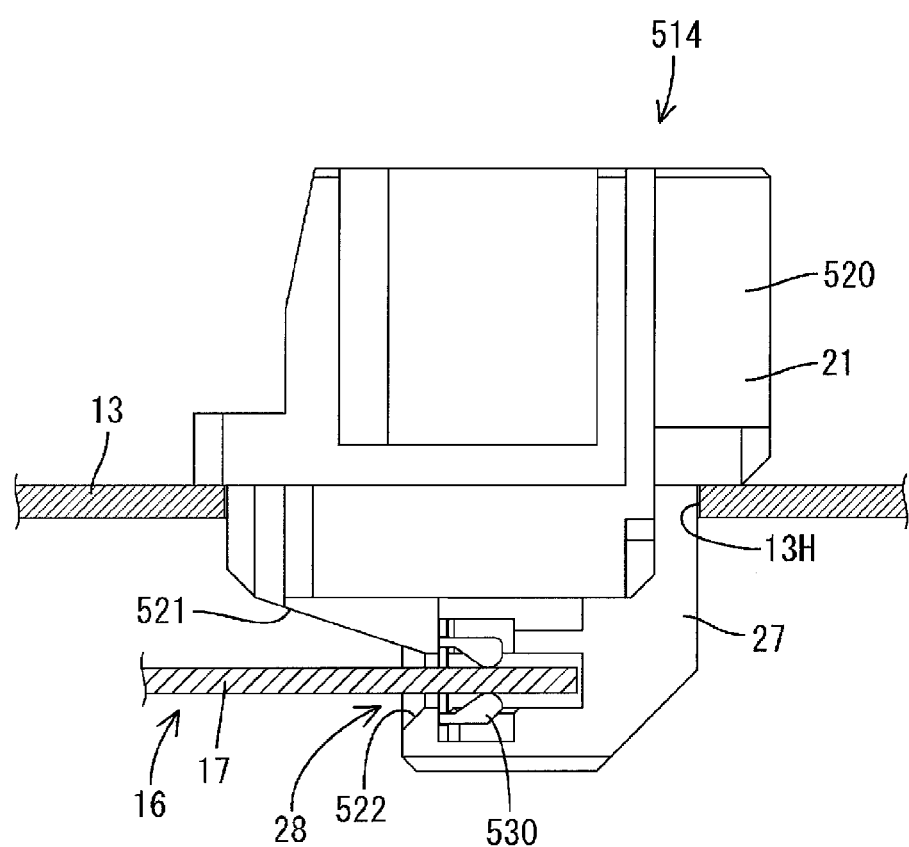
FIG. 48 is an explanatory view illustrating the relay connector mounted to a chassis connector according to the third embodiment.
Figure 49:
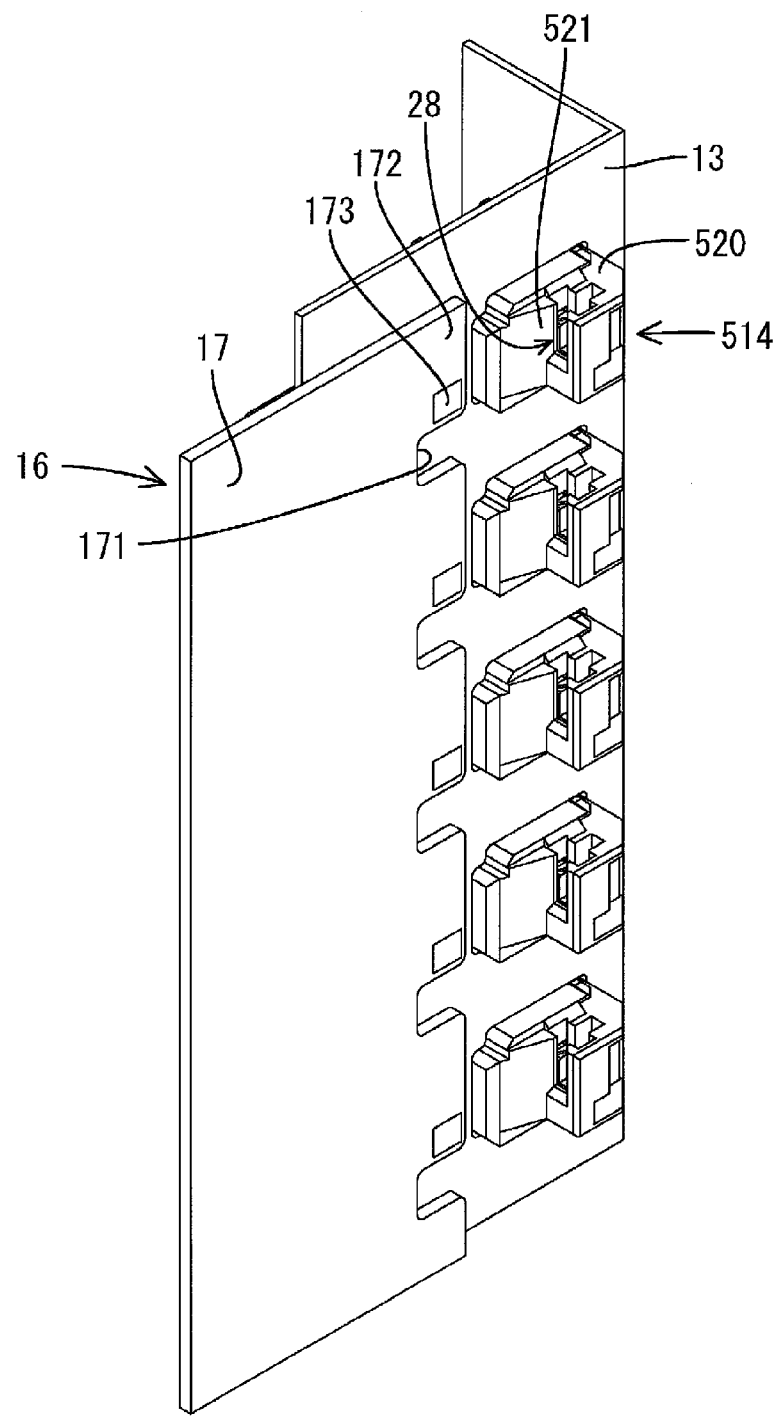
FIG. 49 is a perspective view illustrating the relay connectors and the power board before the power board is connected to the relay connectors according to the third embodiment.
Figure 50:
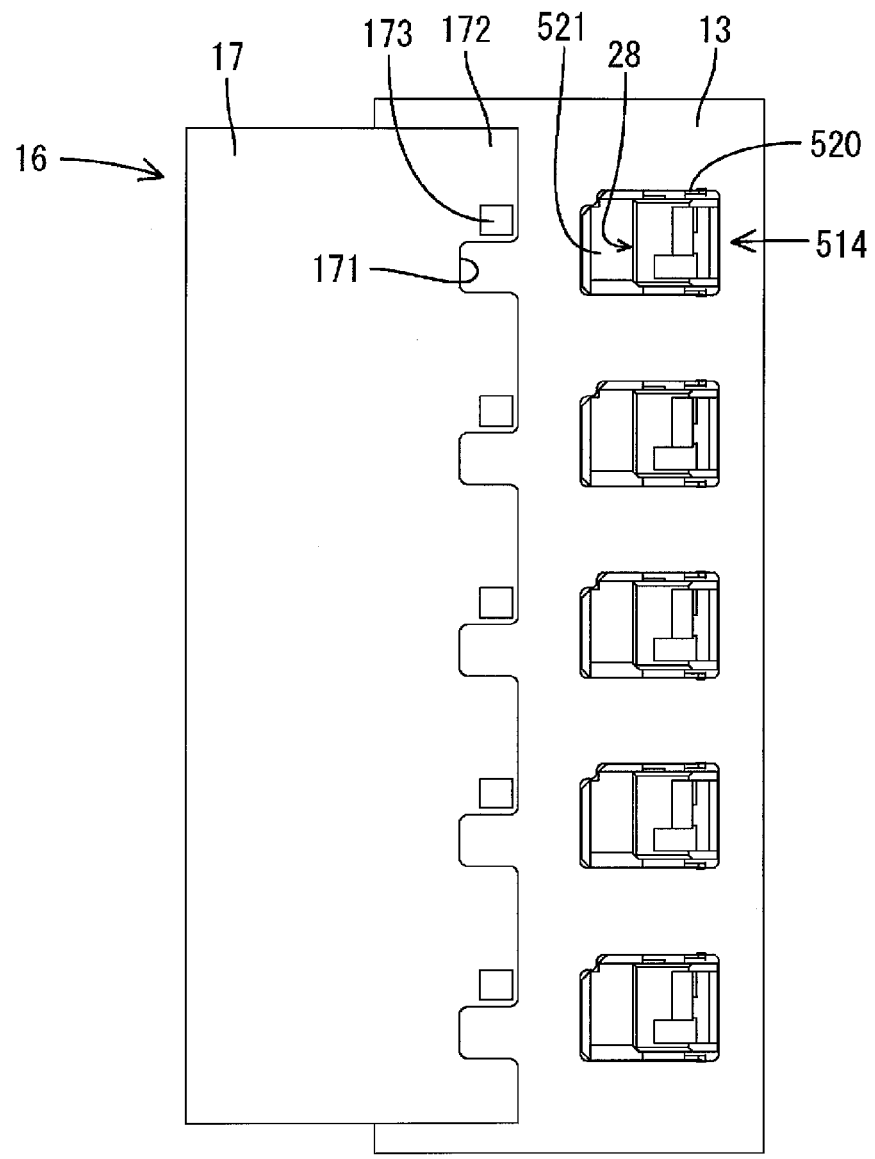
FIG. 50 is a plan view illustrating the relay connectors and the power board before the power board is connected to the relay connectors according to the third embodiment.
Figure 51:
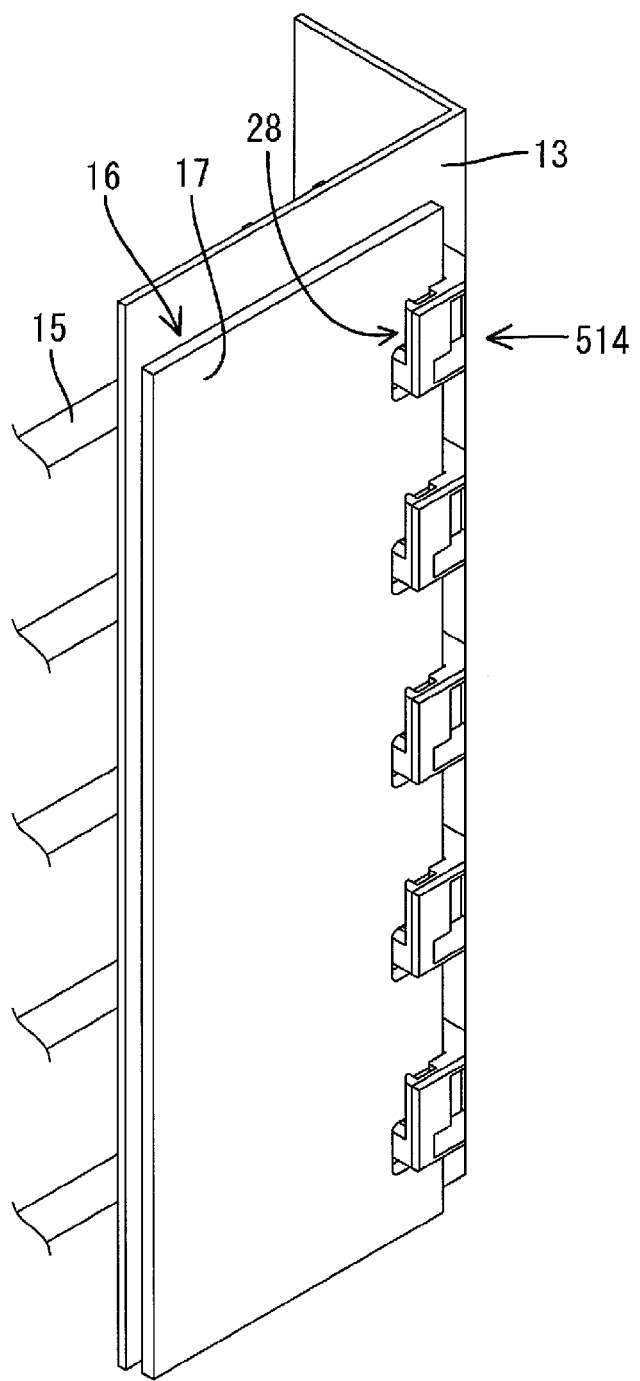
FIG. 51 is a perspective view illustrating the relay connectors and the power board after the power board is connected to the relay connectors according to the third embodiment.
Figure 52:
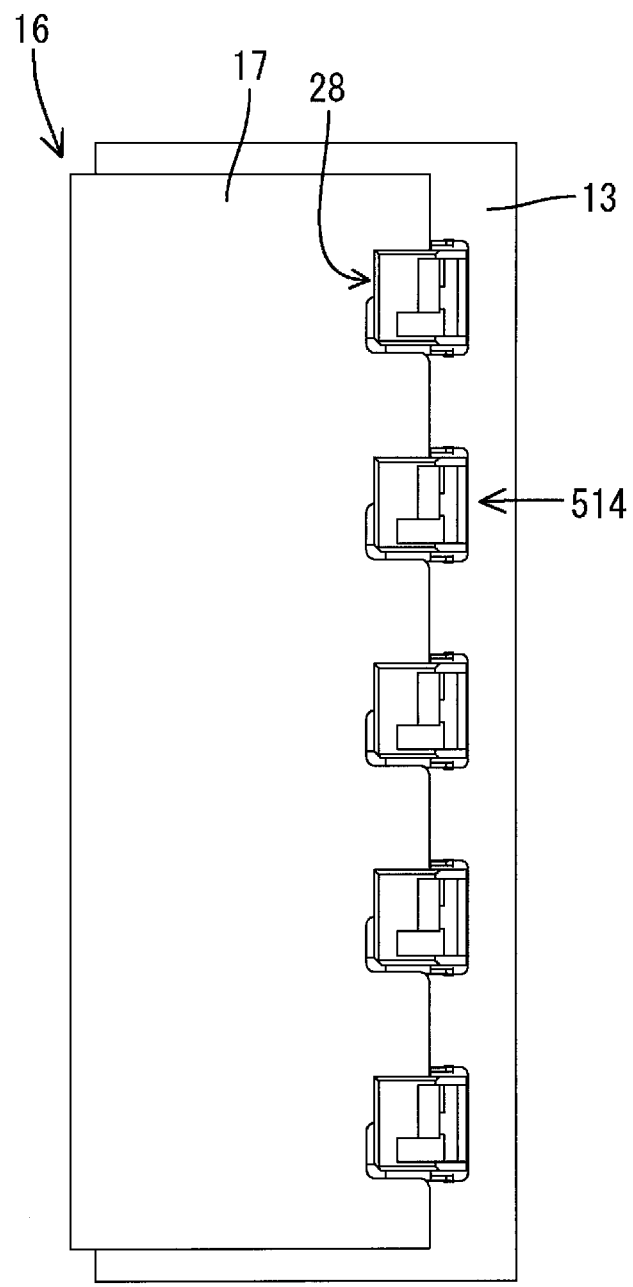
FIG. 52 is a plan view illustrating the relay connectors and the power board after the power board is connected to the relay connectors according to the third embodiment.

A television receiver TV of this embodiment (see FIG. 1) includes relay connectors 514 illustrated in FIGS. 46 and 47. FIG. 46 is a rear view of the relay connector 514 (corresponding FIG. 9 of the first embodiment). FIG. 47 is a first perspective view illustrating relative parts of the relay connector 514. FIG. 48 is an explanatory view illustrating the relay connector 514 mounted to the chassis 13. FIGS. 49 to 52 are explanatory views illustrating attachment of the circuit board of the power board 16 to the relay connectors 514. FIG. 49 is a perspective view illustrating the circuit board 17 and the relay connectors 514 before they are attached. FIG. 50 is a plan view illustrating the circuit board 17 and the relay connectors 514 before they are attached. FIG. 51 is a perspective view illustrating the circuit board 17 and the relay connectors 514 after they are attached. FIG. 52 is a plan view illustrating the circuit board 17 and the relay connectors 514 after they are attached.

Each connector 514 is fixed to the chassis 13 with a part thereof inserted in the mounting hole 13H of the chassis 13 in the same manner as the first embodiment. Specifically, each connector 514 includes a synthetic resin holder 520 and a metal relay terminal 530 housed in the holder 520. The holder 520 insulates the relay connector 514 from the chassis 13 and the relay connector 514 is mounted to the chassis 13 with the holder 520. The relay terminal 530 is attached to the holder 520 and makes electrical connection between the power board 16 and the discharge tube 15. The relay terminal 530 includes a discharge tube connecting portion 31 electrically connected to the discharge tube 15 and a power board connecting portion 33 electrically connected to the power board 16 (see FIG. 15 of the first embodiment).

The relay terminal 530 of each relay connector 514 has the same configuration as the first embodiment. The holder 520 of each relay connector 514 has a different configuration from the first embodiment.

Specifically, the holder 520 includes a box portion (a ferrule holding portion) 21 and a projecting portion (a power board holding portion) 27. The box portion 21 is formed in a block-like overall shape and arranged on the front surface side of the chassis 13 (on a side on which the discharge tubes 15 are arranged. The projecting portion 27 is formed in a shape that can be passed through the mounting hole 13H of the chassis 13. The box portion 21 has a holding area 23 that opens in two directions so as to hold the end (the ferrule 136) of the discharge tube 15.

As illustrated in FIGS. 49 to 52, the projecting portion 27 has an insertion hole 28 for receiving apart of the power board 16 (i.e., a tab 172 of the circuit board 17). The projecting portion 27 also has a guide portion 521 on an upper side in the insertion direction with respect to the insertion hole 28 to guide the insertion of the part of the power board 16 into the insertion opening 28. The guide portion 521 has a sloped surface that inclines from the plate surface of the chassis 13 toward the insertion hole 28 when the relay connector 514 is mounted to the chassis 13. The sloped surface continues into the insertion hole 28. When connecting the power board 16 to the relay connectors 514, the parts of the circuit board 17 are pressed against the sloped surfaces of the guide portion 521 and the power board 16 is moved along the sloped surface. The parts of the power board 16 are very easily inserted into the insertion holes 28.

Figure 59:
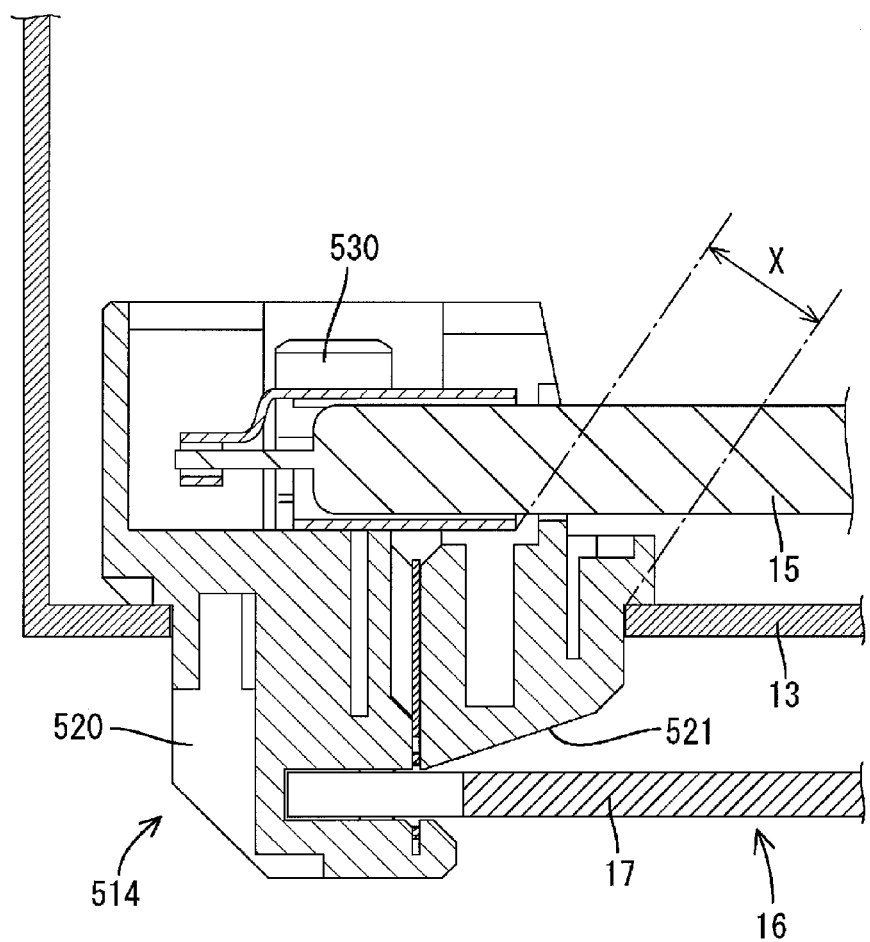
FIG. 59 is an explanatory view of the relay connector for explaining an effect produced by the relay connector.
Figure 60:
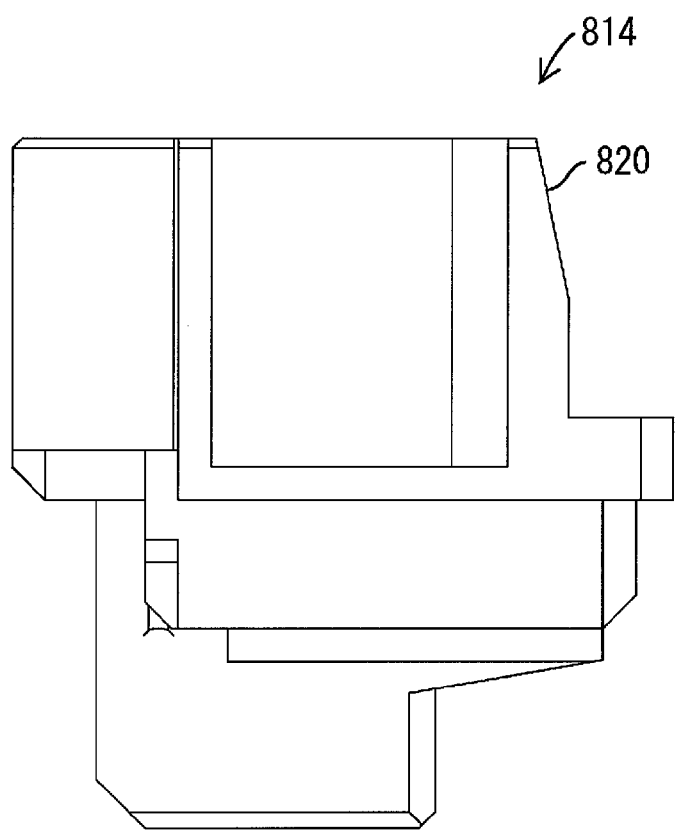
FIG. 60 is a front view of a relay connector according to the fifth embodiment.
Figure 61:
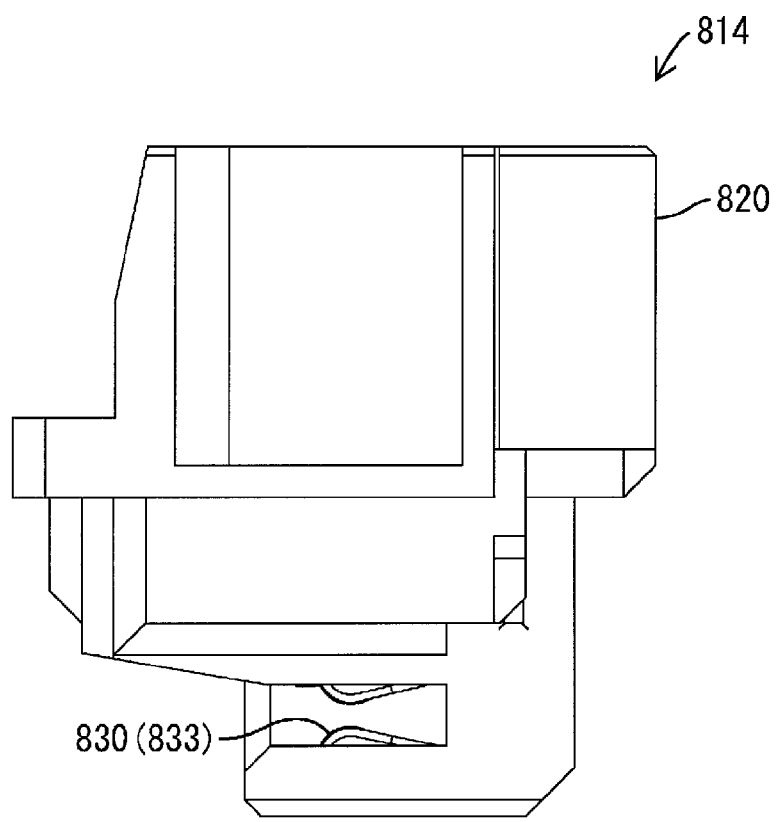
FIG. 61 is a rear view of the relay connector according to the fifth embodiment.
Figure 62:
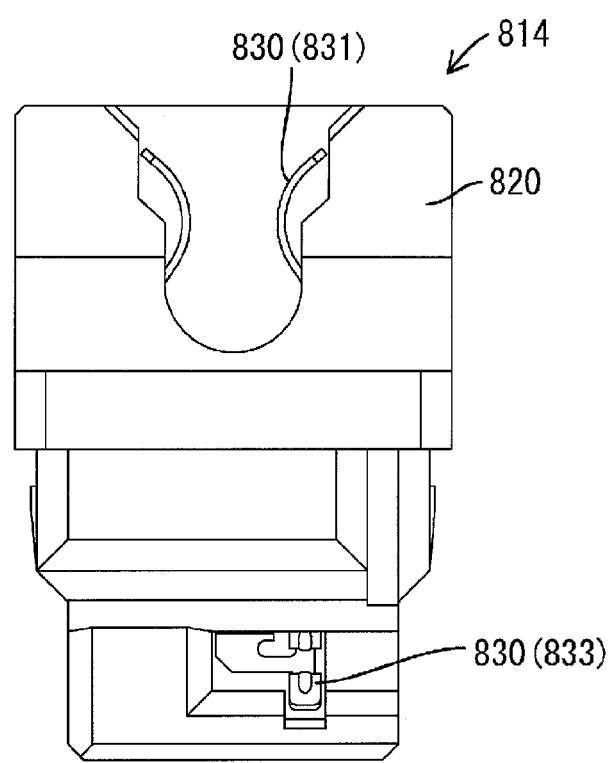
FIG. 62 is a right side view of the relay connector according to the fifth embodiment.
Figure 63:
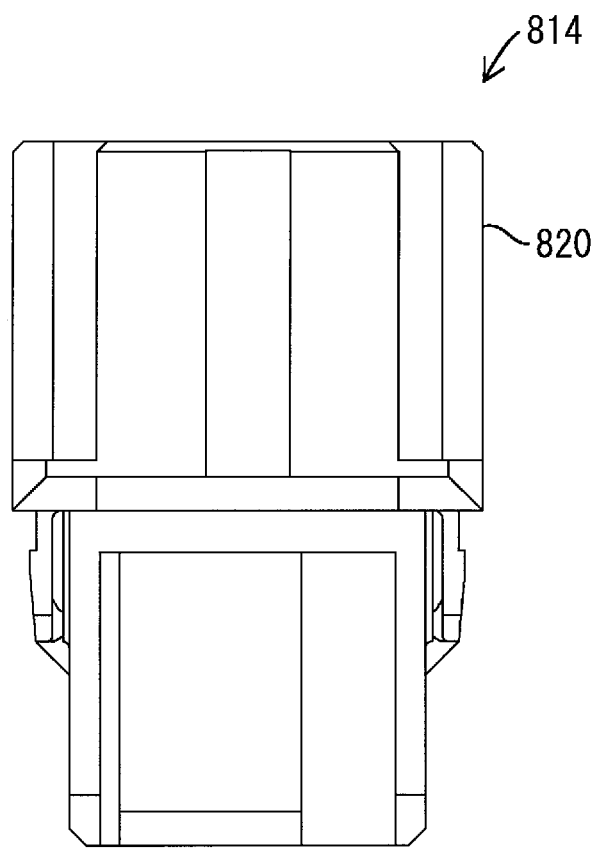
FIG. 63 is a left side view of the relay connector according to the fifth embodiment.
Figure 64:
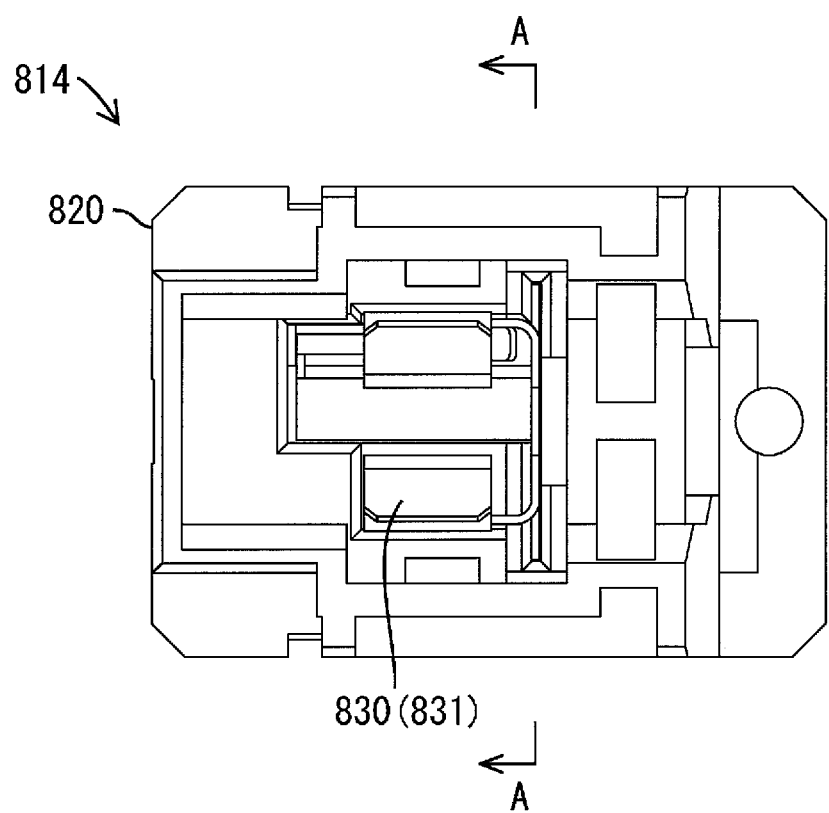
FIG. 64 is a plan view of the relay connector according to the fifth embodiment.
Figure 65:
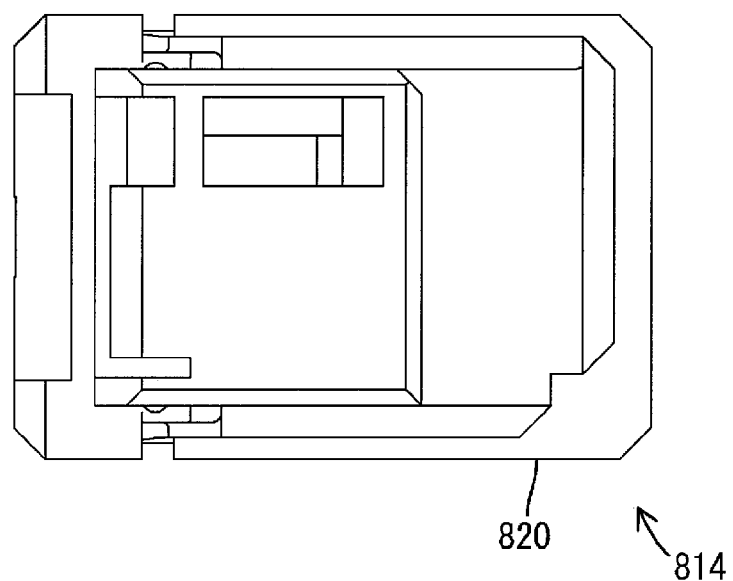
FIG. 65 is a bottom view of the relay connector according to the fifth embodiment.
Figure 66:
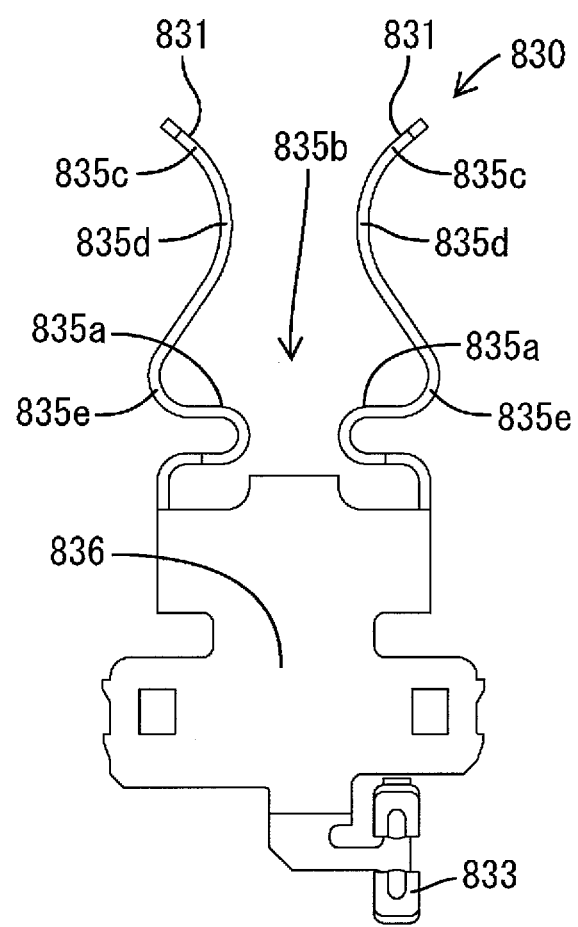
FIG. 66 is a right side view of a relay terminal of the relay connector according to the fifth embodiment.
Figure 67:
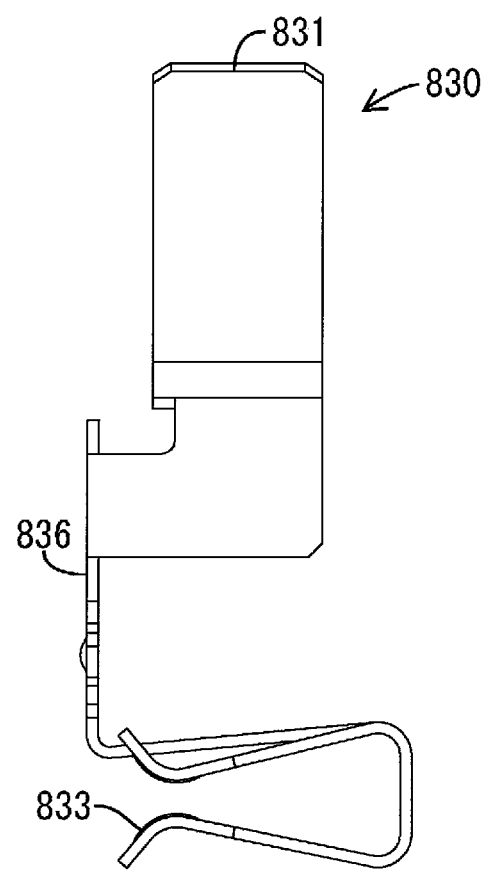
FIG. 67 is a rear view of a relay terminal of the relay connector according to the fifth embodiment.
Figure 68:
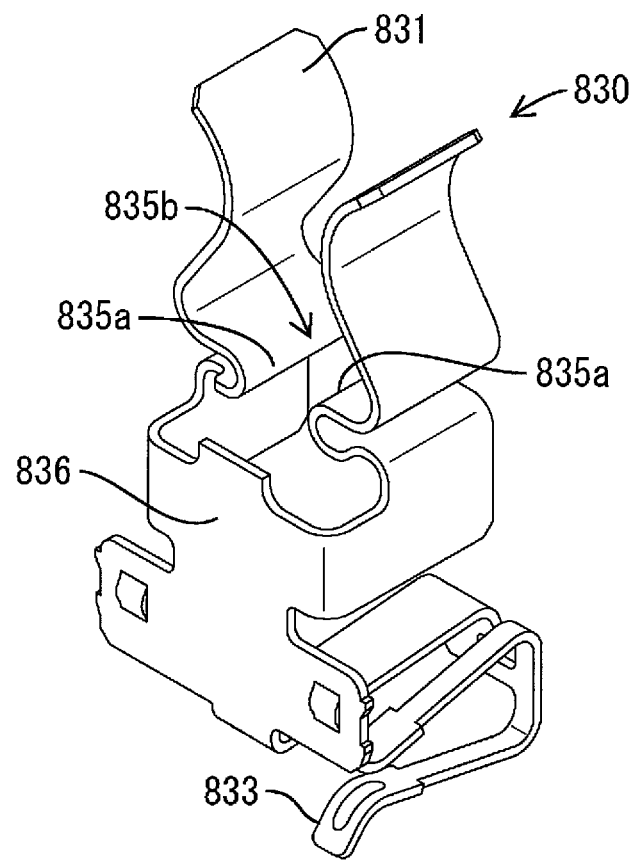
FIG. 68 is a first perspective view of a relay terminal of the relay connector according to the fifth embodiment.
Figure 69:
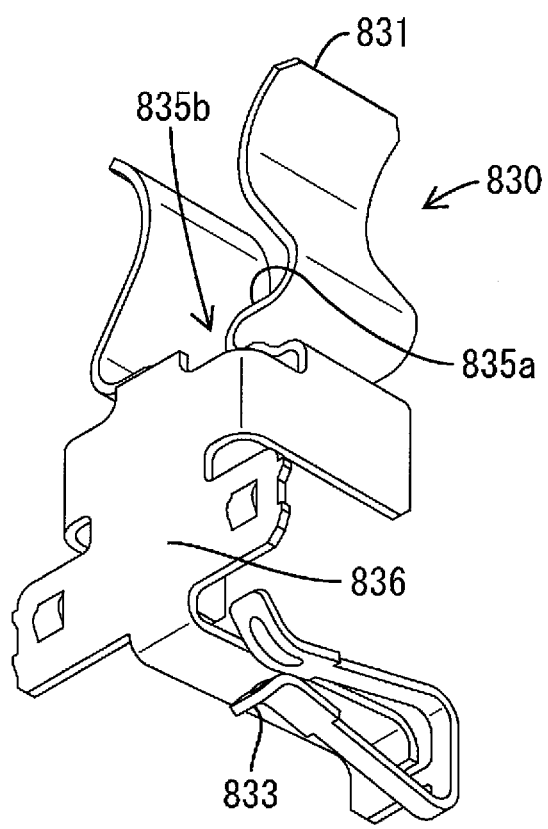
FIG. 69 is a second perspective view of a relay terminal of the relay connector according to the fifth embodiment.
Figure 70:
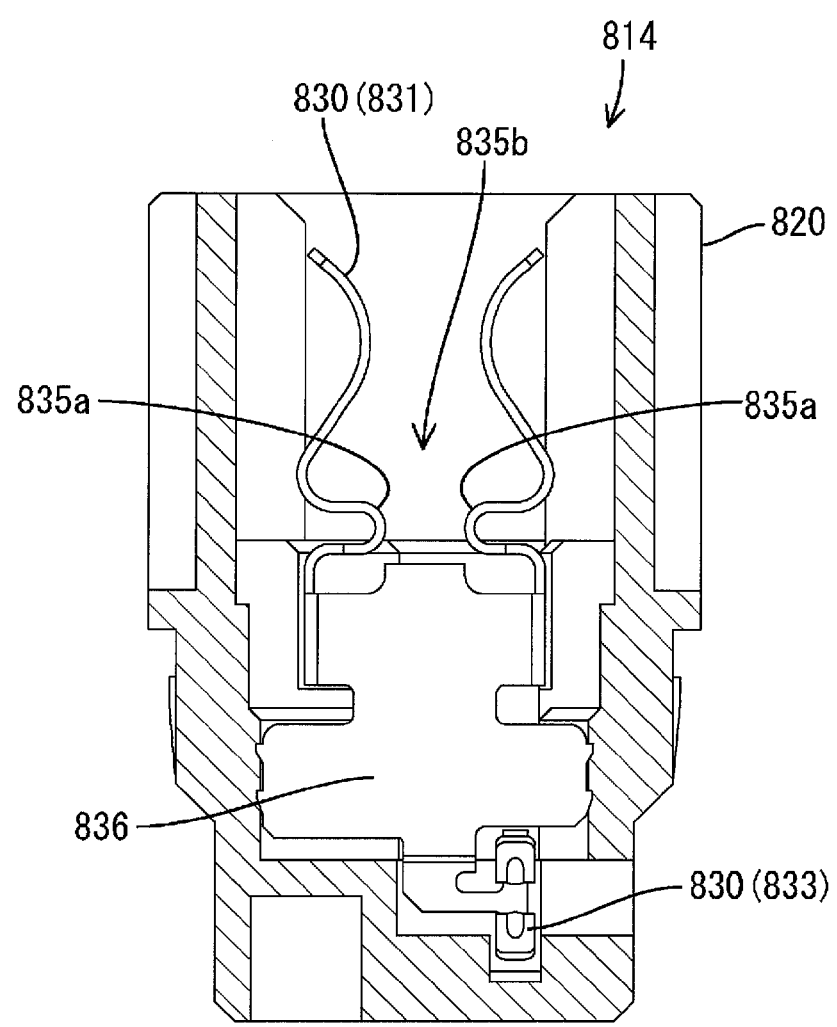
FIG. 70 is a cross-sectional view of the relay connector in FIG. 64 long line A-A.
Figure 71:
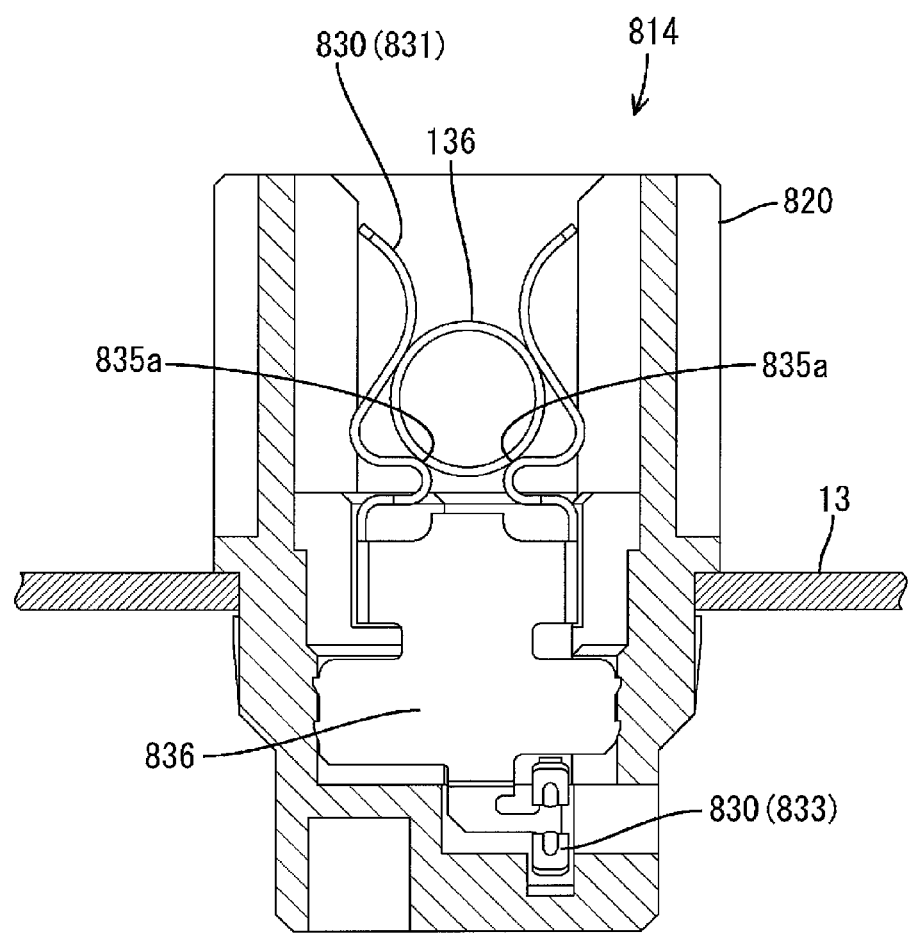
FIG. 71 is a view illustrating the relay connector in FIG. 70 with a ferrule fitted therein.
Figure 72:
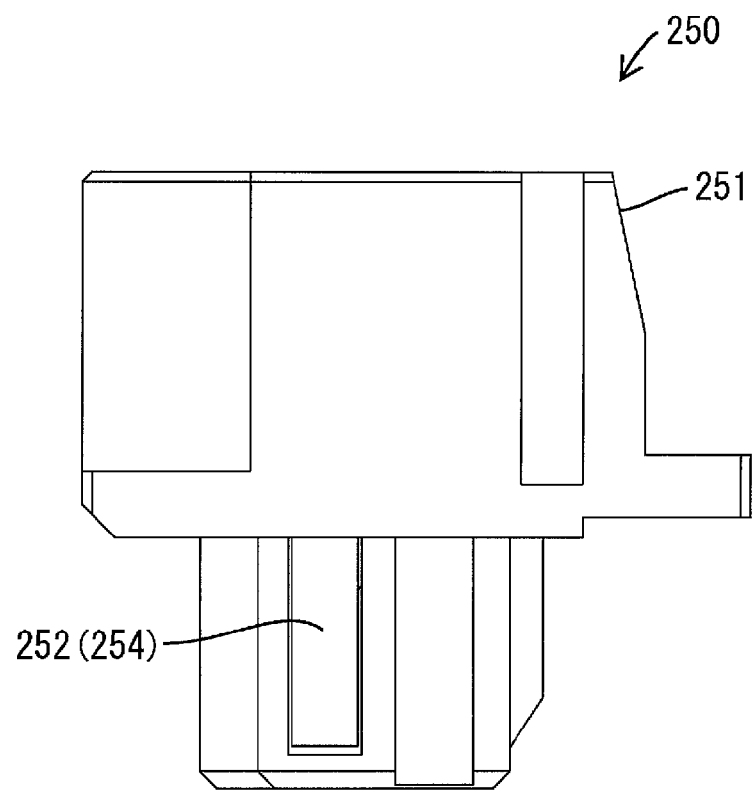
FIG. 72 is a front view of a grounding member according to the sixth embodiment.
Figure 73:
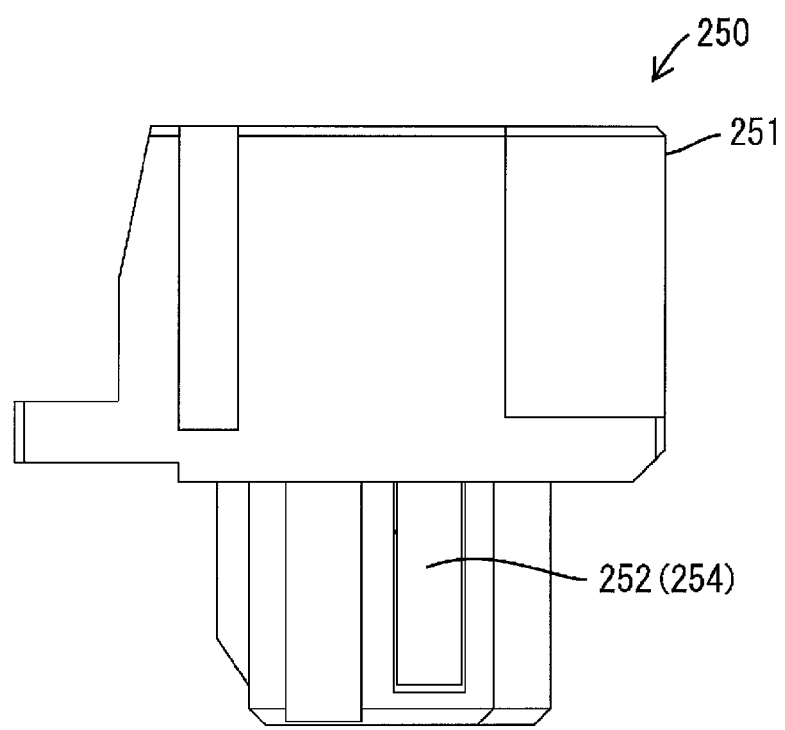
FIG. 73 is a rear view of a grounding member according to the sixth embodiment.
Figure 74:
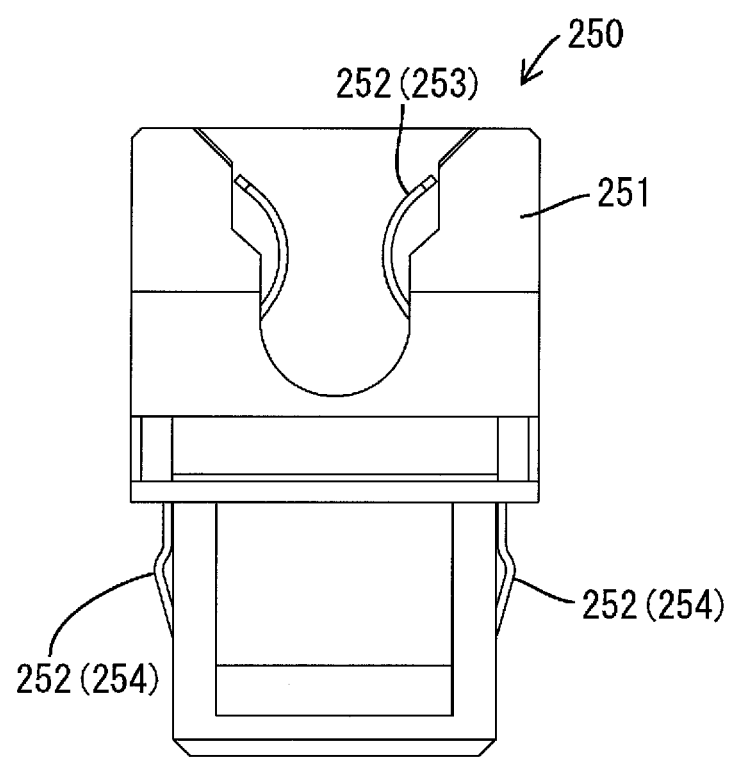
FIG. 74 is a right side view of a grounding member according to the sixth embodiment.
Figure 75:
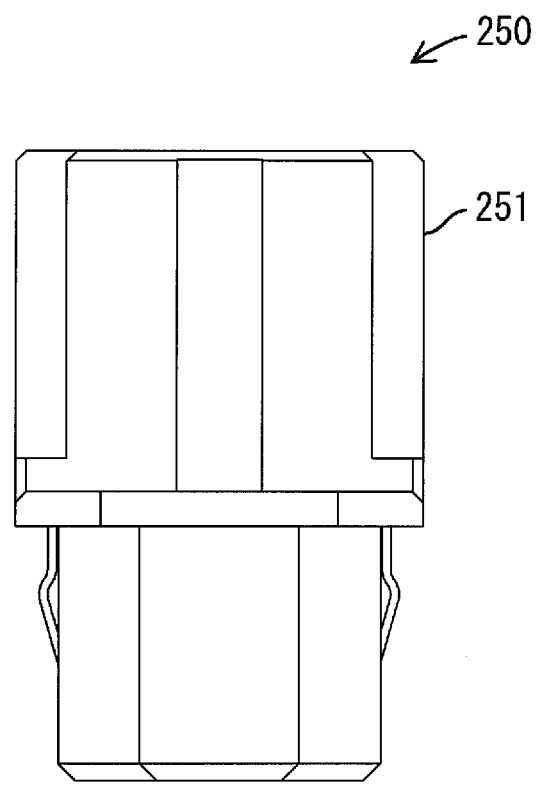
FIG. 75 is a left side view of a grounding member according to the sixth embodiment.
Figure 76:
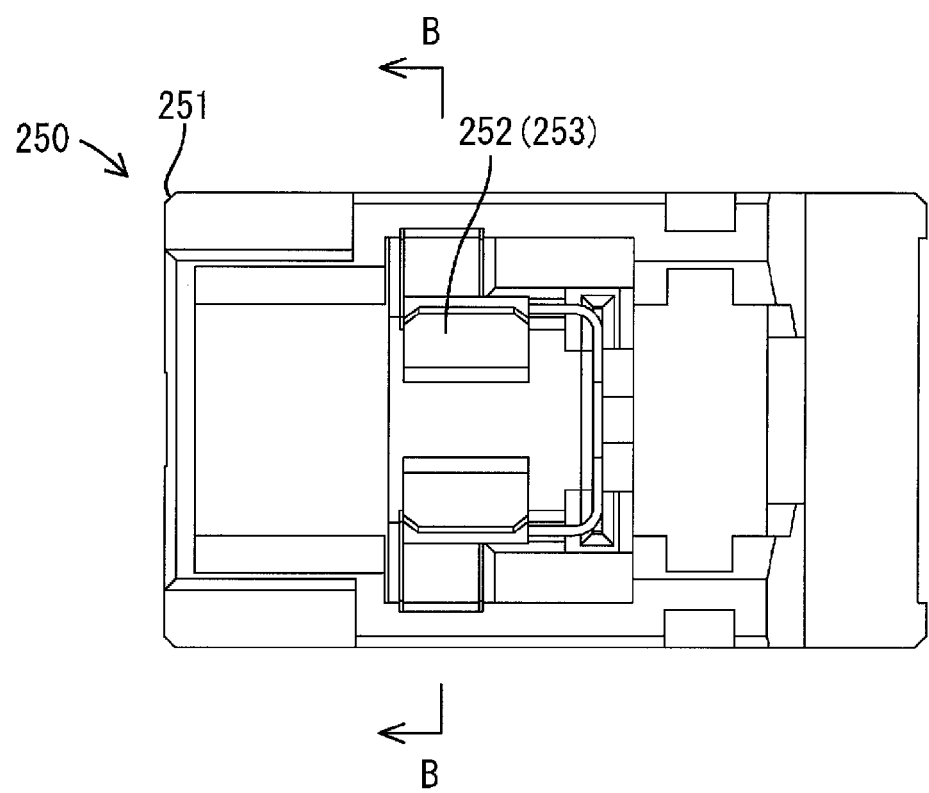
FIG. 76 is a plan view of a grounding member according to the sixth embodiment.
Figure 77:
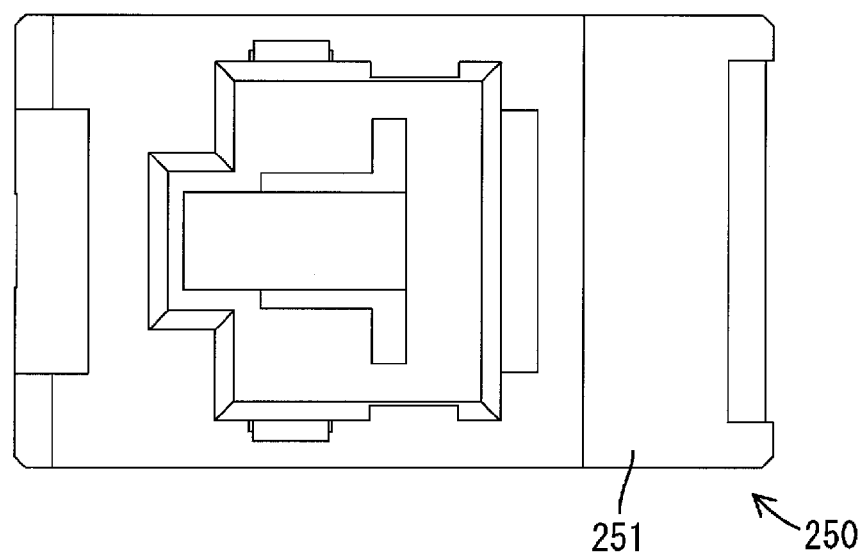
FIG. 77 is a bottom view of a grounding member according to the sixth embodiment.

The insertion holes 28 receive the parts of the circuit board 17 such that the parts are slipped in. The guide portion 521 should be placed against plate surfaces of the circuit board 17 facing the chassis 13. Namely, when the parts of the circuit board 17 are connected to the relay connectors 14 as illustrated in FIG. 48, the guide portion 521 should be arranged on the chassis 13 side. Each projecting portion may have another projecting portion 522 on a side away from the chassis 13 (see FIG. 48) when the parts of the circuit board 17 are connected to the relay connectors 14 as illustrated in FIG. 48. In this case, a length of the guide area (a length of the sloped surface) of each guide portion 521 on the chassis 13 side should be larger than that of each guide 522 on the side away from the chassis 13. This is because the insertion of the parts of the circuit board 17 during the connection of the power board 16 to the relay connectors 514 becomes a lot easier when the parts of the circuit board 17 are inserted along the guides on the chassis 13 side in comparison to the insertion along the guides on the side away from the chassis 13. As illustrated in FIG. 59, by providing the guide portion 521a distance X between the chassis 13 and each high voltage portion (e.g., the ferrule 136 of the discharge tube 15 or the relay terminal 530) becomes larger than the first embodiment that does not have the guide portion 521. With this configuration, electrical discharges between the chassis 13 and the relay terminals 530 directly behind the discharge tubes 15 to which high voltages are applied are further less likely to occur.

Modification of the Third Embodiment

Figure 53:
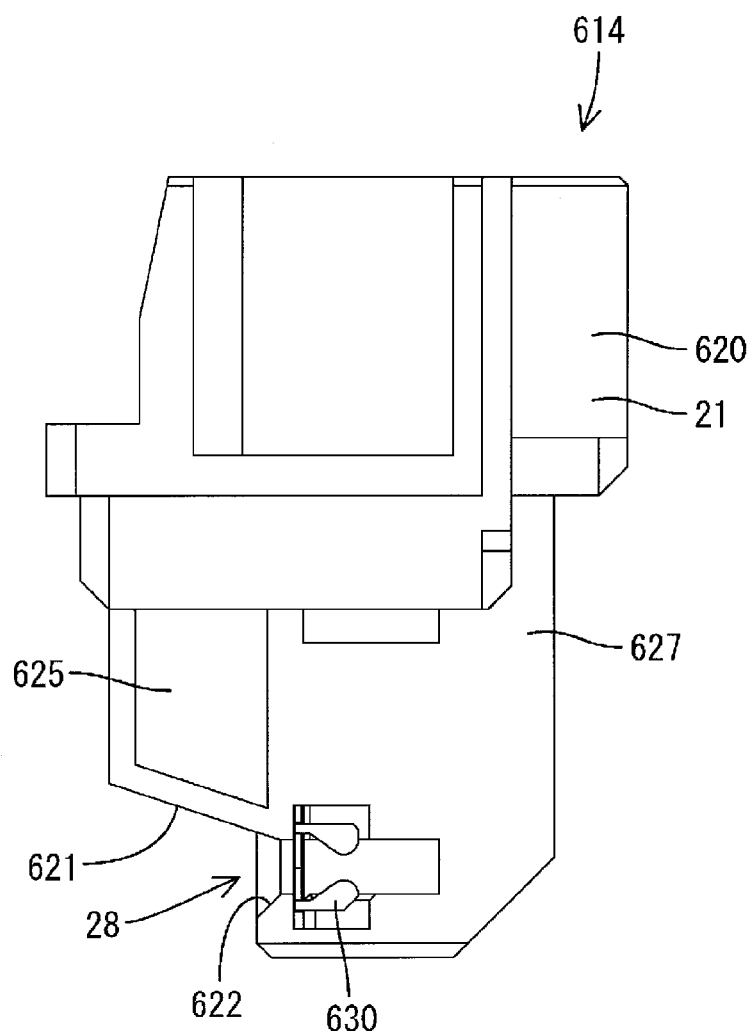
FIG. 53 is a rear view of a relay connector according to a modification of the third embodiment.
Figure 54:
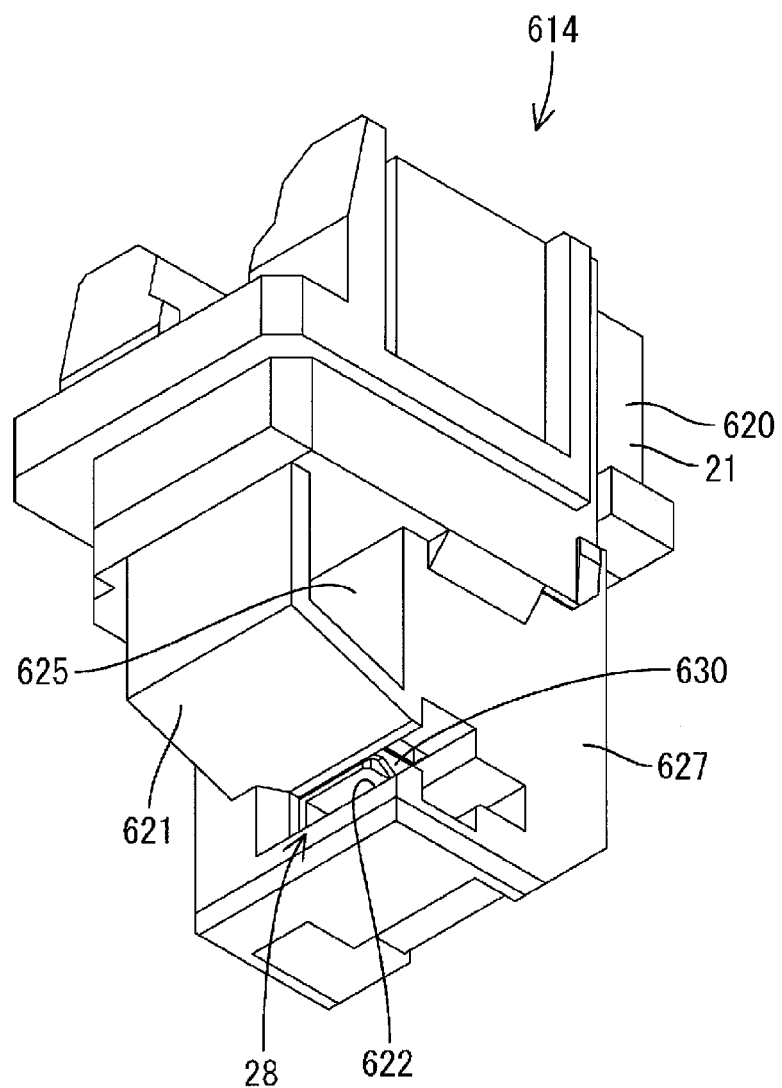
FIG. 54 is a first perspective view of the relay connector according to the modification of the third embodiment in FIG. 53.
Figure 55:
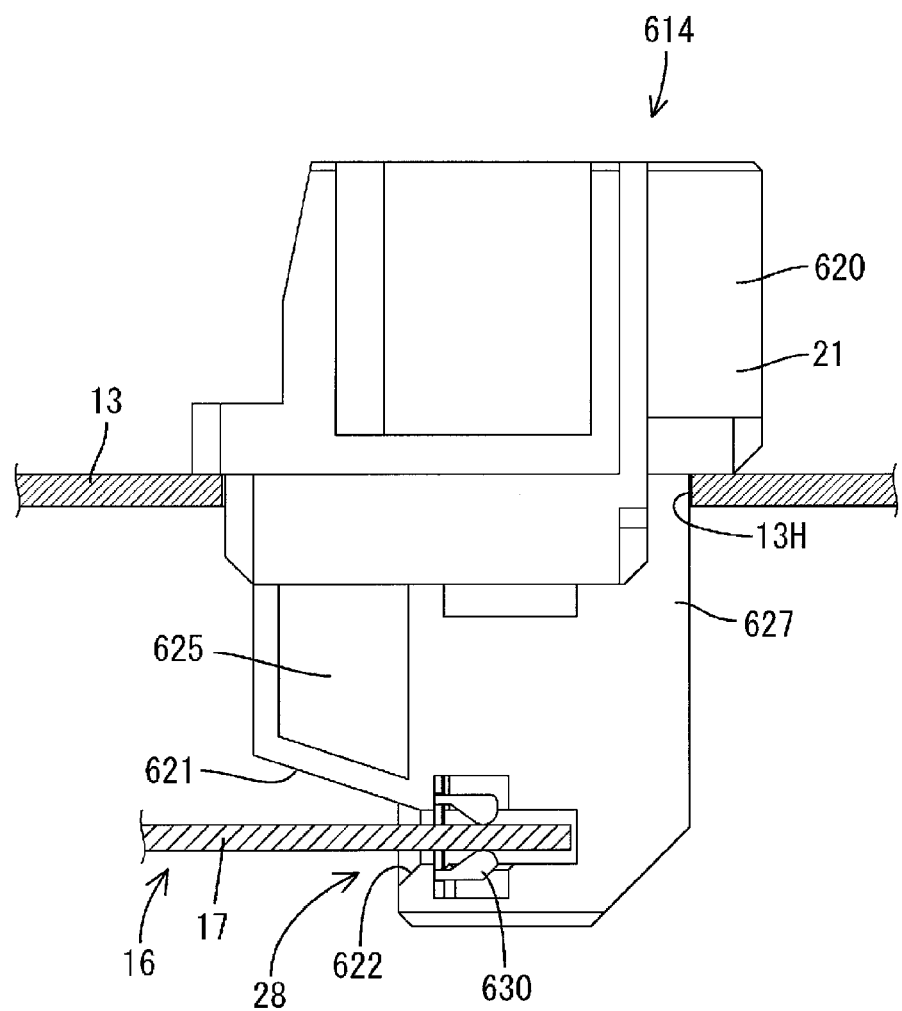
FIG. 55 is an explanatory view illustrating the relay connector mounted to a chassis connector according to the modification of the third embodiment in FIGS. 53 and 54.

Relay connectors 614 that are modified from the relay connectors 514 of the third embodiment will be explained with reference to FIGS. 53 to 55. FIG. 53 is a rear view of the relay connector 614 (corresponding to FIG. 46). FIG. 54 is a first perspective view illustrating relative parts of the relay connector 614 (corresponding to FIG. 47). FIG. 55 is an explanatory view illustrating the relay connector 614 mounted to the chassis 13 (corresponding to FIG. 48).

Each relay connector 614 includes a guide portion 621 similarly to the relay connector 514. The relay connector 614 has a different projecting portion 627 that is a power board holding portion from the relay connector 514. Specifically, a dimension of a part of the projecting portion 627 projecting from the chassis 13 is larger than the of the relay connector 514. The projecting portion 627 that is made of synthetic resin has a hollow portion 625 inside. With this configuration, the projecting portion 627 can be formed so as to be project largely from the chassis 13 without decreasing the formability. The holder 620 of the relay connector 614 insulates the relay terminal 630 from other members (e.g., the chassis 13) by covering it with resin while the formability of the holder 620 is maintained by providing the hollow portion around the relay terminal 630.

Fourth Embodiment

Next, the fourth embodiment of the present invention will be explained with reference to FIGS. 56 to 58. In this embodiment, different relay connectors including different relay terminals from the third embodiment are used. Other configurations are the same as the third embodiment. The same parts as those in the third embodiment are indicated by the same symbols. The same structures, functions and effects will not be explained.

Figure 56:
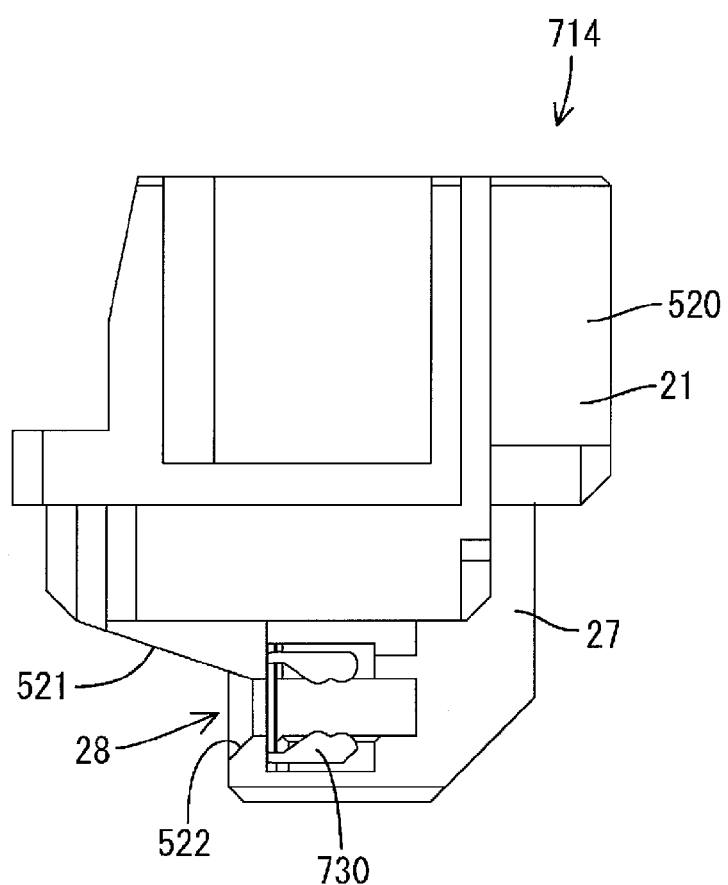
FIG. 56 is a rear view of a relay connector according to the fourth embodiment.

A television receiver TV of the fourth embodiment (see FIG. 1) includes relay connectors 714 illustrated in FIG. 56. FIG. 56 is a rear view of the relay connector 714. FIG. 57 is a magnified view of the relay connector 714 in a primary form. FIG. 58 is a magnified view of the relay connector 714 in a secondary form after the relay connector 714 is used for a considerable period of time.

Figure 57:
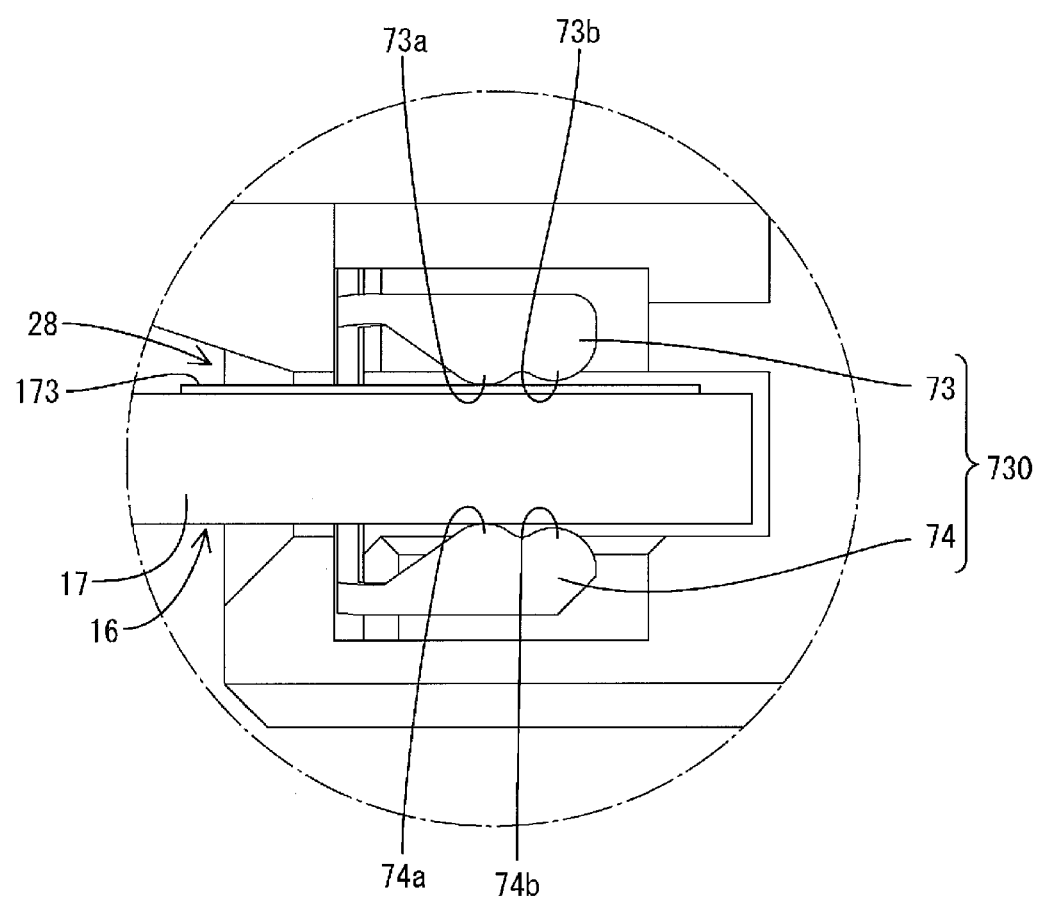
FIG. 57 is a magnified view of the relay connector in a primary form.
Figure 58:
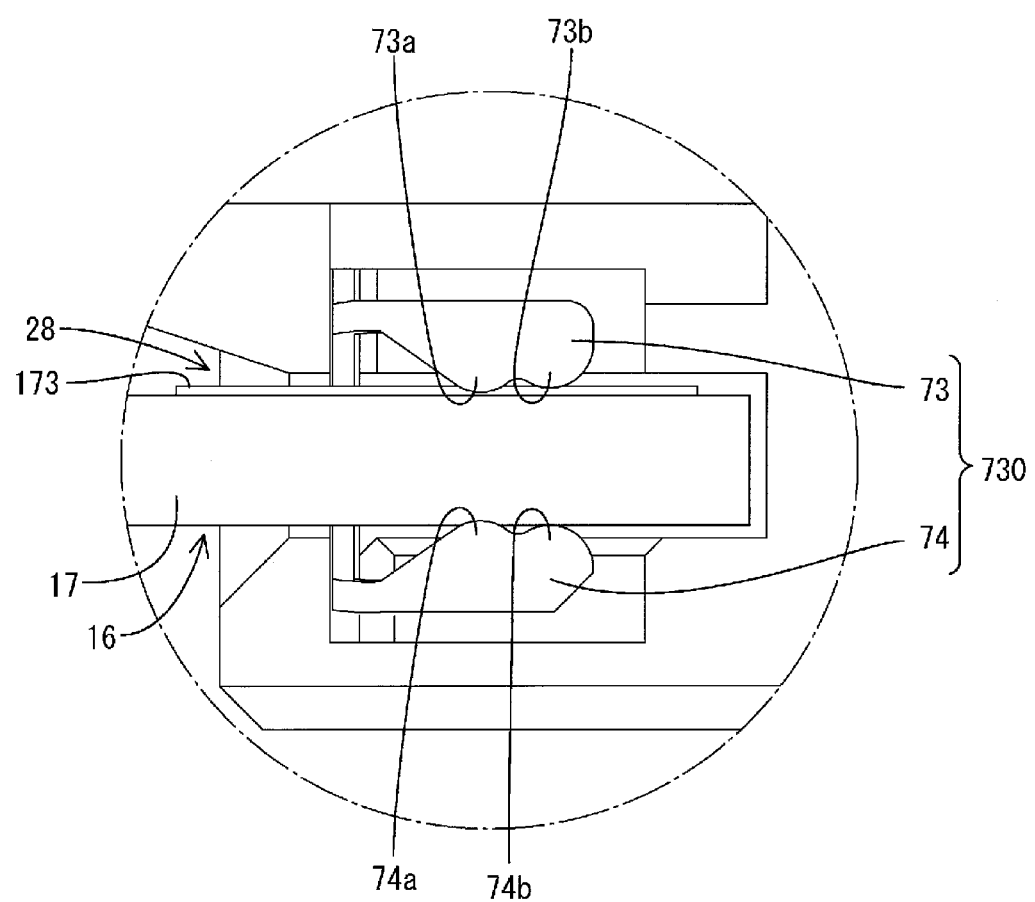
FIG. 58 is a magnified view of the relay connector in a secondary form.

As illustrated in FIGS. 57 and 58, each relay connector 714 includes a relay terminal 730 having a flexible portion 73 that is electrically connected to the conductive portion (a terminal portion) of the power board 16. The flexible portion 73 has a primary contact 73a and the secondary contact 73b. The primary contact 73a is primarily in contact with the conductive portion 173. The secondary contact 73b is secondarily in contact with the conductive portion 173 after the relay terminal 730 is used for a considerable period of time. The primary contact 73a and the secondary contact 73b are formed so as to project toward the conductive portion 173 (in an M shape). The primary contact 73a further projects toward the conductive portion 173 than the secondary contact 73b. The difference between the primary contact 73a and the secondary contact 73b in the projecting direction is 25 µm that is smaller than the thickness of the conductive portion 173, which is 35 µm. In this embodiment, the conductive portion 173 is made of copper foil and the flexible portion 73 is made of stainless steel.

The above configuration is very sustainable for a loose connection that occurs after a considerable period of time. Specifically, the primary contact 73a is primarily in contact with the conductive portion 173 as illustrated in FIG. 57, and the relay terminal 730 is electrically connected to the power board 16. The secondary contact 73b is not in contact with the conductive portion 173. When the lighting device 10 is continuously used, the conductive portion 173 and the primary contact 73a may wear. If the primary contact 73a scratches the conductive portion 173, it enters the conductive portion 173 and reaches the circuit board 17 as illustrated in FIG. 58. When the primary contact 73a enters the conductive portion 173 to a certain depth, the secondary contact 73b is secondarily in contact with the conductive portion 173. The electrical connection between the power board 16 and the relay terminal 730 is maintained via the secondary contact 73b. Even when the primary contact 73a reaches the circuit board 17 and the electrical connection between the power board 16 and the relay terminal 730 cannot be maintained via the primary contact 73a, it is reliably achieved and maintained via the secondary contact 73b. Because the circuit board 17 is made of glass epoxy resin that is harder than the conductive portion 173, the secondary contact 73b and the conductive portion 173 are less likely to wear even when the primary contact 73a reaches the circuit board 17.

Because the conductive portion 173 of the power board 16 is provided only on one side of the circuit board 17, only the flexible portion 73 of two flexible portions 73 and 74 is in contact with the conductive portion 173. If the conductive portions 173 are provided on both sides of the circuit board 17, both flexible portions 73 and 74 are in contact with the respective conductive portions 173. In this configuration, the primary contacts 73a and 74a are primarily in contact with the conductive portions 173 and the electrical connection is maintained. The secondary contacts 73b and 74b are secondarily in contact with the conductive portions 173 and the electrical connection is maintained. The primary contact 73a (or 74a) of two contacts 73a and 73b (or 74a and 74b) of the flexible portion 73 (or 74), the primary contact 73a (or 74a) having more significant projection than the other, is located close to the opening of the insertion hole 28. By arranging the primary contact 73a (or 74a) having more significant projection close to the opening, the primary contact 73a guides the insertion of the circuit board 17. Therefore, the power board 16 is more easily and properly connected to the relay connectors 17.

Fifth Embodiment

Next, the fifth embodiment of the present invention will be explained with reference to FIGS. 60 to 71. This embodiment includes different relay connectors having different relay terminals from the first embodiment. Other configurations are the same as the first embodiment. The same parts as those in the first embodiment are indicated by the same symbols. The same structures, functions and effects will not be explained.

A television receiver TV of this embodiment (not shown) has the same configurations as the first embodiment. It includes relay connectors 814 illustrated in FIGS. 60 to 65. A part of each relay connector 814 is inserted in the corresponding mounting hole 13H of the chassis 13 and fixed to the chassis 13 in the same manner as the first embodiment. Specifically, each relay connectors 814 includes a resin holder 820 and a metal relay terminal 830 housed in the holder 820. The holder 820 insulates the relay connector 814 from the chassis 13. The relay connector 814 is mounted to the chassis 13 via the holder 820. The relay terminal 830 is attached to the holder 820 and makes electrical connection between the power board 16 and the discharge tube 15. The relay terminal 830 has a discharge tube connecting portion 831 and a power board connecting portion 833. The discharge tube connecting portion 831 is electrically connected to the discharge tube 15 and the power board connecting portion 833 is electrically connected to the power board 16.

The holder 820 of each relay connector 814 has the same configuration as the first embodiment. The relay terminal 83 of each relay connector 814 has the different configuration from the first embodiment.

Specifically, as illustrated in FIGS. 66 to 69, the discharge tube connecting portion 831 has ferrule receiving sections 835a that hold the ferrule 136 of the discharge tube 15. A ferrule holing area 835b is provided outside the ferrule receiving sections 835a (or a near side in a direction in which the ferrule is inserted). The ferrule 136 is held in the ferrule holding area 835b. The discharge tube connecting portion 831 is constructed of two metal pieces curved symmetrically. The curved metal pieces define the ferrule holding area 835b. The two metal pieces have guide sections 835c, curved sections 835d, bulge sections 835e and the ferrule receiving sections 835a. The guide sections 835c are curved such that distal ends thereof extend outward to guide the ferrule 136 to the ferrule holding area 835b. The curved sections 835d extend from the guide sections 835c along the ferrule holding area 835b. They are curved inward so as to retain the ferrule 136 in the ferrule holding area 835b. The bulge sections 835e extend from the curved sections 835d along the further part of the ferrule holding area 835b and bulge so as to provide a space for holding the ferrule 136. The ferrule receiving sections 835a extend from the bulge sections 835e toward a plate portion 836 and curved inward so as to restrict the ferrule 136 from entering the plate portion 836 side. With this configuration, the ferrule 136 is stably retained in the ferrule holding area 835b and restricted from entering the plate portion 836 side or the power board connecting portion 833 side (see FIGS. 70 and 71). In this embodiment, the longitudinal direction of the metal pieces of the power board connecting portion 833 substantially matches the longitudinal direction of the discharge tube 15.

Differently from the first embodiment, each ferrule 136 is received only by a metal part in this embodiment. This configuration is resistant to high temperature and capable of large-current driving of the discharge tubes 15. Therefore, high luminance can be achieved and predefined luminance can be achieved with a less number of discharge tubes 15.

U-shaped discharge tubes 15 such as ones illustrated in FIG. 31 are preferable. The grounding member 150 in the first embodiment is usually soldered to a resin substrate. However, the grounding member 150 is sensitive to a high temperature and thus not suitable for a large-current driving. The U-shaped discharge tubes do not require the grounding member 150. Therefore, a safety large-current driving is available, that is, a large amount of light can be achieved with a less number of lamps. This contributes to a cost reduction.

Sixth Embodiment

Next, the sixth embodiment of the present invention will be explained with reference to FIGS. 72 to 82. This embodiment includes different grounding members from the first embodiment. Other configurations are the same as the first embodiment. The same parts as those in the first embodiment are indicated by the same symbols. The same structures, functions and effects will not be explained.

A television receiver TV of this embodiment (not shown) has configurations similar to FIG. 1. It includes grounding members 250 illustrated in FIGS. 72 to 77. Each grounding member 250 is inserted in the mounting hole 13H of the chassis 13 and fixed to the chassis 13. The grounding member 250 includes a synthetic resin holder 251 and a metal grounding terminal 252 housed in the holder 251. The holder 251 protects the grounding terminal 252. The discharge tube 15 is grounded to the chassis 13 via the grounding terminal 252. The ground terminal 252 has a discharge tube connecting portion 253 and the chassis connecting portion 254. The discharge tube connecting portion 253 is electrically connected to the discharge tube 15 and the chassis connecting portion 254 is electrically connected to the chassis 13.

Figure 78:
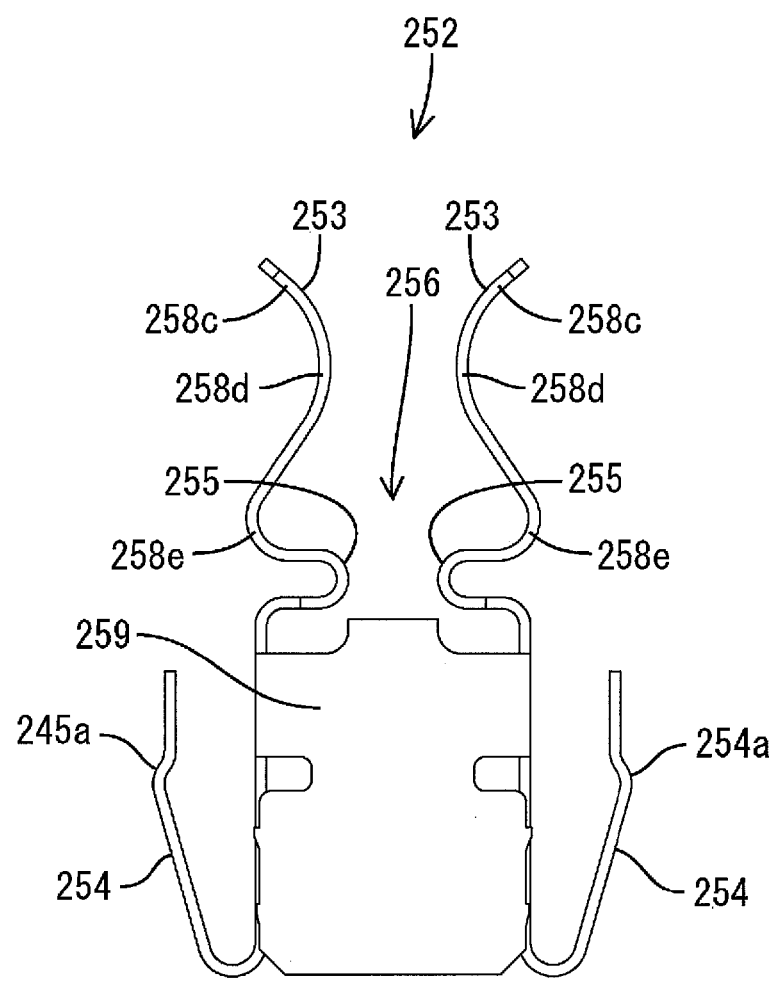
FIG. 78 is a right side view of a grounding terminal of the grounding member according to the sixth embodiment.
Figure 79:
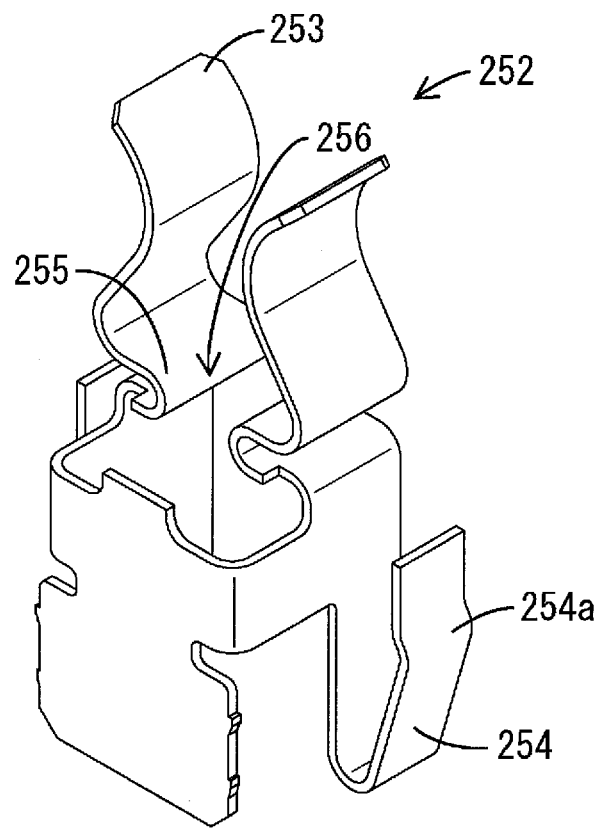
FIG. 79 is a first perspective view of the grounding terminal of the grounding member according to the sixth embodiment.
Figure 80:
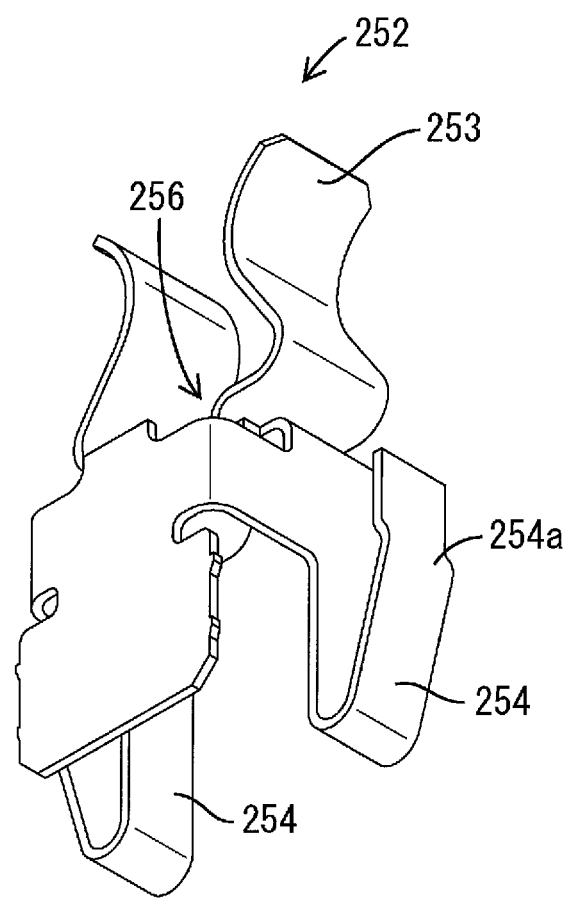
FIG. 80 is a second perspective view of the grounding terminal of the grounding member according to the sixth embodiment.
Figure 81:
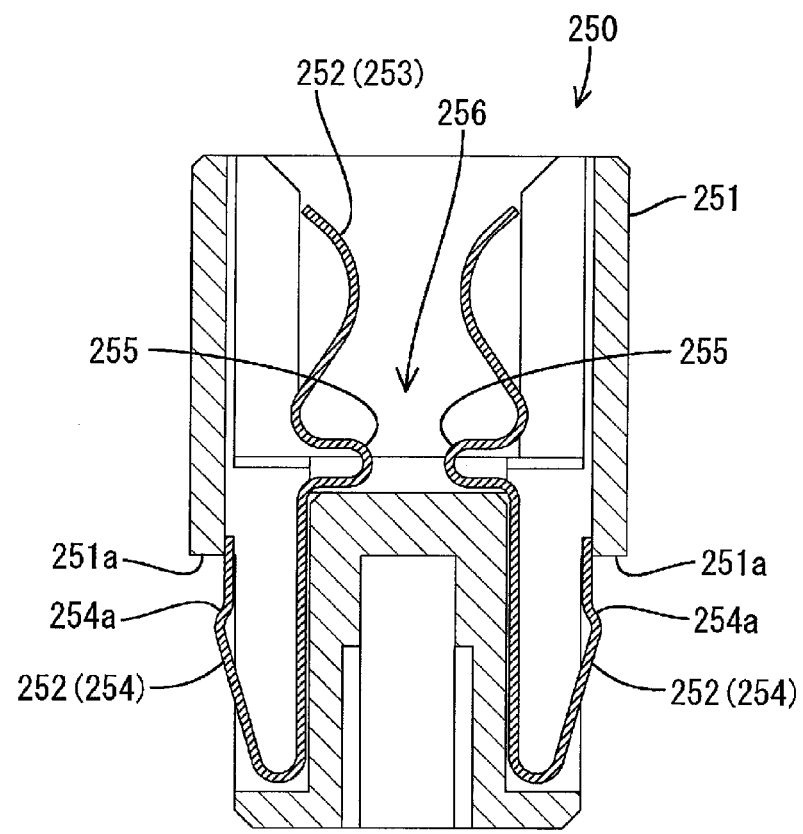
FIG. 81 is a cross-sectional view of the grounding member in FIG. 76 long line B-B.
Figure 82:
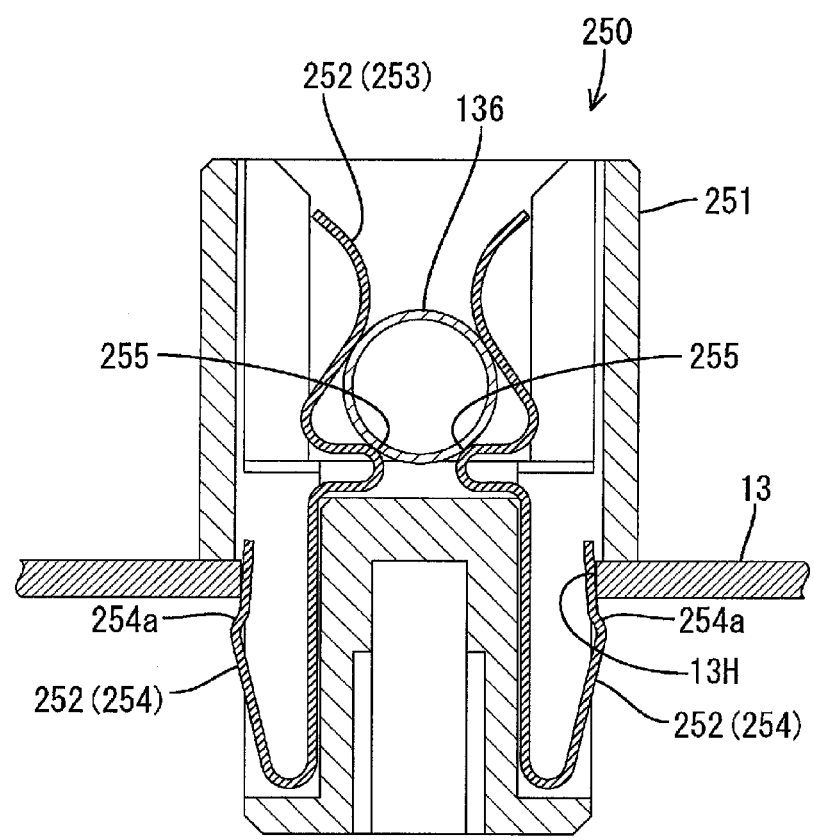
FIG. 82 is a view illustrating the grounding member in FIG. 81 with a ferrule fitted therein.

As illustrated in FIGS. 78 to 80, the grounding terminal 252 has ferrule receiving sections 255 that hold the ferrule 136 of the discharge tube 15. A ferrule holing area 256 is provided outside the ferrule receiving sections 255 (or a near side in a direction in which the ferrule is inserted). The ferrule 136 is held in the ferrule holding area 256. The discharge tube connecting portion 253 is constructed of two metal pieces curved symmetrically. The curved metal pieces define the ferrule holding area 256. The two metal pieces have guide sections 258c, curved sections 258d, bulge sections 258e and the ferrule receiving sections 255. The guide sections 258c are curved such that distal ends thereof extend outward to guide the ferrule 136 to the ferrule holding area 256. The curved sections 258d extend from the guide sections 258c along the ferrule holding area 256. They are curved inward so as to retain the ferrule 136 in the ferrule holding area 256. The bulge sections 258e extend from the curved sections 258d along the further part of the ferrule holding area 256 and bulge so as to provide a space for holding the ferrule 136. The ferrule receiving sections 255 extend from the bulge sections 258e toward a plate portion 259 and curved inward so as to restrict the ferrule 136 from entering the plate portion 259 side of a chassis connecting portion 254 side. With this configuration, the ferrule 136 is stably retained in the ferrule holding area 256 and restricted from entering the plate portion 259 side or the chassis connecting portion 254 side (see FIGS. 81 and 82).

The chassis connecting portions 254 are plate springs that continue from the discharge connecting portions 253 and the plate portions 259 (or connecting portions between the discharge tube connecting portions 253 and the chassis connecting portions 254). Each of them has a free end. Each plate spring is elastically deformed and inserted in the mounting hole 13H of the chassis 13. The plate spring is held to the rim of the mounting hole 13H with elastic restoring force and the grounding member 250 is mounted to the chassis 13. Each plate spring has a step portion 254a formed by bending a part thereof. A part of the chassis 13 is placed between the step portion 254a and a chassis contact surface 251a of the holder 251.

In this embodiment, the grounding members are not soldered and the ferrules 136 are received only by metal parts. This configuration is resistant to a high temperature. Therefore, large-current driving of the discharge tubes 15 is available, that is, high luminance can be achieved and specified luminance can be achieved with a less number of the discharge tubes 15. These effects can be even enhanced with the relay connectors 814 in the fifth embodiment.

Other Embodiments

The present invention is not limited to the above embodiments explained in the above description. The following embodiments may be included in the technical scope of the present invention, for example.

(1) The discharge tubes are not limited to the cold cathode tubes. Hot cathode tubes, xenon tubes, fluorescent tubes and the like may be used.

(2) Switching components in the display panel of the display device are not limited to TFTs. MINs (Metal Insulator Metals) and the like may be used as switching components.

(3) The display device is not limited to the liquid crystal display device. Various kinds of display devices that require lighting devices on the back of display panels can be used.

(4) The holders may be fixed to the chassis by screws or by press-fitting instead of the elastic stoppers. The holders can be attached to the chassis from the rear side.

(5) The discharge tube connecting portion may be exposed on the outside of the outer surface of the holder instead of arranging inside the holding area.

(6) In the first embodiment, the discharge tubes illustrated in FIGS. 25 to 28. However, discharge tubes onto which the ferrules 236 illustrated in FIGS. 36 and 37 may be used.

Figure 36:
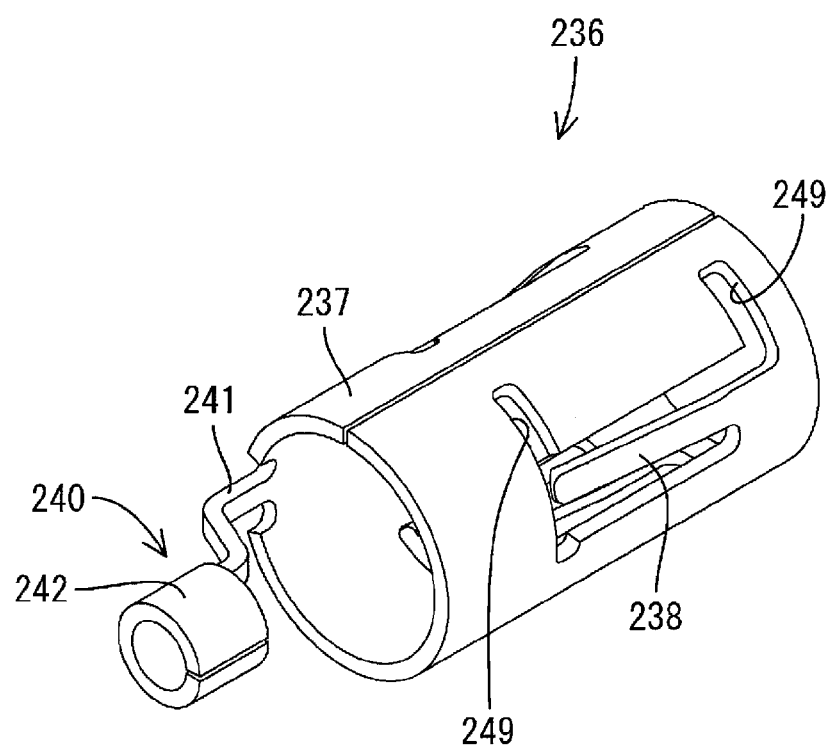
FIG. 36 is a front perspective view of a ferrule according to another embodiment.
Figure 37:
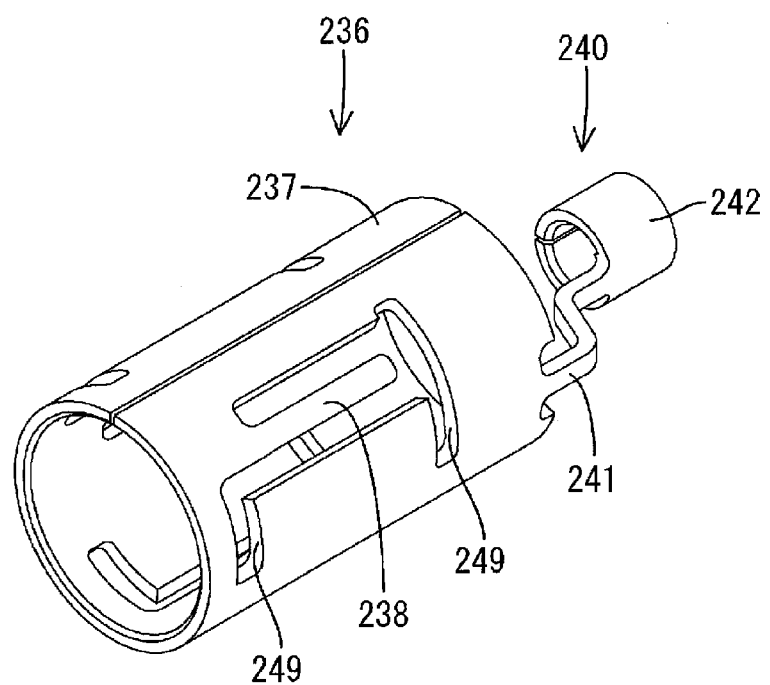
FIG. 37 is a rear perspective view of the ferrule in FIG. 36.

Each ferrule 236 illustrated in FIGS. 36 and 37 is provided as a single part prepared by bending or hammering a metal plate (e.g., a stainless-steel plate) punched into a predetermined shape. The ferrule 236 has the same configuration as the ferrule 136 except for cutouts 249 that run in the circumferential direction. Therefore, the parts having the same structures as the ferrule 136 will not be explained.

The ferrule 236 includes a body 237 and a conductive part 240. The body 237 has a substantially cylindrical overall shape concentric with the glass tube 134 (see FIG. 38). The inner diameter of the body 237 is slightly larger than the outer diameter of the glass tube 134.

The body 237 includes three flexible holding parts 238 that are formed by cutting out parts of the body 237 so as to form slits around the flexible holding parts 238 at an equal angular interval. The flexible holding parts 238 are in contact with the periphery of the glass tube 134.

A conductive part 240 extends from a rim of the body 237 in a cantilever manner similar to the ferrule 136. The conductive part 240 includes an elongated portion 241 that continues from the font rim of the body 237 and a drum-like portion 242 that projects from a front end (a tip) of the elongated portion 241 further to the front.

The body 237 has the cutouts 249 that continue from respective cutouts provided for forming the flexible holding parts 238 (that run in the axial direction of the body 237) and run in the circumferential direction. When preparing the body 237 having the cylindrical shape, continuous areas thereof are easy to form in the cylindrical shape. However, areas having the cutouts such as areas having the flexible holding portions 238 are difficult to form in the cylindrical shape. By providing the cutouts 249 in the circumferential direction, the areas having the cutouts 249 are formed in arc shapes corresponding to parts of the circumferential shape of the body 237.

Then, the entire area of the body 237 is easily formed in the circumferential shape. Larger the circumferential distances between the flexible holding parts 238 become, more difficult to form the circumferential shape. In such a case, the cutouts 249 are more effective.

The ferrules 236 can be used for the discharge tubes illustrated in FIGS. 38 to 43.

Figure 38:
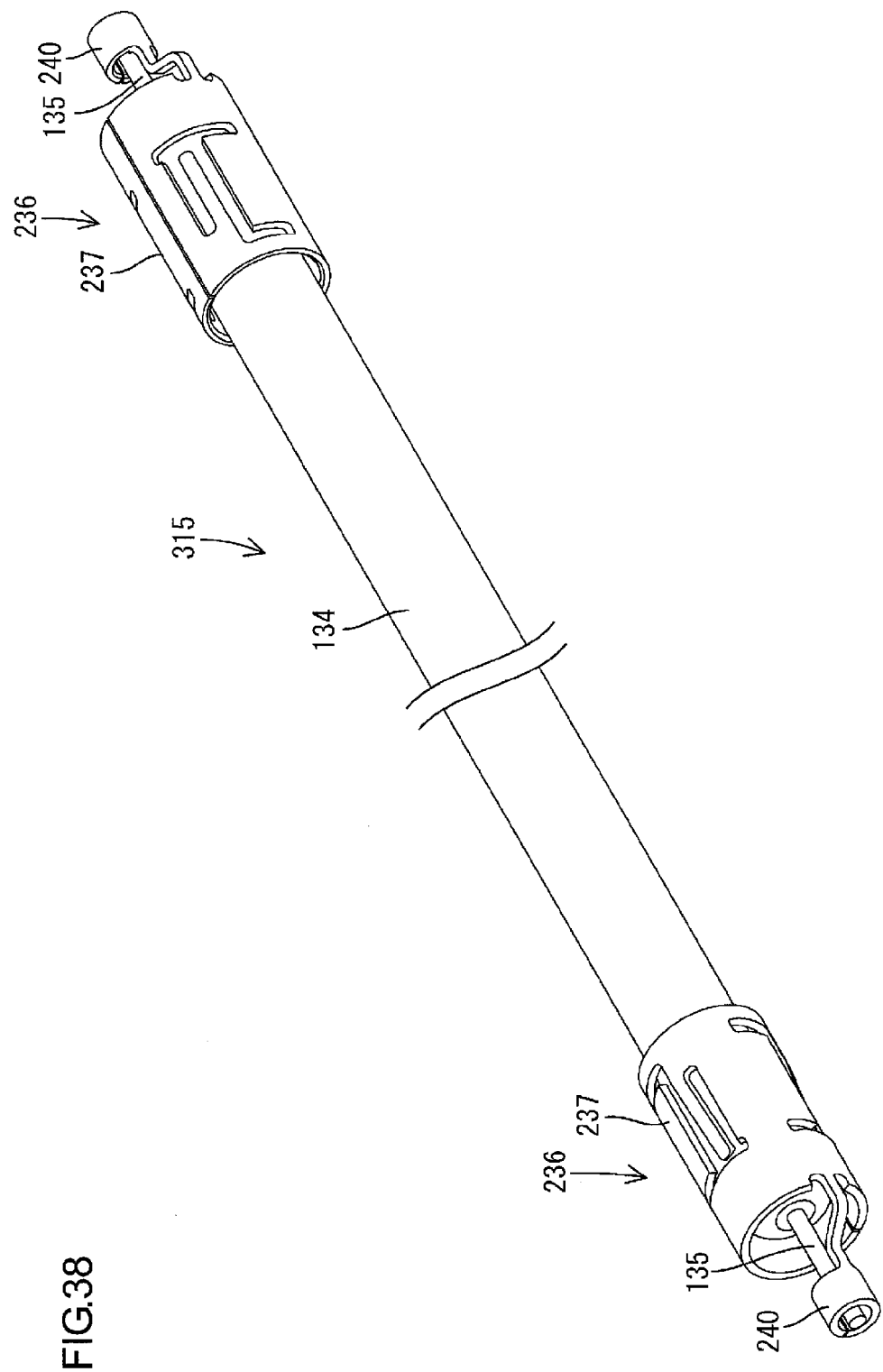
FIG. 38 is a first perspective view illustrating an example of a lamp with the ferrules illustrated in FIG. 36.
Figure 39:
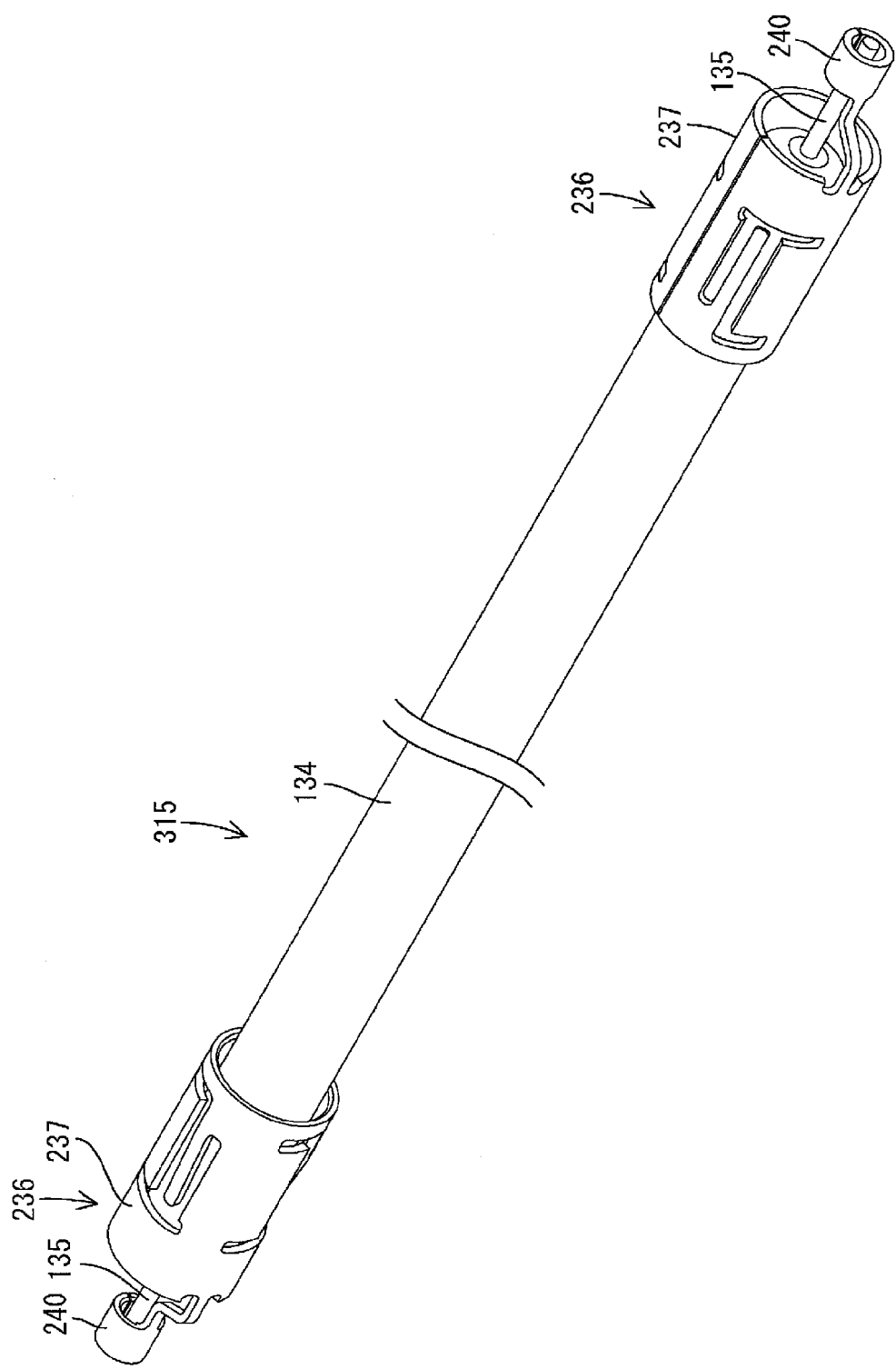
FIG. 39 is a second perspective view of the lamp in FIG. 38.
Figure 40:
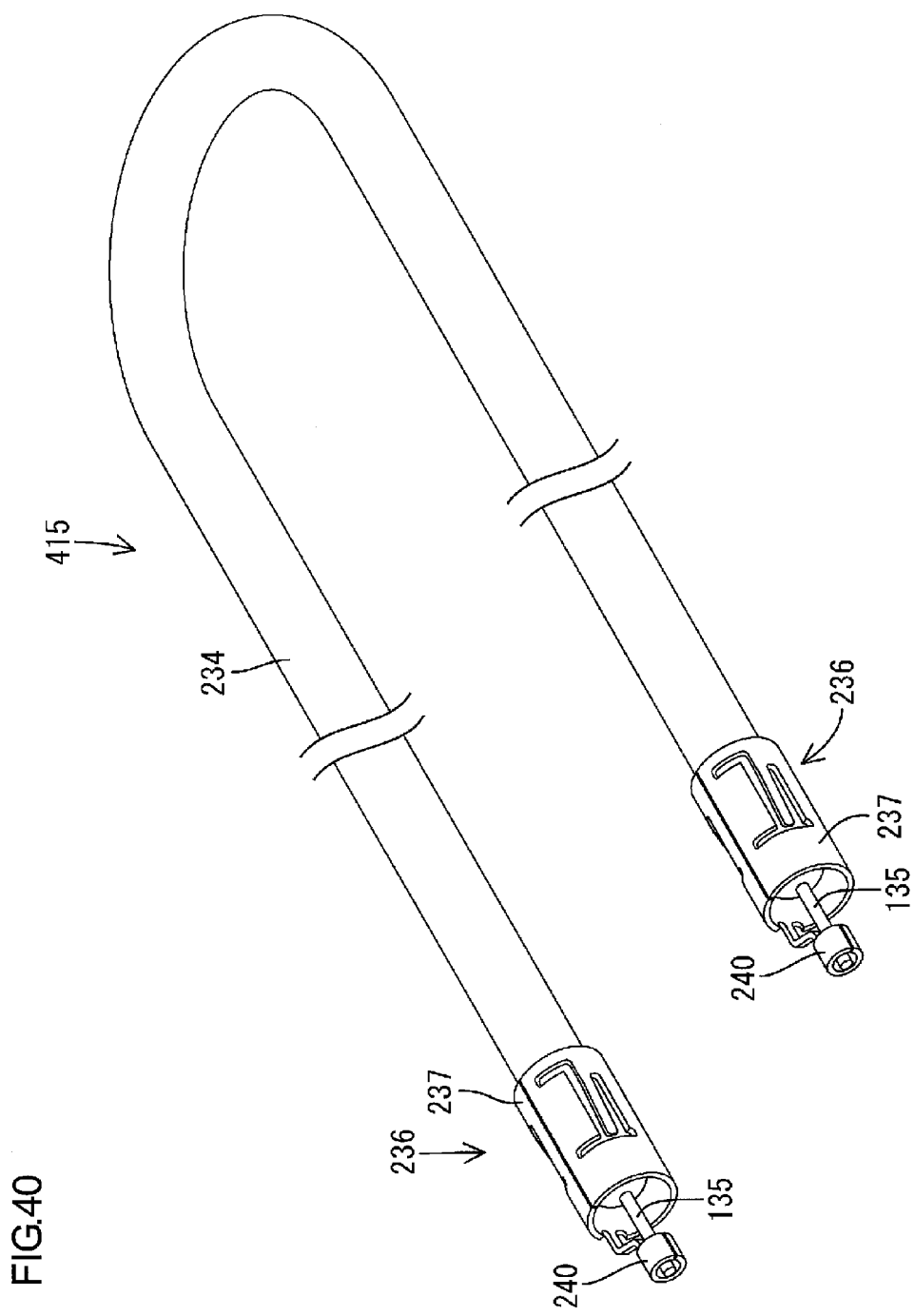
FIG. 40 is a first perspective view of a modification of the lamp with the ferrules in FIG. 36.
Figure 41:
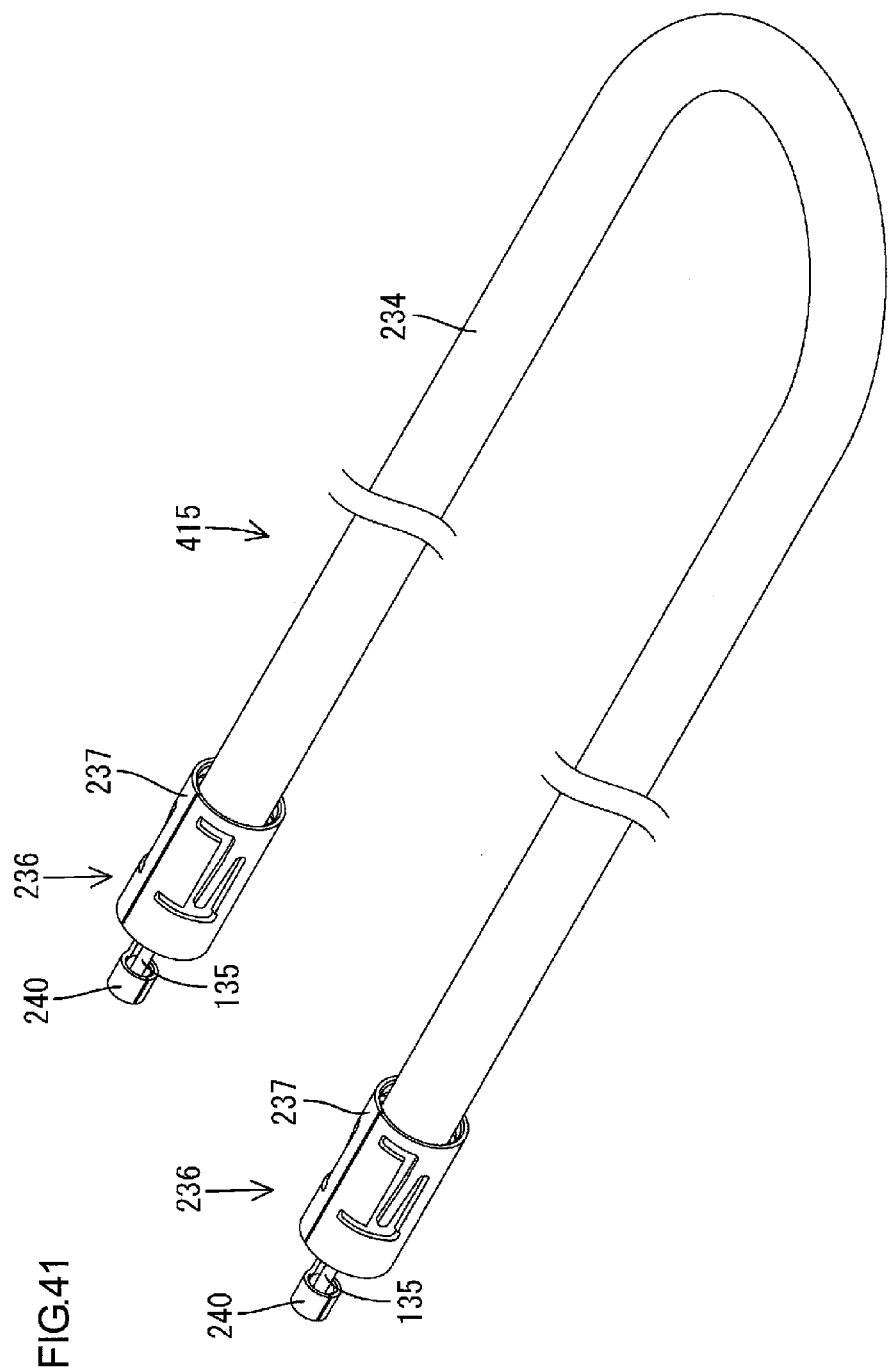
FIG. 41 is a second perspective view of the lamp in FIG. 40.
Figure 42:
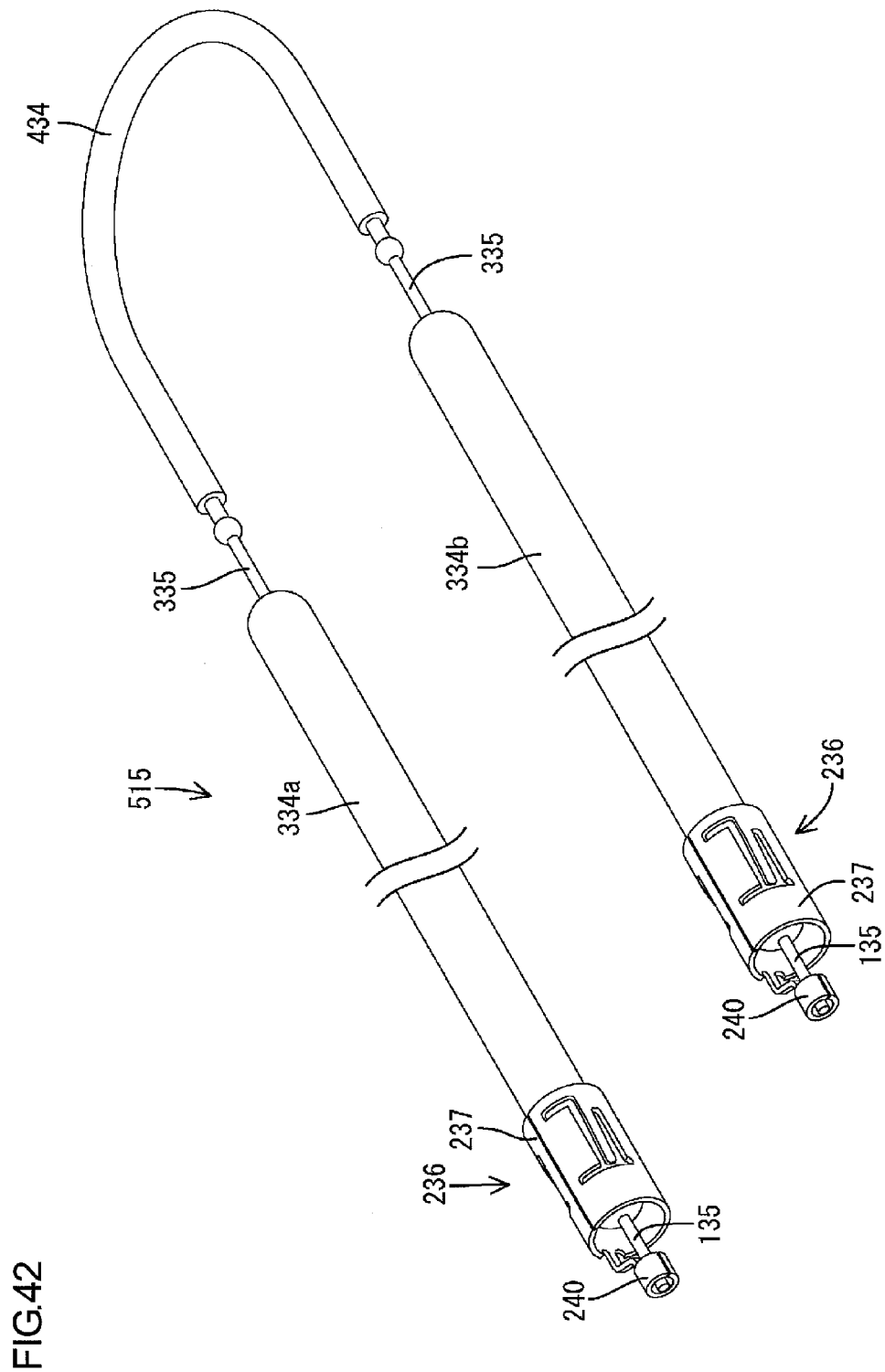
FIG. 42 is a first perspective view illustrating a modification of the lamp with the ferrules in FIG. 36.
Figure 43:
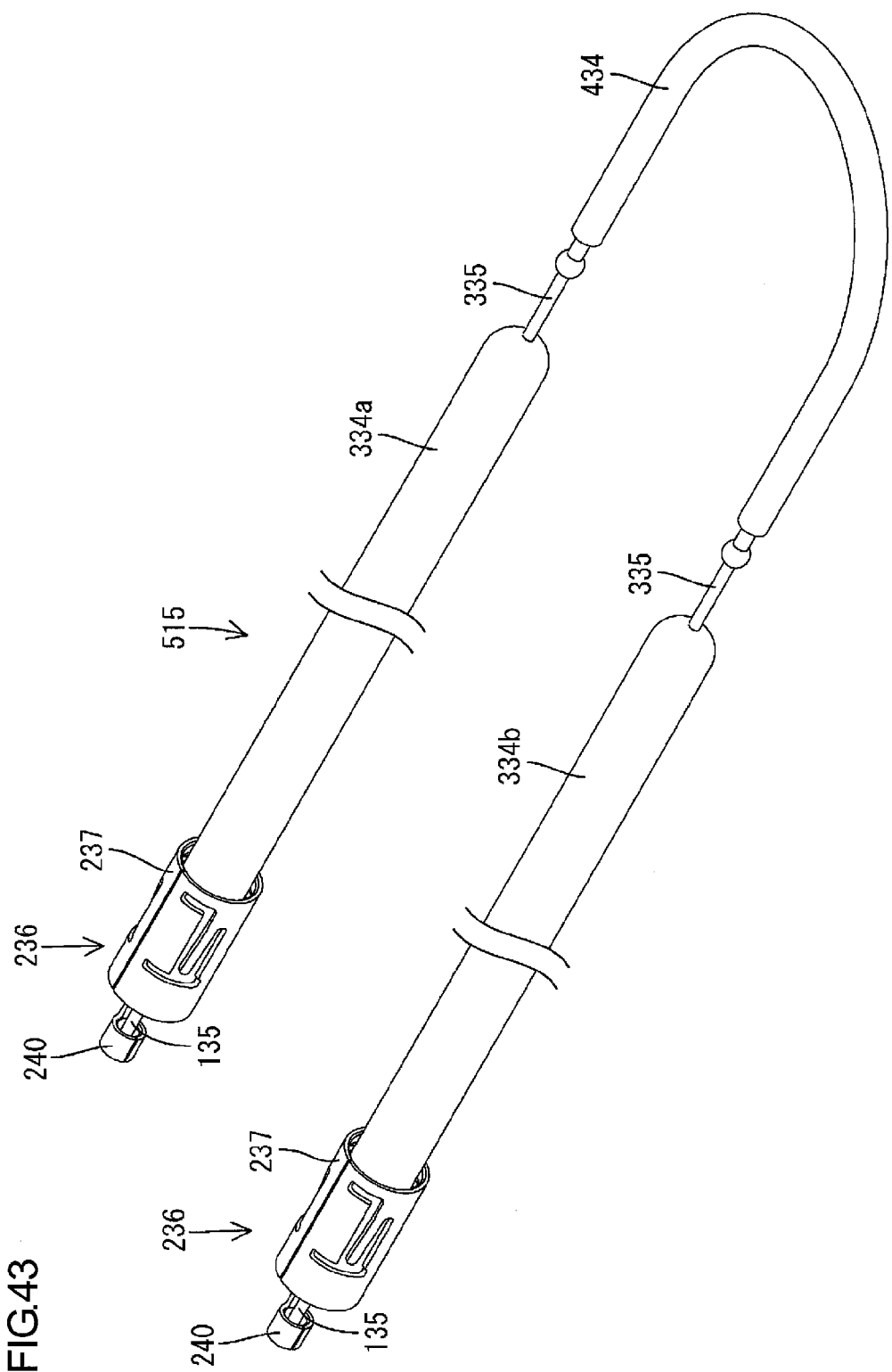
FIG. 43 is a second perspective view of the lamp in FIG. 42.

A discharge tube 315 illustrated in FIGS. 38 and 39 includes a straight glass tube 134 and the ferrules 236 fitted onto the glass tube 134. A discharge tube 415 illustrated in FIGS. 40 and 41 includes a U-shaped glass tube 234 and the ferrules 236 fitted onto the grass tube 234. A discharge tube 515 illustrated in FIGS. 42 and 43 includes straight glass tubes 334a and 334b, and the ferrules 236 fitted onto one of ends of the glass tubes 334a and 334b. Outer leads 135 and conductive parts 240 are electrically connected to each other at the ends of the discharge tube 515 on which the ferrules 236 are provided. At the other ends, outer leads 335 are connected to each other via a connecting member 434 to connect the glass tubes 334a and 334b each other.

(7) In the first embodiment, the connecting portions 34c of the flexible portions 34 are in contact with the conductive portions 173 provided on the surface of the circuit board 17 away from the chassis 13 (see FIG. 23). This provides electrical connection between the power board 16 and the relay connectors 30. However, the conductive portions maybe provided on a surface of the circuit board 17 facing the chassis 13, such as a conductive portion 173a illustrated in FIG. 44 or on both surface of the circuit board 17, such as conductive portions 173b and 173c illustrated in FIG. 45.

Figure 44:
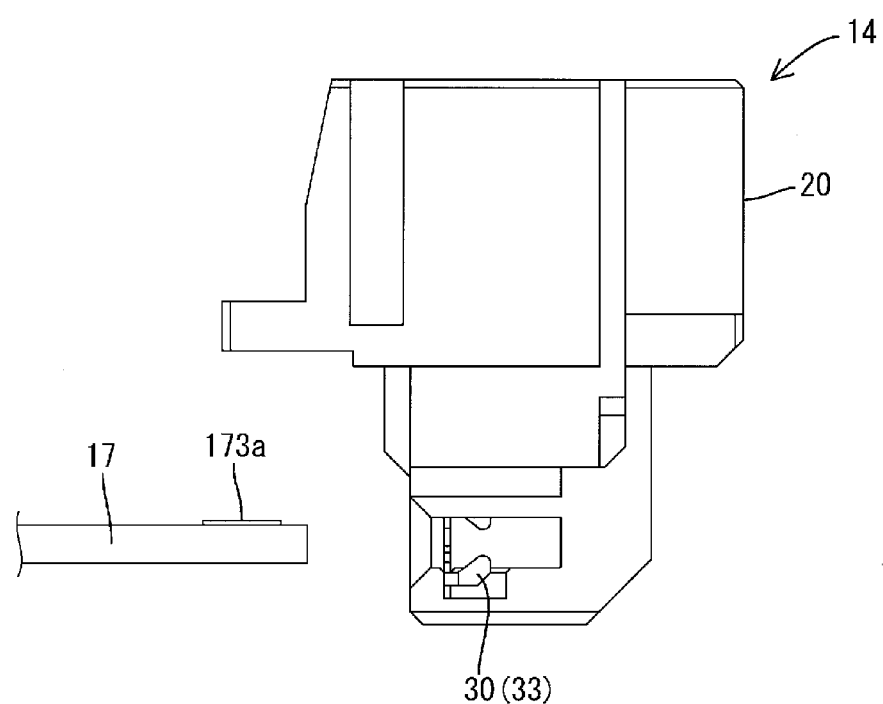
FIG. 44 is a schematic view illustrating a modification of a conductive part mounted to the circuit board of the power board.
Figure 45:
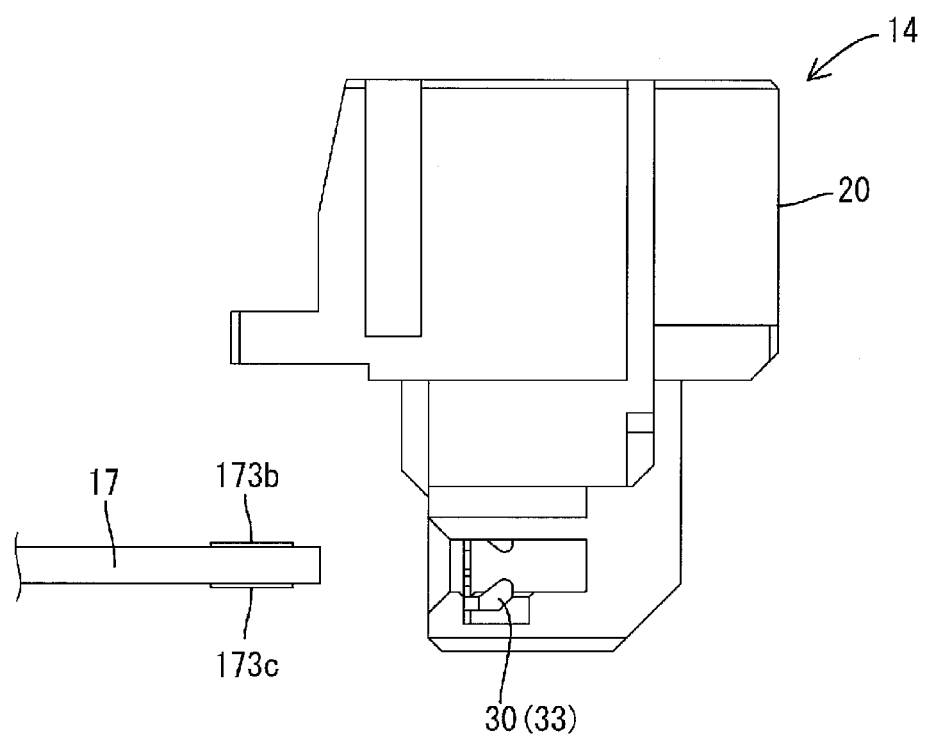
FIG. 45 is a schematic view illustrating another modification of the conductive part mounted to the circuit board of the power board.

In FIG. 44, the connecting portion 34c of the flexible portion 34 of the relay terminal 30 can be in contact with the conductive portion 173a. In FIG. 45, the connecting portions 34c of the flexible portions 34 of the relay terminal 30 can be in contact with the conductive portions 173b and 173c on the front and the rear surfaces of the circuit board 17.

The invention claimed is:

1. A lighting device comprising:
   a chassis;
   a discharge tube arranged on a first surface of the chassis;
   a power board arranged on an opposite surface of the chassis from the first surface on which the discharge tube is arranged and configured to supply power to the discharge tube; and
   a relay connector mounted to the chassis to relay the power supply from the power board to the discharge tube, wherein:
   the relay connector includes a holder having insulation properties and mounted to the chassis, and a relay terminal attached to the holder and electrically connected to the power board and the discharge tube; and
   the relay terminal includes flexible portions that hold the power board therebetween with elastic forces so as to make electrical connection with the power board; and
   the flexible portions are formed such that longitudinal directions thereof cross a longitudinal direction of the discharge tube;
   the holder has an insertion hole that receives the power board;
   the insertion hole has openings in two surfaces that are perpendicular to each other;
   the holder wall is formed so as to bridge the insertion hole; and
   the holder has a guide portion to guide an insertion of the power board into the insertion hole, the guide portion being located near the opening of the insertion hole.

2. The lighting device according to claim 1, wherein the flexible portions are formed such that the longitudinal directions thereof are substantially perpendicular to the longitudinal direction of the discharge tube.

3. The lighting device according to claim 1, wherein the flexible portions are formed such that the longitudinal directions thereof are parallel to a second surface of the chassis.

4. The lighting device according to claim 1, wherein:
the relay terminal has a discharge tube connecting portion electrically connected to the discharge tube, a power board connecting portion electrically connected to the power board and an intermediate portion provided between the discharge tube connecting portion and the power board connecting portion;
the power board connecting portion includes the flexible portions; and
the intermediate portion is formed in a plate-like shape so as to have a plate surface on a same plane as plate surfaces of the flexible portions and housed in the holder, the plate surfaces of the flexible portions being formed along the longitudinal directions of the flexible portions.

5. The lighting device according to claim 1, wherein the flexible portions hold the power board therebetween at an inner location of the power board from an edge of the power board and make electrical connection between the power board and the relay terminal.

6. The lighting device according to claim 1, wherein:
the holder has a holder wall engaged with the power board; and
the power board has a cutout in which the holder wall engages and is held between the flexible portions as the holder wall engages in the cutout.

7. The lighting device according to claim 1, wherein the holder wall has a tapered portion that is tapered so as to guide an insertion of the power board into the insertion hole.

8. The lighting device according to claim 1, wherein the guide portion has a sloped surface that continues into the insertion hole.

9. The lighting device according to claim 1, wherein the guide portion is formed such that a surface of the power board facing the chassis moves along the guide portion during the insertion of the power board into the insertion hole.

10. The lighting device according to claim 1, wherein:
the guide portion includes a first guide section and a second guide section;
the first guide section is formed such that a surface of the power board facing the chassis moves along the first guide section during the insertion of the power board into the insertion hole;
the second guide section is formed such that a surface of the power board away from the chassis moves along the second guide section during the insertion of the power board into the insertion hole; and
the first guide section has a guiding area longer than that of the second guide section.

11. The lighting device according to claim 1, wherein the power board includes terminals on front and rear surfaces thereof, the terminals being electrically connected to the flexible portions.

12. The lighting device according to claim 1, wherein the power board includes a terminal electrically connected to the flexible portion; and
the terminal is provided on the power board in an area held with the flexible portions and off a center of a long dimension of the flexible portion.

13. The lighting device according to claim 1, wherein:
the power board includes a terminal electrically connected to the flexible portion;
the flexible portion that is electrically connected to the terminal has a primary contact that is primarily in contact with the terminal and a secondary contact that is secondarily in contact with the terminal; and
the secondary contact has a structure so as not to be primarily in contact with the terminal and so as to be secondarily in contact with the terminal as at least one of the primary contact and the terminal recedes.

14. The lighting device according to claim 1, wherein:
the power board includes a terminal electrically connected to the flexible portion;
the flexible portion has a primary contact that is primarily in contact with the terminal and a secondary contact that is secondarily in contact with the terminal; and
the secondary contact has a structure so as not to be primarily in contact with the terminal and so as to be secondarily in contact with the terminal as at least one of the primary contact and the terminal becomes thinner.

15. The lighting device according to claim 1, wherein:
the power board includes a terminal electrically connected to the flexible portion;
the flexible portion has a primary contact that is primarily in contact with the terminal and a secondary contact that is secondarily in contact with the terminal; and
the secondary contact has a structure so as not to be primarily in contact with the terminal and so as to be secondarily in contact with the terminal as at least one of the primary contact and the terminal wears.

16. The lighting device according to claim 1, wherein:
the power board includes a terminal electrically connected to the flexible portion;
the flexible portion has a primary contact that is primarily in contact with the terminal and a secondary contact that is secondarily in contact with the terminal; and
the secondary contact has a structure so as not to be primarily in contact with the terminal and so as to be secondarily in contact with the terminal as the terminal wears.

17. The lighting device according to claim 13, wherein:
the primary contact and the secondary contact project toward the terminal; and
the primary contact projects toward the terminal more than the secondary contact.

18. The lighting device according to claim 17, wherein the primary contact and the secondary contact are formed such that a difference between the primary contact and the secondary contact in projecting length is smaller than a thickness of the terminal.

19. The lighting device according to claim 1, wherein the flexible portions are made of stainless steel.

20. A relay connector for supplying power from a power board arranged on a rear surface of a chassis to a discharge tube arranged on a front surface of the chassis, comprising:
a holder having insulation properties and mounted to the chassis; and
a relay terminal configured to be electrically connectable to the discharge tube and the power board, and attached to the holder, wherein:
the relay terminal includes flexible portions configured to hold the power board therebetween with elastic forces so as to be electrically connected to the power board; and
the flexible portions are connectable in a form that longitudinal directions thereof cross a longitudinal direction of the discharge tube;

the holder has a holder wall configured to engage with the power board;

the flexible portions are configured to hold the power board therebetween as the holder wall engages in a cutout of the power board;

the holder has an insertion hole in which the power board is to be engaged;

the insertion hole has openings in two surfaces that are perpendicular to each other;

the holder wall is formed so as to bridge the insertion hole; and the holder has a guide portion configured to guide an insertion of the power board into the insertion hole, the guide portion being located near the opening of the insertion hole.

21. The relay connector according to claim 20, wherein the flexible portions are connectable in a form that the longitudinal directions thereof are perpendicular to the longitudinal direction of the discharge tube.

22. The relay connector according to claim 20, wherein the flexible portions are connectable in a form that the longitudinal directions thereof are along a rear surface of the chassis.

23. The relay connector according to claim 20, wherein:

the relay terminal has a discharge tube connecting portion configured to be electrically connected to the discharge tube, a power board connecting portion configured to be electrically connected to the power board, and an intermediate section provided between the discharge tube connecting portion and the power board connecting portion;

the power board connecting portion includes the flexible portions; and the intermediate section has a plate surface on a same plane as plate surfaces of the flexible portions and housed in the holder, the plate surfaces of the flexible portions being formed along the longitudinal directions of the flexible portions.

24. The relay connector according to claim 20, wherein the holder wall has a tapered portion that is tapered so as to guide an insertion of the power board into the insertion hole.

25. The relay connector according to claim 20, wherein the guide portion has a sloped surface that continues into the insertion hole.

26. The relay connector according to claim 20, wherein the guide portion is formed so that a surface of the power board facing the chassis moves along the guide portion during the insertion of the power board into the insertion hole.

27. The relay connector according to claim 20, wherein:

the guide portion includes a first guide section and a second guide section;

the first guide section is formed so that a surface of the power board facing the chassis moves along the first guide section during the insertion of the power board into the insertion hole;

the second guide section is formed so that a surface of the power board away from the chassis moves along the second guide section during the insertion of the power board into the insertion hole; and the first guide section has a guiding area longer than that of the second guide section.

28. The relay connector according to claim 20, wherein:

the flexible portions are configured to be electrically connected to a terminal of the power board;

at least one of the flexible portion has a primary contact configured to be primarily in contact with the terminal and a secondary contact configured to be secondarily in contact with the terminal; and the secondary contact is configured so as not to be primarily in contact with the terminal and so as to be secondarily in contact with the terminal as at least one of the primary contact and the terminal recedes.

29. The relay connector according to claim 20, wherein:

the flexible portions are configured to be electrically connected to a terminal of the power board;

at least one of the flexible portion has a primary contact configured to be primarily in contact with the terminal and a secondary contact configured to be secondarily in contact with the terminal; and the secondary contact is configured so as not to be primarily in contact with the terminal and so as to be secondarily in contact with the terminal as at least one of the primary contact and the terminal becomes thinner.

30. The relay connector according to claim 20, wherein:

the flexible portions are configured to be electrically connected to a terminal of the power board;

at least one of the flexible portion has a primary contact configured to be primarily in contact with the terminal and a secondary contact configured to be secondarily in contact with the terminal; and the secondary contact is configured so as not to be primarily in contact with the terminal and so as to be secondarily in contact with the terminal as at least one of the primary contact and the terminal wears.

31. The relay connector according to claim 20, wherein:

the flexible portions are configured to be electrically connected to a terminal of the power board;

at least one of the flexible portion has a primary contact configured to be primarily in contact with the terminal and a secondary contact configured to be secondarily in contact with the terminal; and the secondary contact is configured so as not to be primarily in contact with the terminal and so as to be secondarily in contact with the terminal as the terminal wears.

32. The relay connector according to claim 28, wherein:

the primary contact and the secondary contact are formed so as to project toward the terminal; and the primary contact is formed so as to project toward the terminal more than the secondary contact.

33. The relay connector according to claim 28, wherein the primary contact and the secondary contact are formed such that a difference between the primary contact and the secondary contact in projecting length is smaller than a thickness of the terminal.

34. A display device, comprising:

the lighting device according to claim 1; and a display panel configured to provide display using light from the lighting device.

35. The display device according to claim 34 wherein the display panel is a liquid crystal panel using liquid crystals.

36. A television receiver comprising the display device according to claim 34.

* * * * *